United States Patent [19]
Nattkemper et al.

[11] Patent Number: 5,999,518
[45] Date of Patent: Dec. 7, 1999

[54] DISTRIBUTED TELECOMMUNICATIONS SWITCHING SYSTEM AND METHOD

[75] Inventors: Dieter H. Nattkemper, Rohnert Park; Farzad S. Nabavi, Petaluma, both of Calif.

[73] Assignee: Alcatel USA Sourcing, L.P., Plano, Tex.

[21] Appl. No.: 08/985,386

[22] Filed: Dec. 4, 1997

Related U.S. Application Data

[60] Provisional application No. 60/032,609, Dec. 4, 1996.

[51] Int. Cl.⁶ ................................................. H04L 12/56
[52] U.S. Cl. ......................... 370/258; 370/396; 370/402
[58] Field of Search .................................... 370/230, 231, 370/235, 236, 255, 257, 258, 395, 396, 397, 402, 409, 420

[56] References Cited

U.S. PATENT DOCUMENTS

| | | | |
|---|---|---|---|
| 5,301,273 | 4/1994 | Konishi | 395/200 |
| 5,528,591 | 6/1996 | Lauer | 370/60.1 |
| 5,649,110 | 7/1997 | Ben-Nun et al. | 395/200.19 |
| 5,734,825 | 3/1998 | Lauck et al. | 395/200.13 |

OTHER PUBLICATIONS

Rubin, I et al., "Imput Rate Flow Control for High Speed Communications Networks Using Burst Level Feedback Control", *European Transactions on Telecommunications and Related Technologies*, vol. 5, No. 1, Jan. 1, 1994, pp. 107–123.

Kung, H.T., et al., "Credit–Based Flow for ATM Networks", *IEEE Network: The Magazine of Computer Communications*, vol. 9, No. 2, Mar. 1, 1995, pp. 40–48.

Albertengo, G., "An Optimal Packet Switch Architecture for ATM 1", *Networking in the Nineties*, Bal Harbour, Apr. 7–11, 1991, vol. 2, No. CONF. 10, Apr. 7, 1991, pp. 441–444.

Nen–Fu Huang, et al., "A Cell–Based Flow Control Scheme for DQDB Interconnections Across N ATM Switch", *Serving Humanity Through Communications*, Supercomm/ICC, New Orleans, May 1–5, 1994, vol. 1, May 1, 1994, pp. 51–56.

Kennington, "Credit Priority Queuing for ATM Switches", Australian Communication Networks and Applications Conference, 1994, Dec. 5, 1994, pp. 399–403.

Floyd Backes, "Spanning Tree Bridges. Transparent Bridges for Interconnection of IEEE 802 LANs", IEEE Network, vol. 2, No. 1, Jan. 1988, pp. 5–9.

Paul F. Tsuchiya, "The Landmark Hierarchy: A New Hierarchy for Routing in Very Large Network", Computer Communications Review, vol. 18, No. 4, Aug. 1988, pp. 35–42.

Adrian Segall, et al., "Reliable Multi–User Tree Setup with Local Identifiers", IEEE Infocom '92, vol. 3, Conf. 11, Jan. 1, 1992, pp. 2096–2106.

(List continued on next page.)

*Primary Examiner*—Melvin Marcelo
*Attorney, Agent, or Firm*—Fliesler, Dubb, Meyer & Lovejoy

[57] ABSTRACT

A distributed telecommunications switching subsystem (100) receives and distributes data packets passed between a plurality of switching subsystems or channel banks (102, 104, 106) and a data packet switch (110). Each channel bank (102) has a stored list of addresses. When a channel bank (102) receives a data packet, it compares the address of the data packet to its stored list of addresses, and transmits the data packet to another channel bank (104) if the address of the data packet does not correspond to any of the addresses in its stored list of addresses. The data packet is passed on until it reaches a channel bank (106) with a matching address or else it is appropriately handled by a last channel bank (106) in the chain. If the address of data packet matches an address in its stored list of addresses, the channel bank (102) passes the data packet through a subscriber interface card (120) to a customer premises equipment unit (108) corresponding to the address of the data packet.

24 Claims, 11 Drawing Sheets

OTHER PUBLICATIONS

Keiichi Koyanagh, et al., "Distributed Communications System Technology", IEICE Transactions on Communications, vol. E77–B, No. 11, Nov. 1, 1994, pp. 1350–1362.

Michael D. Schroeder, et al., A High–Speed, Self–Configuring Local Area Network Using Point–to–Point Links, IEEE Journal on Selected Areas in Communications, vol. 9, No. 8, Oct. 1, 1991, pp. 1318–1335.

Kang G. Shin, et al., "A Simple Distributed Loop–Free Routing Strategy for Computer Communication Networks", IEEE Transactions on Parallel & Distributed Systems, vol. 4, No. 12, Dec. 1, 1993, pp. 1308–1319.

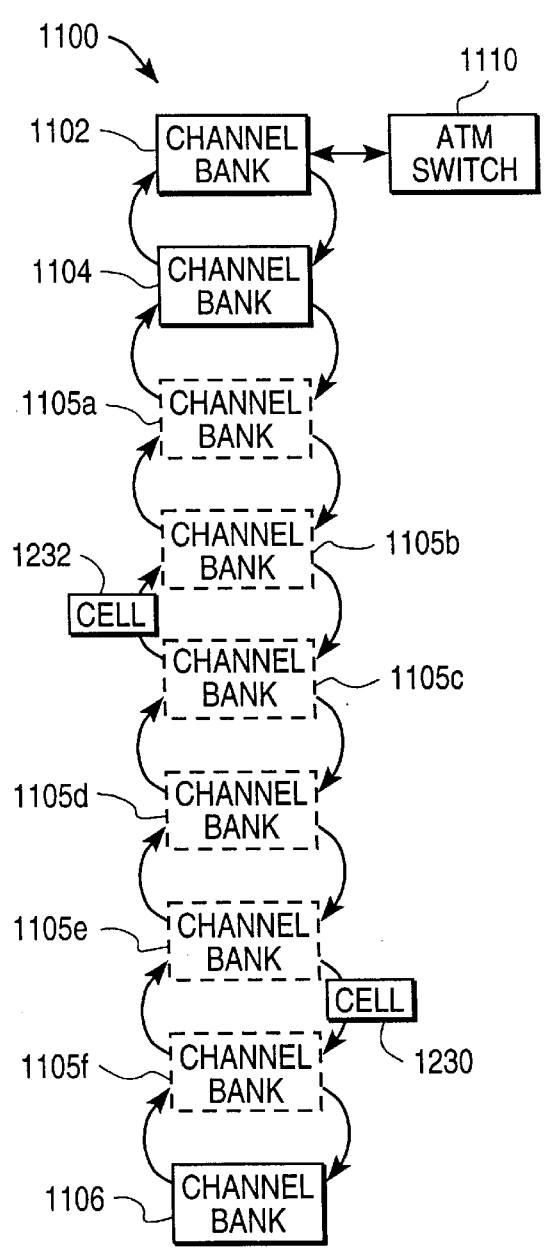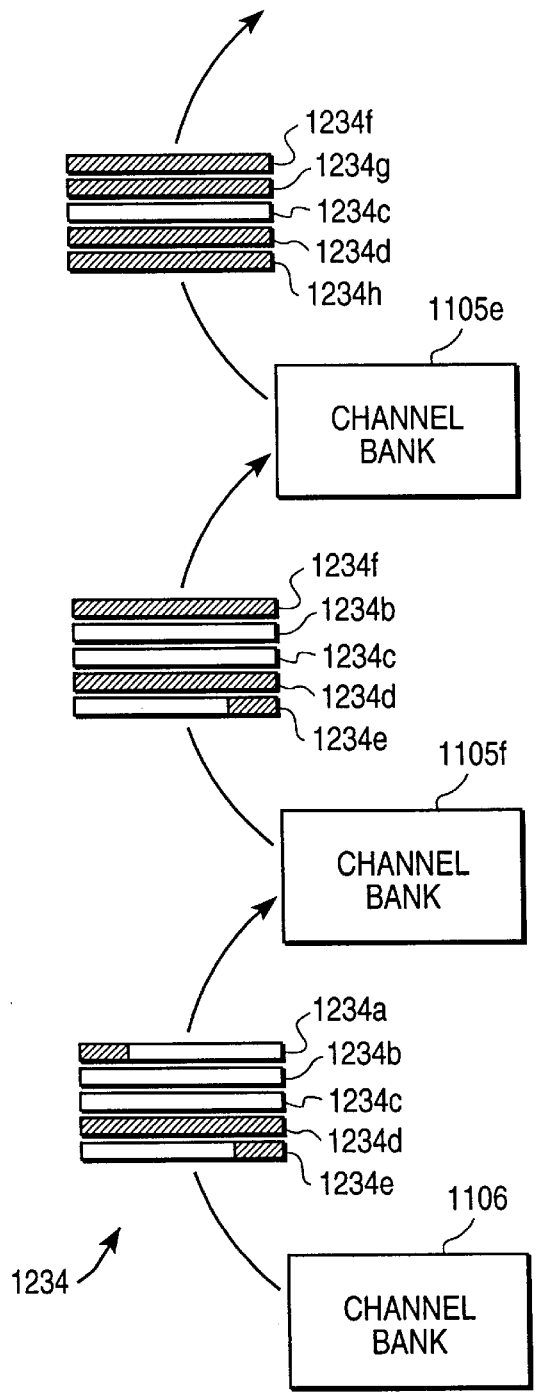
FIG. 13
FIG. 14

DISTRIBUTED TELECOMMUNICATIONS SWITCHING SYSTEM AND METHOD

RELATED APPLICATION

This utility patent application claims the benefit of U.S. Provisional Application No. 60/032,609, entitled "Technique and System for Accessing Asynchronous Transfer Mode Networks," filed on Dec. 4, 1996.

TECHNICAL FIELD OF THE INVENTION

This invention relates generally to the field of telecommunications switching and more particularly to a distributed telecommunications switching system and method.

BACKGROUND OF THE INVENTION

A variety of telecommunications networks have been used to establish communication between customer premises equipment (CPE) units and a central office. Most of these networks are formed in a "tree" structure, in which the central office is connected to several switching units, which are each connected to several smaller switching units, and so on along the "branches" of the tree. At the lowest level of switching units, each unit is connected to one or more CPE units.

To route addressed data or otherwise communicate with one of the CPE units, the central office determines which branch of the tree services the CPE unit in question. The data is then passed to the switching system for that branch, which in turn passes the data on to the next lower level in the switching hierarchy, and so on, until the data reaches the CPE unit.

This routing scheme requires that each switching system at each level in the hierarchy must store address and routing information for all of the CPE units serviced by it. If the customer base is expanded to include additional CPE units, then all switching systems routing traffic to the new CPE units must be reprogrammed to store the new address and routing information. Therefore, it is desirable to avoid establishing, maintaining, and updating address and routing information storage for the entire network at each switching system therein.

SUMMARY OF THE INVENTION

From the foregoing, it may be appreciated that a need has arisen for a telecommunications switching system that only maintains addressing and routing information for only the customer premises equipment that it services. Further, a need has arisen for a telecommunications network that avoids the tree structure approach of conventional telecommunications network. In accordance with the present invention, a distributed telecommunications system and method are provided which substantially eliminate or reduce disadvantages and problems associated with conventional telecommunications systems.

According to an embodiment of the present invention, there is provided a distributed telecommunications switching subsystem that includes a plurality of switching subsystems or channel banks. Each channel bank has a stored list of addresses. When a channel bank receives a data packet, it compares the address of the data packet to its stored list of addresses, and transmits the data packet to another channel bank if the address of the data packet does not correspond to any of the addresses in its stored list of addresses.

The present invention provides various technical advantages over conventional telecommunications systems. For example, one technical advantage is that each channel bank only stores a limited number of addresses pertaining to customers directly serviced by the channel bank and is effectively independent of the other channel banks in the system. Another technical advantage is that the modularity of the system allows expansion of service with minimal modification to the existing structure. A further technical advantage is that the channel banks may be located remotely from one another without significant degradation in service, allowing customers in different areas to be located "close to the switch," to decrease access times and improve service for the customers. Other technical advantages are readily apparent to one skilled in the art from the following figures, descriptions, and claims.

The present invention may be advantageously used to facilitate access to asynchronous transfer mode ("ATM") networks and environments.

The present invention provides for a technique and system that can be employed to interface with, and provide access to, an ATM network. The present invention may be employed to interface with an ATM network, such as central offices of a public switched telephone network or wide area networks that operate through the transmission of optical signals in ATM format, and to route information between the ATM network and designated subscriber interfaces. For example, the present invention may be interposed between a wide area network having an ATM backbone and customer premise equipment. Such placement allows for the present invention to provide different functions on behalf of the wide area network (such as a "policing" function, which regulates the traffic flow to wide area networks), as well as on behalf of the customer premise equipment (such as a rate adoption function for local area networks).

Multiple interconnected units (which can also be referred to as "shelves" or "channel banks") are preferably used to implement the present invention. The multiple units may be physically located in a common place or in remote locations from one another. Each unit is associated with a plurality of subscriber interfaces, and performs distinct functions and procedures to the traffic deriving from the ATM network or subscriber interfaces. The cumulative effect of the multiple units is to form a technique and system that, among other things, routes and controls the ATM traffic amongst the various subscriber interfaces. As such, the present invention can be considered as a series of distributed ATM switches or nodes that collectively function as a single switching or multiplexing entity.

Preferably, the units are serially connected to one another (i.e., daisy-chained) such that any one unit is connected to one or two other units. The first and last units are connected to only one other unit, while the intermediate units between the first and last units are connected to two other units.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 13 is a block diagram illustrating a first upstream flow control system for the distributed switching subsystem; and FIG. 14 is a block diagram illustrating a second upstream flow control system for the distributed switching subsystem.

DETAILED DESCRIPTION OF THE INVENTION

Figure 1:
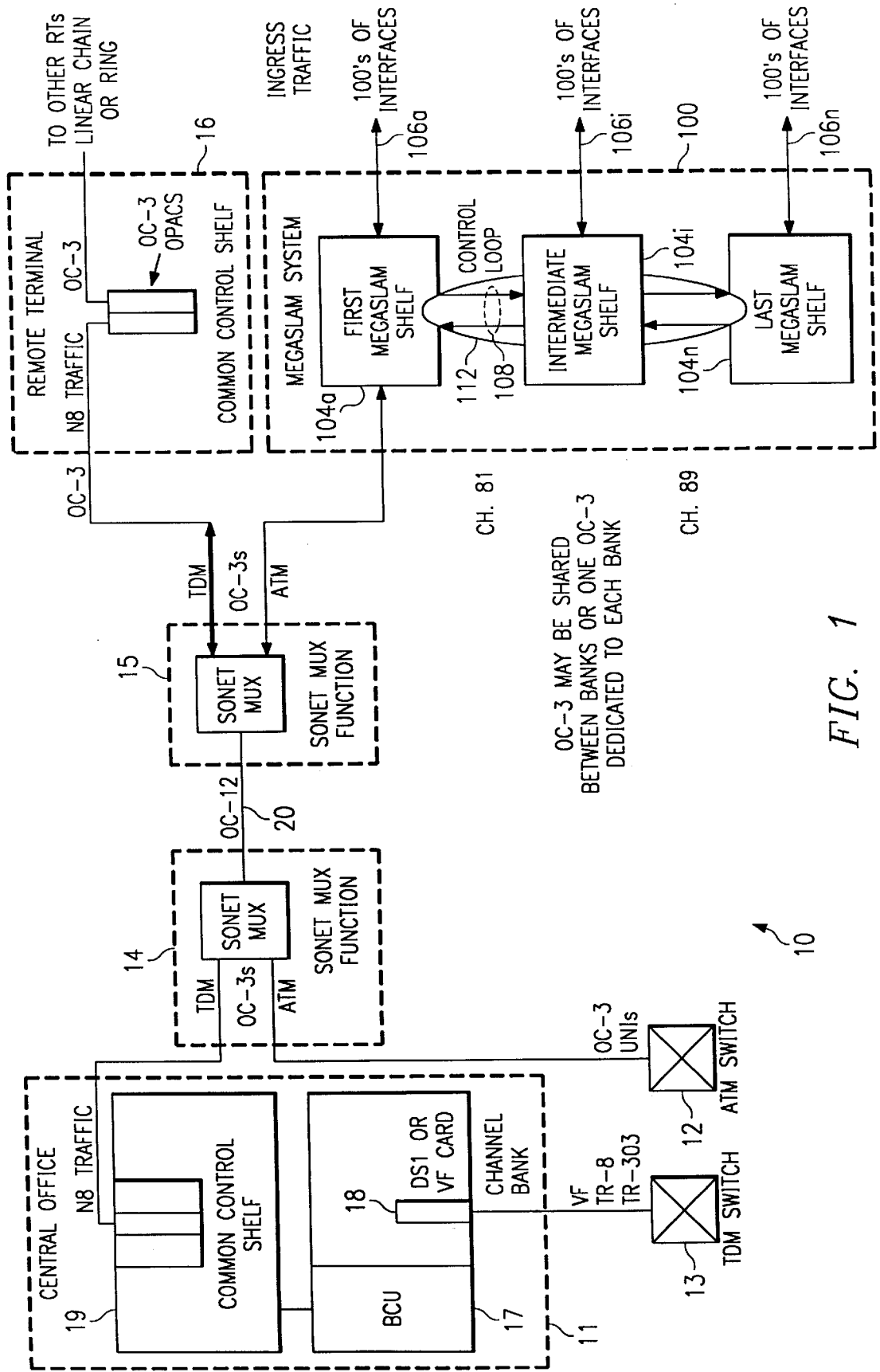
FIG. 1 illustrates a block diagram of a telecommunications network.

FIG. 1 is a block diagram of a telecommunications network 10. Telecommunications network 10 includes a central office 11, an asynchronous transfer mode (ATM) switch 12, a time division multiplex (TDM) switch 13, a central digital loop carrier system 14, a remote digital loop carrier system 15, one or more remote terminal 16, and a switching subsystem 100. In operation, central office 11 may receive time division multiplex traffic from TDM switch 13 at any of a plurality of channel banks 17. The TDM traffic is received by a line card 18, appropriately processed, and transferred to a common control shelf 19 where the TDM traffic can be passed to an appropriate central digital loop carrier system 14. Digital loop carrier system 14 may also receive ATM traffic from ATM switch 12. Digital loop carrier system 14 integrates the TDM traffic with the ATM traffic for transfer, preferably over an optical fiber link 20 to a remote digital loop carrier system 15. The remote digital loop carrier system 15 may partition the integrated TDM and ATM traffic received over optical fiber link 20 into separate TDM and ATM traffic streams. The partitioned TDM traffic stream may be provided to a remote terminal 16 according to its appropriate destination. Digital loop carrier system 15 may also provide the partitioned ATM stream to switching system 100 that appropriately sends the ATM stream to its appropriate user destination. While FIG. 1 shows switching subsystem 100 as only receiving an ATM stream, switching subsystem 100 may also receive and process TDM streams from telecommunications network 10.

FIG. 1 illustrates a switching subsystem 100, also known as an ATM service access multiplexer, in accordance with a preferred embodiment of the present invention. As illustrated, switching subsystem 100 may communicate to an ATM switch 12, as commonly found in a central office 14, through a shared communication link 110. Switching subsystem 100 includes a first switching unit 104a, a last switching unit 104n, and one or more intermediate switching units 104i interposed between the first switching unit 104a and the last switching unit 104n. Such switching units 104 are connected to one another through bidirectional connections 108, which collectively can be considered to provide for a control loop 112. Such connections 108 preferably transmit optical signals, such as OC-3 optical signals. Further, the switching units 104 are each associated to certain subscriber interfaces, specifically, the first switching unit 104a is associated with certain subscriber interfaces by link 106a, the intermediate switching units 104i are associated with other subscriber interfaces by link 106i, and the last switching unit 104n is associated with still other subscriber interfaces by link 106n.

Bi-directional connections 108 between the units allow for the transmission of control and routing information to be transferred between the units. The transmission of information may be in the downstream direction, such as from the first switching unit 104a to the intermediate switching unit 104i that it is directly connected to. Similarly, information may be transmitted in the upstream direction, such as from the last switching unit 104a to the intermediate switching unit 104i that it is directly connected to. Various levels of control may be provided by the switching subsystem 100, such as the following:

(1) instantaneous controls, including controlling the routing of ATM cells, the discarding of selective ATM cells, the signaling of ATM cell mapping, statistics gathering concerning ATM cells, and the marking of ATM cells;

(2) real time controls, including controlling the management of ATM cell buffers, the analysis and assessment of "fairness" for various classes of service, and the computation of queue occupancies;

(3) hop-by-hop (or segment-to-segment) propagation delay controls;

(4) end-to-end propagation delay controls; and (5) ed-to-end round trip delay controls.

ATM cells include information such as virtual path ("VP") and virtual circuit ("VC") routing information, and information concerning their termination ("terminating information"). Each switching unit 104 analyzes and evaluates the information included with each ATM cell. If the ATM cell identifies VP or VC routing information that is associated with a particular switching unit 104 analyzing the cell, then the cell is forwarded by that particular switching unit to the appropriate destination. Similarly, if the ATM 104 cell includes terminating information that is associated with the particular switching unit 104 evaluating the cell, then the cell is terminated by that particular switching unit 104. In the absence of matching routing or terminating information between the ATM cell and the evaluating switching unit 104, then the evaluating unit passes the cell downstream to the next switching unit 104. That switching unit 104 will then undertake similar analyses and evaluations. As a result, certain switching units 104 are operable to forward or terminate certain ATM cells. However, when the multiple switching units 104 are considered collectively, they are able to either forward or terminate all of the ATM cells. As such, the switching subsystem 100 provides for a distributed switching technique.

A conformant stream of information is preferably transmitted between the switching units 104. Such conformant stream is established by the imposition of control procedures through the use of the control loop 112.

A fairness analysis and credit-based scheme may, for example, be established through the control loop 112 to control upstream congestion between the switching units 104. The first switching unit 104a preferably generates a command cell in the downstream direction. The command cell includes information that defines the credits to be awarded to each unit switching 104, in accordance with the fairness analysis and assessment, and effects the downstream serial transmission of that cell to the other units. In response to reception of the command cell, the last switching unit 104n generates a feedback status cell, which includes feedback status information, such as the congestion status and behavioral attributes of a given shelf. The feedback status cell is, however, passed upstream and the feedback information therein is modified by the intermediate switching units 104i. Specifically, each intermediate switching unit 104i preferably supplements the information already included in the feedback status cell, which concerns other units, with feedback information concerning that particular unit. Using the information provided for in the command cell, together with the feedback status cell, allows for a credit-based scheme to take place whereby each switching unit 104 is informed of the number of credits it is awarded. The number of credits relates to the number of ATM cells that a switching unit 104 can pass upstream in a given period of time. Upon receiving the credits, a particular switching unit 104 may start to launch ATM cells into the upstream connection 108 until its credits are exhausted. The above-described fairness analysis and credit-based scheme is preferably implemented by designating one of the switching units 104 as a master, and the other units as slaves. The master switching unit 104, preferably the first switching unit 104a, should be operable to compute the credits awarded to each slave unit switching 104 based on the command and feedback status cells, and to inform each slave switching unit of its allotted number of credits. As a consequence of the fairness analysis and credit based scheme, the connections 108 between the switching units 104 are regulated such that upstream congestion (i.e., a bottleneck) is avoided.

Figure 2:
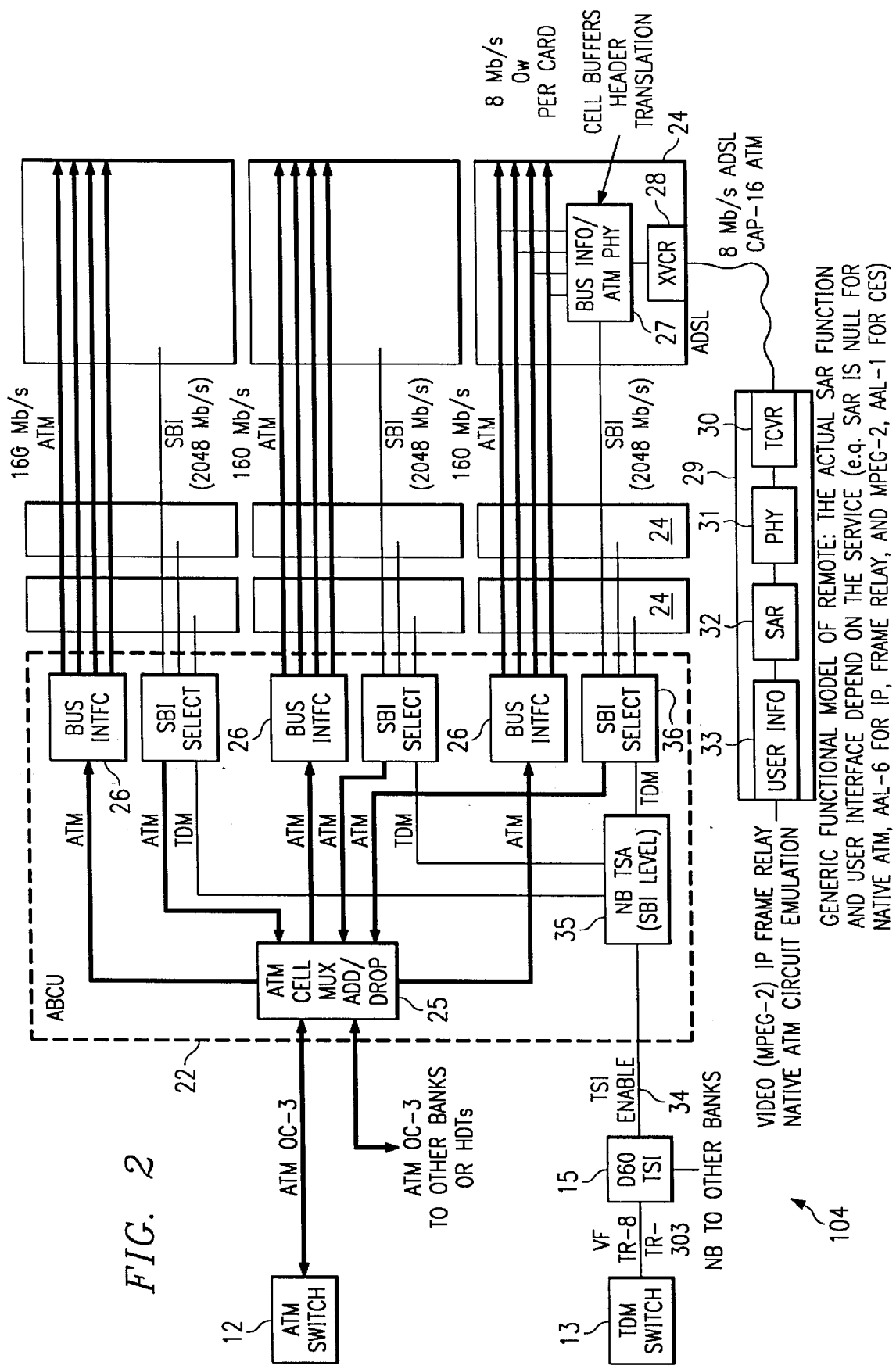
FIG. 2 illustrates a block diagram of a portion of a switching subsystem within the telecommunications network.

FIG. 2 is a block diagram of switching unit 104. Switching unit 104 includes an asynchronous transfer mode bank channel unit (ABCU) card 22 and a plurality of asynchronous digital subscriber line (ADSL) line cards 24. While ADSL line cards 24 are to be described preferably with respect to the asynchronous digital subscriber loop protocol, ADSL line cards 24 may be implemented with other appropriate transmission protocols. In operation, switching unit 104 receives asynchronous transfer mode cells at an ATM cell multiplexer add/drop unit 25. Add/drop unit 25 determines whether each ATM cell received has the appropriate destination and addressing information for a user serviced by ADSL line cards 24 associated with ABCU card 22. If not, then the ATM cell is passed to the next switching unit 104 within switching subsystem 100. If add/drop unit 25 identifies an ATM cell with the correct addressing and destination information, then the ATM cell is forwarded to an appropriate bus interface 26 for transfer to an appropriate ADSL line card 24. The appropriate ADSL line card includes a bus interface 27 to extract the ATM cell and provide it to a transceiver 28 where the ATM cell is placed into the appropriate ADSL transmission format for transmission to a remote unit 29. Remote unit 29 processes the ADSL transmission received from ADSL line card 24 through a transceiver 30, physical layer unit 31, segmentation and resegmentation unit 32 or other appropriate device and a user interface 33 for transmission to an end user.

ABCU card 22 may receive TDM traffic over a timeslot interchange cable 34 from TDM switch 13 through a switching device such as digital loop carrier system 15. ABCU card 22 includes a timeslot assigner 35 that places the TDM traffic into a subscriber bus interface (SBI) protocol format. The TDM traffic in the SBI protocol format is provided to an SBI selector 36 and sent to the appropriate ADSL line card 24 for transmission to the end user.

In the upstream direction, ADSL line card 24 receives an ADSL transmission from remote unit 29 and places the ADSL transmission into an appropriate ATM or TDM traffic stream at bus interface 27. The ATM and TDM traffic streams are transferred to a corresponding SBI selector 36 in order to provide the TDM traffic to timeslot assignment 35 and the ATM traffic to add/drop unit 25.

Figure 3:
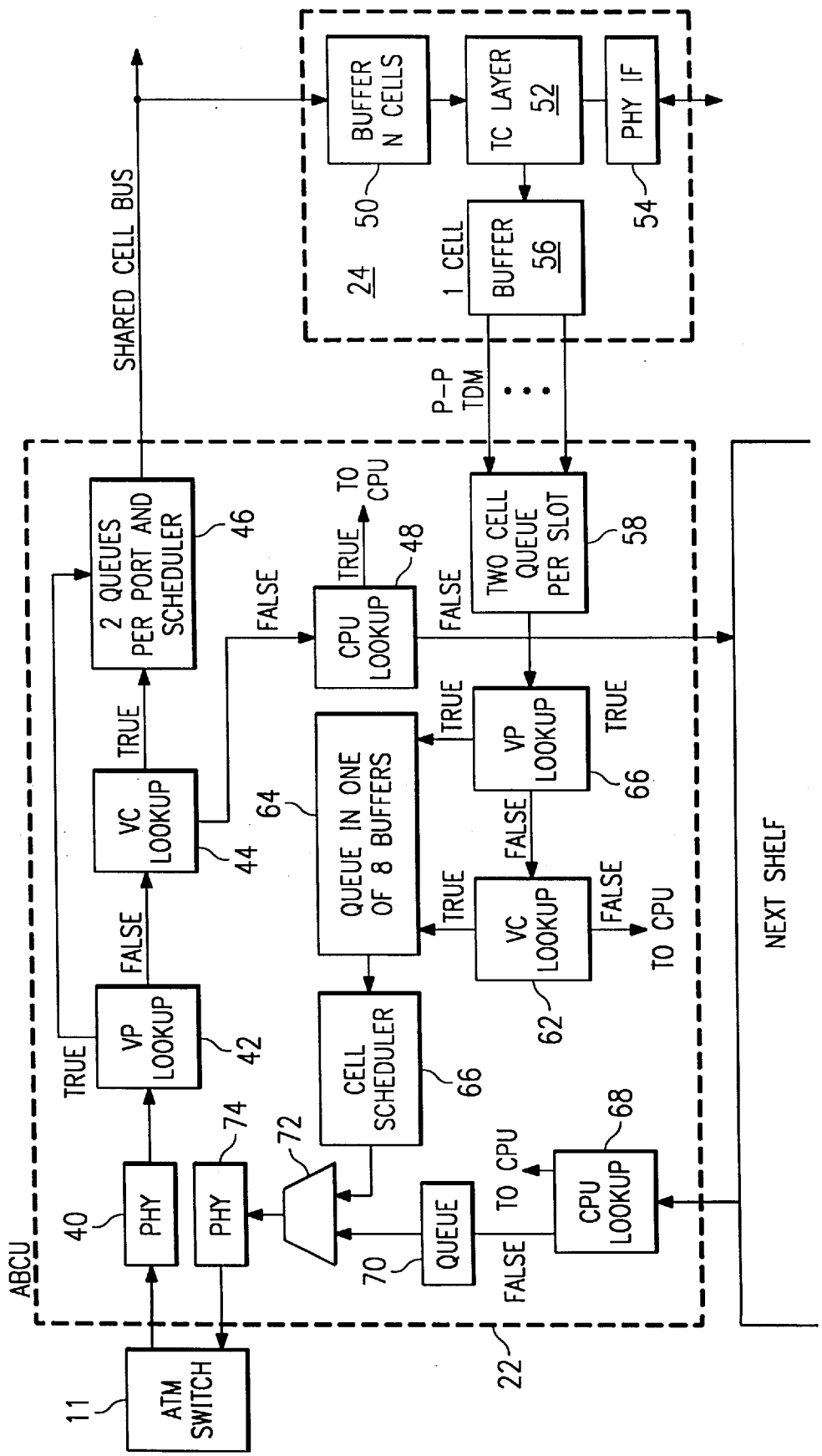
FIG. 3 illustrates a block diagram of a channel bank unit within the switching subsystem.

FIG. 3 is a simplified block diagram of ABCU card 22. In the downstream direction, ABCU card 22 receives asynchronous transfer mode cells from ATM switch 12 at a physical layer interface 40. A downstream virtual path (VP) lookup table 42 and a downstream virtual circuit (VC) lookup table 44 are used in determining whether the ATM cell is destined for this ABCU card 22. A comparison is done at downstream VP lookup table 42 to determine whether there is a match in the VP addressing. If a match occurs, the ATM cell is placed into an appropriate queue 46 and is scheduled for transmission to associated ADSL line card 24. If a match did not occur at downstream VP lookup table 42, a comparison is done at downstream VC lookup table 44. If a match occurs at downstream VC lookup table 44, then the ATM cell is sent to queue 46. If a match still has not occurred, a downstream CPU lookup table 48 is consulted to determine if the ATM cell is a control cell to be processed by the CPU on the ABCU card 22. If a match occurs at the downstream CPU lookup table 48, the ATM cell is passed to the CPU of ABCU card 22. If there is still no match, then the ATM cell is not destined for this ABCU card 22. The ATM cell is then passed to the next switching unit 104 within switching subsystem 100. The next switching unit 104 performs a similar lookup process described above. ATM cells provided to ADSL line card 24 are placed into a buffer 50, processed by a transmission convergence layer 52, and sent to the remote unit 29 through a physical layer interface 54.

In the upstream direction, ADSL line card 24 receives an ADSL transmission from remote unit 29 and physical layer interface 54. The ADSL transmission is processed by TC layer 52 and the resulting traffic is placed into a buffer 56. The resulting traffic is sent from buffer 56 to a holding queue 58 on ABCU card 22. Comparisons are done on the traffic cell at upstream VP lookup table 60 and upstream VC lookup table 62. If no match is found, the traffic cell is sent to the CPU of ABCU card 22 for further processing. If an appropriate match occurs, the traffic cell is placed into an upstream queue 64 where it awaits scheduling for transmission by a credit scheduler 66.

ABCU card 22 also receives ATM cells from another switching unit 104. ATM cells received from another switching unit 104 are processed by an upstream CPU lookup table 68 determined whether the receive cell is a control cell. If so, the ATM cell received from another switching unit 104 is passed to the CPU of ABCU card 22 for further processing. If it is not a control cell, the ATM cell received from another switching unit 104 is placed into a hop queue 70. A selector 72 determines which of the cells in the hop queue 70 and the cells identified by the credit scheduler 66 from the upstream queue 64 are to be transmitted through a physical layer interface 74 to ATM switch 12.

Figure 4:
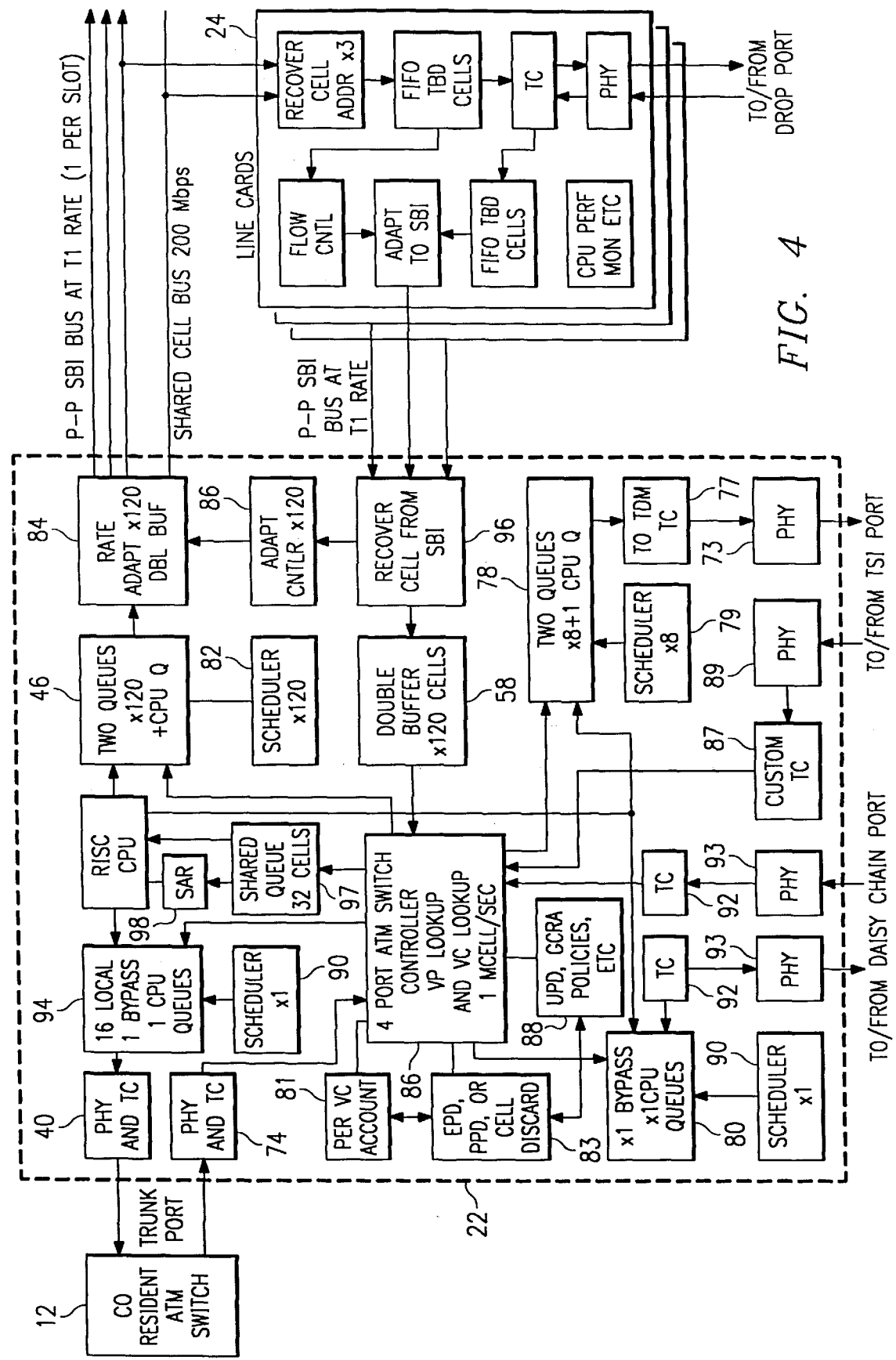
FIG. 4 illustrates another block diagram of the channel bank.

FIG. 4 provides a more detailed view of ABCU card 22. ABCU card 22 may have a switch controller 80 that performs the VP and VC lookup of ATM cells received from ATM switch 12. If a VC or VP match occurs a controller 80, the ATM cells passed to queue 46 are sent to an appropriate ADSL line card 24 as determined by a scheduler 82. A rate adapter transfers the ATM cell from queue 46 over the cell bus to ADSL line card 24 at the appropriate rate as determined by an adapter controller 86. If a lookup match does not occur at controller 80, the ATM cells are placed into a CPU queue if determined to be a control cell, or a bypass queue area 88 for transfer to the next switching unit 104. Transfer from the bypass/CPU queue 88 is determined by a scheduler 90. ATM cells within bypass queue 88 are transferred to a TC layer 92 and a physical layer interface 93 to the next switching unit 104.

Cells received from another switching unit 104 through physical layer interface 93 and TC layer 92 are processed by switch controller 80. Switch controller 80 identifies the destination for the ATM cell received from switching unit 104 and places it into the appropriate queue area 94 for external transfer or one of the other queues for internal transfer. Switch controller 80 also may receive cells from ADSL line cards 24 through buffer unit 58 as loaded by a recovery unit 96. Cells not in an appropriate ATM cell format are placed into a queue 97 and processed into the proper format by a segmentation and resegmentation (SAR) unit 98. Other types of processing may be performed on ATM cells analyzed by switch controller 80 through a per VC accounting unit 81, a cell discard unit 83, and a usage parameter control policing unit 85. Switch controller 80 may also interface with TDM traffic received from TSI cable 34 through a custom TC layer 87 and a physical layer interface 89. Switch controller 80 may also provide cells for conversion to TDM format to a buffer queue 75. Cells in buffer queue 75 are transferred to a TDM cell layer 77 as determined by a scheduler 79 and then sent over TSI cable 34 through a physical layer interface 73. Switch controller 80 is capable of processing ATM cells and TDM traffic for internal and/or external routing and rerouting of traffic from any place of origination to any place of destination.

A. Overview

Switching subsystem 100 provides daisy chaining of multiple units or shelves. The present invention is described as having nine switching units concurrently, however, any number of intermediate shelves 104i may be implemented. In other words, all the switching units cooperate to implement a distributed switch process and distributed real time control processes including fairness. The daisy chaining queue (bypass) method takes priority over all local queues. In effect each switching unit generates a conformant cell stream where the sum of all the rates from the multiple switching units equal the OC-3 rate. The resultant behavior of the nine switching units is equivalent to a single ATM switching node.

Switching subsystem 100 implements advanced functions that are generally transparent to the data path traffic. A control loop 112 between the switching units 104 permits the switching units 104 to cooperate on the various system functions. The switching units 104 are classified as first, intermediate or last. The first, intermediate, and last switching units 104 generally run similar software, but each of the switching units 104 may have its own unique processes. Switching subsystem 100 is capable of both VP and VC cell routing with support for up to eight or more traffic classes. The control levels provided by the switching subsystem 100 can be grouped into five categories, although other control levels are possible. The five exemplary categories are:

1—instantaneous controls
   cell routing
   selective cell discard (EPD, PPD)
   signaling cell mapping
   cell statistics gathering
   EFCI/CLP marking 2—real time controls
   control process for cell buffer management (to declare congestion states)
   compute fairness primitives (i.e. EPD rates)
   compute queue occupancy
3—hop-by-hop propagation delay controls (or segment-to-segment)
   inter-shelf peer to peer element state signaling (i.e. for fairness process)
4—end-to-end propagation delay controls
   EFCI flow control
5—end-to-end round trip delay controls
   CAC I/F via NMS
   routing provisioning via NMS Switching units 104 cooperate to implement a distributed ATM switch. These switching units 104 can be either co-located or remotely dispersed.

These switching units 104, preferably nine (9) in number, cooperate to implement a single ATM switch node. Different procedures are required in the three types of shelves (first, intermediate, last) to implement the distributed switch functions.

In one embodiment, an asynchronous transfer mode bank channel unit (ABCU) card 22 resident within each switching unit provides the functionality for the distributed MegaSLAM switch. The nine switching units 104 are daisy chained via their corresponding ABCU cards and may reside in different locations.

The logic resident on the ABCU card 22 implements the cell routing function for any ingress cells from either the network OC-3c, the daisy chain OC-3c or the Upstream time division multiplexed (TDM) bus stream. The virtual circuit validation process is a two stage process.

The first stage logic on the ABCU card 22 checks to see if a virtual path (VP) connection is provisioned for this ingress cell. Each ingress interface can be provisioned to support either user to network interface (UNI) or network to network (NNI) interfaces. The virtual path lookup is preferably a linear table where the 8/12 VP bits point to a VP_descriptor. Thus, a table with 256 byte or 4 Kbytes VP_descriptor entries may be used. The VP_descriptor contains the required connection information. If the virtual path lookup is successful, then the cell level processing is implemented by the ABCU card 22 and the cell is forwarded to the appropriate subscriber interface destination. Use of the linear lookup provides for a fast return of a VP_lookup_ failure indication in the event of a virtual path look up failure. Preferably this indication will be provided to the next stage within two clock cycles.

A virtual circuit (VC) lookup sequence is triggered by the VP_lookup_failure indication from the previous state. The virtual circuit lookup is preferably implemented in hardware by a sorted list that supports a maximum of 2K virtual paths. The process starts near the middle of the list and tests to see if the current 24/28 bit virtual circuit bit pattern is equal to, greater than or less than the pattern from the VP_descriptor entry. This hardware test preferably requires 2 clock cycles, or less, to complete. At 50 MHZ, this would permit 25 iterations each requiring 40 ns before the 1.0 μs deadline. For a VC range that is a power of 2, the number of iterations is equal to the exponent plus one ($2^{11}$ supports 2000 virtual circuits which requires 11+1=12 iterations) This design, whether implemented in software, firmware, or an Application-Specific Integrated Circuit (ASIC) may be used in OC-3, OC-12, or other applications. This design further may support applications having 64,000 virtual circuits or more.

If the above two checks failed, then the cell is tested by a third stage that evaluates the cell against 8 registers sets that preferably identify CPU terminated cells. If a match condition is found, the cell is passed to the ABCU card 22 resident CPU. These registers can be programmed to strip operation, administration, and maintenance (OAM) cell, resource management(RM) cells, and other cells, out of the cell streams.

In the event all three lookups fail for the current cell, the cell may be passed via a separate FIFO to the next switching unit 104 in the daisy chain. This permits the switching units 104 to implement the distributed switch process. In effect, each switching unit 104 is programmed to terminate a subset of the virtual circuits for the downstream path. But as a whole all the switching units 104 terminate all the downstream virtual circuits. The last switching unit 104n implements the mis-inserted cell processing function as a proxy for all the daisy chained switching units 104. Thus, the last switching unit 104n acts as a proxy for all exception events for the distributed switch fabric.

The nine distributed switching units 104 cooperate to produce a conformant stream that not only fits into the communication link bandwidth, but at the same time provides fairness to the class of service that is oversubscribing the shared communication link to the CO resident ATM switch. A control loop initiated by the first switching unit 104a preferably provides the primitives necessary to implement the distributed fairness process. The feedback control loop is initiated by the last switching unit 104n and the cell is modified by the intermediate switching units 104. A credit based scheme is implemented and the first switching unit 104a tells all other switching units 104 how many cells they can send for the given control period. The fairness analysis in the first switching unit 104a is undertaken to compute the credits that each switching unit 104 gets for a given control period.

The fairness algorithm will generate conformant streams in each switching unit 104. Each switching unit 104 in the daisy chain treats the upstream daisy chain as the highest priority stream and queues the cell in the Bypass queue. The locally conformant stream is derived from the output side of the Ingress_queue_[7.. 0]. The queues are serviced on a priority basis with a credit based algorithm. The logic on the ABCU card 22 generates the conformant stream by launching the permitted number of cells during the current control period. Assuming the control period is in fact equal to 128 cell times on the OC-3c, then each switching unit 104 is permitted to launch its portion of the 128 cell budget. The credit based scheme guarantees that the physical OC-3 pipe never becomes a bottleneck in any of the daisy chained links.

The fairness algorithm, and its associated credit based control function, for the multiple switching units 104 should be based on a control interval fast enough such that the ingress cell exposure does not consume more than a small fraction of the total buffer resources (say 5% max). It is believed that a stable (non-oscillating) algorithm is possible if the rate of change of the aggregate cell buffers is limited to a small number <5%. The planned aggregate cell buffer is 8K cells. Thus, five percent exposure would be about 400 cells. If the ingress rate is worst case 1.0 us per cell then the control process should be faster than 400 us.

The basic mechanism that permits that upstream algorithm to operate in a distributed manner over the daisy chained switching units 104 is the credit based scheduler in each switching unit 104. The credit based scheduler cooperates with the controller in the first switching unit 104a. The communication of the controlling primitives is accomplished with out of band control cells. One point to multipoint cell is sent in the down stream direction from the first switching unit 104a of all subordinate switching units 104. This downstream cell contains the primitive that defines the credit granted to each switching unit 104. In response to this downstream control cell the last switching unit 104n initiates a feedback status cell that each switching unit 104 modifies which is eventually terminated on the first switching unit 104a. The feedback cell contains one or more primitives that define the congestion status and or queue behavioral attributes of the given switching unit 104.

The upstream buffer resources are organized into a free list of buffers. The size of the buffers is a provisioned parameter but during system run time one fixed size may be used is 64 byte aligned. The size may be 64, 128, 256 or 512 bytes. The cells are mapped into the buffers as 52 bytes. The free list of buffers has three trigger levels plus one normal level they are;

| Congestion Level | Level Intent | Functions |
|---|---|---|
| Level zero (L0) | Normal State | All cell streams are queued and forwarded to target spots |
| Level one (L1) | Trigger status | CLP marking EFCI marking Future ABR procedures or credit based flow control procedures |
| Level two (L2) | Congestion Imminent | discards policies on a selective basis - early packet discard -partial packet discard - fairness algorithm with per class or per group granularity Future enhancements per class or per group differentiated procedures |
| Level three (L3) | Congestion | aggressive discard policies - cell level discards per group or class granularity Goal: at all cost protect the highest priority QoS guaranteed streams. |

If no levels are triggered (i.e. level zero), then all ingress cells are enqueued in the eight queues as a function of the VC_descriptor queue parameter. The eight queues can be serviced with any algorithm with one being a priority algorithm. The cells are then mapped into the OC-3 PHY layer. If level one is triggered, then CLP marking and EFCI marking is implemented on the programmed number of cell streams destined to some of the queues. If level two is also triggered, then level one procedures remain in effect. This is possible because packet level discard will occur before the cells are queued into the respective queue. The EPD procedure operates on ingress cells with port granularity. The total number of EPD circuits implemented are shared among the ingress ports. Each ingress cell is associated with a VC_descriptor and the target queue is defined in the VC_descriptor. The aggregate of all upstream VCI/VPI are evaluated against the active EPD logic elements that are shared with all the ports. These EPD logic elements store the context of the in-progress packet discards. If there is a match, then the EPD or PPD procedure is implemented by the hardware. In other words the cell is not queued in one of the 8 queues. A pipelined implementation is envisioned where the VC_descriptor lookup occurs and a primitive is appended to identify the target queue and source port. The next state in the pipeline evaluates the cell to match it for a discard VCI/VPI in progress for the given port. This means TBD packets destined for one of eight queues can all be in the discard mode until the end of message (EOM) marker state. The action of writing the EPD_cntl[ ] resister sets a go command flag. The initialization of the EPD_cntl[ ] registers is implemented by a write cycle to the register.

The key item here is that each switching unit 104 manages its own congestion state and discard procedures to enforce fairness. Any locally computed status primitives can be encoded and placed into the upstream status cell that is part of the control loop.

The 10 upstream queues are serviced by a controller that launches a predetermined number of cells during the current control period. The upstream controller for the outbound OC-3c services 2 of 10 queues using a priority algorithm while the remaining 8 queues can use a locally defined algorithm. The two queues serviced with the priority algorithm are the Bypass queue and the CPU queue. Each queue is serviced by a scheduler and one provided scheme may be to read each queue until empty before advancing to the next queue. The controller blindly launches all cells from the Bypass queue and the CPU queue since it is assumed that these streams are already conformant and have been previously scheduled by another shelf. The CPU cells are important for real time controls but are considered negligible from a system load point of view. The cells from these two queues are not counted by the controller. The controller is granted a fixed number of credits for the local ingress queue[7. .0] for the current control period. As the controller services these queues, the credit counter is decrement until it reaches zero. At this point, the controller stops and waits for the next control period before launching any more cells. Due to boundary conditions the controller may not reach zero before the end of the control period. The controller, when reinitialized for the next control period, remembers the remainder from the previous period. The controller, during the current period, may first exhaust the counter from the previous period before decrementing the counter for the current period.

The boundary conditions impact the accuracy of the fairness algorithm. It is expected that the delay of remote daisy chained switching units 104 may cause short term bursts from these switching units 104 that appear to be in excess of the allocated credits.

The deadline for feed time controls are about two or three orders of magnitude slower than the per cell deadline. These controls are all implemented by a RISC CPU on the ABCU. The CPU is expected for cooperate with the peer CPUs in other shelves that may exist in a daisy chained configuration.

In the downstream direction, the cells are fanned out to their target switching units 104 via the VC/VP descriptor lookup in each switching unit. In the VC case, the cells are enqueued into either a high priority or a low priority queue that is associated with each drop (or port). The ABCU card 22 is capable of 22 sets of these dual priority queues.

Each queue uses a real time buffer attached to the queue from the free list.

When the downstream direction is in the L0 congestion mode, then all queues get whatever buffer attachments they want.

When the downstream direction is in the L1 congestion mode, then the cells are conditionally EFCI marked and some low priority traffic classes may be CLP marked.

When the downstream direction is in the L2 congestion mode, then a pool of PPD engines are invoked and the controlling software is required to drive these discard engines to fairly discard between all the active low priority queues in the system.

When the downstream direction is in the L3 congestion mode, all cells going to the low priority queue are discarded in all switching units 104.

The process of mapping cells over the shared downstream cell bus is implemented with a provisioned rate adaptation procedures. Feedback over the TDM bus provides the mechanism to ensure that the small FIFO on the line channel card 24 does not overflow or underflow.

Each switching unit 104, on its own initiative, implements the congestion policies and thus each switching unit 104 may be at a different congestion level. It is felt that if sufficient buffer resources are allocated to the downstream path, then interference generated by the upstream path consuming buffer resources can be minimal.

All the slave switching units 104 participate in generating a feedback status cell that is sent to the first switching unit 104a. This cell contains the congestion state, the free list size and future primitives for the downstream direction.

Two types of control cells exist one initiated by the first switching unit 104a and sent to all daisy chained switching units 104 and another generated by the slave switching units 104 and terminated on the first switching unit 104a.

Master generated control cell as mapped into OAM format;

| Octet   | Function                                                                                                                                                                                                  |
|---------|-----------------------------------------------------------------------------------------------------------------------------------------------------------------------------------------------------------|
| 1 . . . 5 | standard ATM header                                                                                                                                                                                       |
| 6       | -4 bits OAM type<br>-4 bits Function type coding TBD                                                                                                                                                      |
| 7 . . . 8 | Control command word,<br>-TBD many contain length of control cycle in cell times etc.                                                                                                                     |
| 9 . . . 24 | credit_cntl [7 . . . 0]<br>8 words of 16 bits contain the credit allowance for each of the 8 daisy chained shelves.<br>octets #9&10 are for the first subordinate shelf etc.<br>octets #23&24 is for the last shelf |
| 25 . . . 46 | spare - for future primitives                                                                                                                                                                             |
| 47–48   | -6 bits reserved<br>-10 bits for CFC-10                                                                                                                                                                   |

The 16 bit control word for each of the slave switching units 104 has the following format, i.e., credit cntl[7..0]

| Bit      | Function                                                                                |
|----------|-----------------------------------------------------------------------------------------|
| 0 . . . 9 | number of cell granularity credits granted by master shelf                              |
| 10 . . . 15 | reserved for future primitives;                                                         |

The first switching unit 104a runs an algorithm that computes the credits as a proxy for all first switching units 104. The first switching unit 104a operates on a fixed control period. A reasonable fixed period may be 128 cell time intervals on an OC-3 link. This period is about 350 μs.

During this time, the first switching unit 104a computes the credits for each of the other switching units 104a. The sum of all credits will be 128 this would include the credits for the first switching unit 104a. The sum of all credits is always equal to the controlling cell internal period.

When the congestion state is L0 or L1 then all switching units 104 are granted credits such that the queue occupancy stays near zero. Since the bursty nature of the ingress traffic is unpredictable at any instance in time, any one switching unit 104 may be getting more credits than another switching unit 104. The goal being that while the system as a whole is in the L0 or L1 state, the algorithm permits large bursts from any switching unit 104. The credits are modulated in a manner such that the switching units 104 get enough credits to empty their queues. For example, it does not make sense to give credits to a switching unit 104 if it is not going to use them. The first switching unit 104a would know this from the free list feedback control word.

Upon receiving the credits, each slave switching unit 104 starts to launch cells into the upstream OC-3c link until its credits are exhausted. The slave switching unit 104 simply remains inactive until the next downstream control cell grants more credits. During the inactive state, the PHY device will insert idle cells into the OC-3c when necessary.

The slave switching unit 104 generated feedback control cell is initiated in the last switching unit 104n excluding the fields of the intermediate switching units 104i which are all 1's. Hardware in the intermediate switching units 104i ORs in its 32 bit feedback word, recalculates the CRC-10 and then sends the control cell to the next switching unit 104. This hardware process shall be completed within less than two cell time intervals. The software is only required to write the 16 bit feedback word at the control interval rate (i.e. for the 128 cell interval this is about 350 us).

Slave switching unit 104 generated status cells are mapped into a following standard OAM format;

| Octet | Function |
|---|---|
| 1 . . . 5 | standard ATM header |
| 6 | -4 bits OAM type<br>-4 bits Function type<br>coding TBD |
| 7 . . . 39 | shelf_status [7 . . . 0]<br>8 words of 32 bits contain the status for each of the 8 daisy chained shelves<br>octets #7 to 10 are for the first subordinate shelf etc.<br>octets #36 to 39 is for the last shelf |
| 4 . . . 46 | spare |
| 47–48 | -6 bit reserved<br>-10 bits for CRC-10 |

The 32 bit status word for each of the slave switching units 104 has the following format, i.e. shelf_status[7..0].

| Bit | Function |
|---|---|
| 0 . . . 9 | free list size;<br>units are soft configurable i.e. 256 bytes per unit |
| 10 . . . 11 | congestive state;<br>0 = level 0,<br>1 = level 1,<br>2 = level 2,<br>3 = level 3, |
| 12 . . . 31 | reserved for future use; |

B. Detailed Overview

1. Logical Architecture

Switching subsystem 100 may be either a deterministic ingress traffic multiplexer that may be distributed over a number of switching units 104 or a statistical ingress traffic multiplexer that also supports a distribution of multiplexer functions over a number of switching units 104. Switching subsystem 100 may also include advanced queuing and congestion avoidance policies. In the downstream direction, switching subsystem 100 support oversubscription with queuing and congestion avoidance policies and is permanent virtual circuit (PVC) based. Switching subsystem 100 uses a centralized shared memory ATM switch fabric. Switching subsystem 100 is preferably capable of supporting an aggregate downstream cell rate of 370,000 cells per second and an upstream burst aggregate cell rate of 222,000 cells/sec for each of nine switching units 104. The aggregate ingress rate for switching subsystem 100 is therefore 2,000,000 cells/sec. The downstream rate supports one full OC-3c.

Thus, the upstream rate supports over-subscription of the OC-3c by a factor of 5.4. The burst upstream rate can be sustained until switching subsystem 100 enters into a congestion imminent state. Cell buffers preferably provide sufficient buffer resources for queuing up to 2×1500 byte packets from the 22 ingress ports per shelf simultaneously. Thus, the architecture preferably supports 22 physical ATM ports in each shelf (i.e. two per slot).

The downstream direction also supports oversubscription. For the most part this is handled by the ATM network including the CO resident ATM switch which is delivering the OC-3c to switching subsystem 100. Switching subsystem 100 supports bursts that exceed the egress bottleneck pipe capacity. In addition, two queues are provided in the downstream direction. One of these queues is intended for step function stream (i.e. UBR etc.) that may be oversubscribed. The other queue would be used for streams that require a guaranteed QoS (i.e. CBR, VBR etc.). As such, the buffers are sized to support up to 1×1500 byte packet per egress port.

The ingress architecture of switching subsystem 100 may be implemented as ingress streams or implemented in preferably 16 queues that can be assigned to up to 16 traffic classes with over-subscription. The traffic classes are organized from highest to lowest priority. Each traffic class can be further subdivided into multiple groups, however, each group preferably requires its own queue. Mixed mode scheduler operation is supported in order to provide MCR>0 for some of the lower priority queues. An example configuration, which utilizes 16 queues, could be four traffic classes where each traffic class has four groups. Switching subsystem 100 may provide a tiered congestion hierarchy and each class of service may be at a different congestion state. When switching subsystem 100 is oversubscribed, the lowest priority traffic class will enter the congestion imminent state. Switching system 100 then implements packet discard policies including early packet discard (EPD) or partial packet discard (PPD). The packet level discard algorithms operate on ATM adaptation layer five (AAL5) traffic streams. If the load offered from the remaining higher priority traffic classes remains within the OC-3 limit, then these traffic classes would not enter the EPD state.

Meanwhile, the lowest priority traffic class has its ingress rate modulated by the fairness process to the excess capacity on the upstream OC-3c. Thus, the access network will deliver nearly ideal quality of service (QoS) parameters (cell delay variation (CDV), CTD etc.) for the higher priority classes. The EPD/PPD process works in conjunction with the fairness process. In effect, the group members of the traffic class, are proportionally affected by packet level discards. Within a given traffic class multiple groups can be provisioned each with a different level of performance. This is achieved by setting up one queue for each group. The congestion policies are applied to the groups that belong to a class of service. However, provisioned parameters permit the performance to vary between the groups. For example, if two groups are provisioned for a class of service (i.e. UBR) and if the UBR class of service enters the EPD state, discards from the two ingress groups may be at different rates. The provisioned parameters for each group controls the EPD discard rate, however, in order to provide minimum throughput for each group member, a bandwidth lower limit parameter is also provided. The architecture supports per virtual circuit assignment to a traffic class and to a group within that traffic class.

Switching system 100 provides daisy chaining for a plurality of switching units 104. In the embodiments described herein, the processes apply nine switching units 104 concurrently, although other numbers of switching units 104 are possible. In other words, the switching units 104 cooperate to implement the fairness process. The daisy chaining queue (bypass) process takes priority over local queues. In effect, each switching unit 104 generates a conformant cell stream where the sum of the rates from the multiple switching units 104 equal the OC-3 rate. This results in nearly identical queuing delays for the switching units 104. Thus, there is no QoS penalty for daisy chained switching units 104.

2. Applications

The following asymmetric and symmetric bandwidths with twisted pair drops based on the ANSI (T1E1) specification, may be advantageously applied in the residential and in other environments:

| Line Code | Downstream | Upstream |
|---|---|---|
| ADSL | 6 Mbps | 0.64 Mbps |
| HDSL | 1.536 Mbps | 1.536 Mbps |

Switching subsystem 100 is flexible and may be characterized to support a downstream rate of 8.192 Mbps and an upstream rate of 2.048 Mbps for each residence or other drop. The specific physical interface to the home, in many cases, will have less bandwidth, and thus switching subsystem 100 is flexible to accommodate the low end rates of 128 Kbps downstream and 128 Kbps upstream. Data rates specified herein are merely exemplary, however, and other data rates may be used as well.

The following table identifies the ITU class of service definitions. Switching system 100 can support classes A, B and C. In addition, the ATM Forum has defined traffic types that map into the ITU classes, which are CBR, rtVBR, VBR, ABR and UBR. Switching system 100 may provide 16 queues that can be assigned to the traffic classes traversing through the access network. Thus, one or more queues could be used by a particular class of service. The queues are organized from highest to lowest priority.

| | Class A | Class B | Class C | Class D |
|---|---|---|---|---|
| ATM Forum defined traffic types | CBR | rtVBR | VBR, ABR, UBR | nil |
| timing relation between source and destination | required | | not required | |
| bit rate | constant | variable | | |
| connection mode | | Connection oriented | | connectionless |

The mapping of any of these traffic classes through switching subsystem 100 is achieved by a connection admission control (CAC) process. The CAC process should provision the channels, with their associated attributes, only when the QoS can be guaranteed to the user. Thus, the behavior of switching subsystem 100 depends on the CAC process.

3.1 Architecture Introduction

This architecture follows the spirit of GR-2842-CORE ATM Service Access Multiplexer Generic requirements. Switching subsystem 100 provides features and enhancements not required by the GR-2842-CORE. The enhancements include statistical multiplexing and virtual path/circuit switching capabilities. In a network implementing switching subsystem 100, preferably the ATM switches will use the Virtual UNI functions. In effect, the ATM switch terminates the signaling streams as defined in GR-2842-CORE and acts as a proxy Connection Admission Control (CAC) entity for switching subsystem 100. In addition, although not strictly required, the ATM switch should provide a Usage Parameter Control (UPC) (policing) function for the virtual UNI drops resident in the switching subsystem 100.

Switching subsystem 100 implements advanced functions that are generally transparent to the data path traffic. A control channel between switching units 104 permits the switching units 104 to cooperate on the various system functions. The switching units 104 are classified as first, intermediate or last. The first, intermediate, and last shelf classes generally run similar software, but each of the classes may have its own unique processes. The architecture is capable of both VP and VC cell routing with support for up to eight or more traffic classes. The control levels provided by the MegaSLAM can be grouped into five categories although other control levels are possible. The five exemplary categories are:

1—instantaneous controls
   cell routing
   selective cell discard (EPD/PPD)
   signaling cell mapping
   cell statistics gathering
   EFCI/CLP marking
2—real time controls
   control process for cell buffer management (to declare congestion states)
   control process for UPC of ingress streams (with virtual circuit granularity)
   compute fairness primitives (i.e. EPD/PPD rates)
   compute queue occupancy
3—hop-by-hop propagation delay controls (or segment-to-segment)
   inter-shelf peer to peer element state signaling (i.e. for fairness algorithm)
4—end-to-end propagation delay controls—EFCI flow control 5—end-to-end round trip delay controls
CAC I/F via NNIS
routing provisioning via NMS 3.1.1 Over-Subscription and MegaSLAM Architecture Rationale The downstream interface between the ATM switch 12 and switching subsystem 100 is implemented over an OC-3c pipe. This pipe can be over-subscribed by a back end ATM network associated with the ATM switch 12 and its associated Connection Admission Control process (CAC). The CAC process running in the ATM switch 12 would be able to grant bandwidth resources on this OC-3c substantially in excess of the OC-3c pipe capacity. The process would preferably rely on statistical methods to define the upper limit of its bandwidth assignment. For example, the CAC process may provision 200 user channels, each with a PCR of 1.5 Mbps, which would result in a worst case bandwidth load of 300 Mbps. However, due to statistical loading, the actual normal offered load on the OC-3c may be in the 100 Mbps range or less. In this case, no cell discards would occur in the CO resident ATM switch 12.

However, periodically, for the high demand periods during the day, an overload situation may exist for the 200 downstream user sources in this embodiment. In this case, the user sources may attempt to load the backbone ATM network to 200 Mbps or more. For the UBR traffic case, the TCP/IP protocol with its inherent rate reduction algorithms would slow down the user sources until a reasonable ratio of successful packets are getting though telecommunications network 10. In effect, the user sources in this embodiment would slow down to an aggregate rate that is approximately equal to the bottleneck rate (in this case the OC-3c pipe). Therefore, the downstream direction can be greatly over-subscribed while still delivering acceptable level of performance to each user port. If the backbone ATM network supports advanced discard policies (e.g. EPD), then the system throughput would be maximized. This is due to the one for one relationship between the discarded AAL5 packet and the TCP/IP layer packet retransmit.

Switching subsystem 100 sees the oversubscribed load (from the 200 user sources) offered on the downstream OC-3c pipe. The ATM switch 12 would fill the OC-3c, and any cells in excess of the 150 Mbps rate would be discarded by the ATM switch 12 when its buffers overflow. Fundamentally, the ATM traffic classes can be grouped into two types of streams. The predictable, traffic-shaped streams (e.g., CBR, VBR) and unpredictable, fast-rate-of-change streams (e.g., UBR, ABR). In the downstream direction, the MegaSLAM delivers the predictable traffic-shaped streams in a deterministic manner, which guarantees delivery of these cells over the bottleneck PHY. The CAC process preferably ensures that the traffic-shaped streams remain within the bandwidth bounds of the bottleneck link. Therefore, to a high degree of certainty, no cell discard events can occur through switching subsystem 100 with respect to the traffic-shaped streams. Note: Cell level discard is preferably avoided, since the discarded cells invoke packet level retransmits at packet sources, which results in an increase in the ingress rate that can quickly cause severe congestion.

The remaining unpredictable, fast-rate-of-change cell streams, which frequently are step function rate of change streams, are lower priority. Sufficient buffer capacity is preferably provided to absorb packet size bursts, but when the buffer resources are exhausted then these streams will invoke the congestion policies such as cell discard. This approach protects the traffic-shaped stream from the unpredictable behavior of the fast-rate-of change streams. For any one virtual circuit the peak cell rate (PCR) parameter for step function streams can be set at any value including values that exceed the bottleneck PHY port rate.

Ideally, there may be multiple virtual circuits, each with a PCR=PHY rate. The 64 "goodput," or actual throughput for the application, achieved over the PHY port would be a function of the traffic pattern, buffer resources, and congestion policy. A system user may empirically tune the system parameters relating to buffer size, traffic pattern, and congestion policy. The system is preferably optimized using EPD/PPD, with the system goodput preferably being in the range of 70% to 100%.

Over-subscription is desirable for the downstream circuits due to the largely client server architectures that most applications require. In the Internet case, high-bandwidth, content-rich Web pages are downloaded to the client in response to low-bandwidth upstream requests. A typical Internet application might have an optimal ratio of downstream to upstream bandwidth of about 10:1. Thus, for the client server applications, statistical multiplexing in the upstream direction would generally not be required, because the upstream link would be partially filled. For other applications, however, a ratio of downstream to upstream bandwidth may vary down to a 1:1 ratio. These applications may be web servers that are serving a web page to a remote client. In addition, if low speed symmetrical links predominate like HDSL at 384K or 768K then, over-subscription in the upstream direction becomes very beneficial. Due to the unpredictability of future applications and market demands, switching subsystem 100 preferably supports both upstream and downstream over-subscription, addressing both asymmetric or symmetric bandwidth applications. Switching subsystem 100 is intended to provide maximum flexibility. Therefore, switching subsystem 100 can evolve to address future applications.

Over-subscription in the upstream direction has been conceived to support up to 16 different types of traffic streams. The streams could be assigned to different traffic classes or groups within a traffic class. This provides the network provider the flexibility to tariff customized services. For example two of these streams could be used for a VBR service each providing a different guaranteed minimum cell rate when the network gets congested. A distributed (daisy chained) fairness process controls the behavior of the multiple switching units 104. The process enforces the fairness and ensures that the upstream flows are compliant with the OC-3c bottleneck rate.

3.2 Top Level Functionality

This section provides a top level overview of the MegaSLAM system. All specifications set out herein are, however, merely exemplary. Other useful configurations are envisioned.

3.2.1 System Capabilities

Switching subsystem 100 may provide the following capabilities;

downstream bandwidth of approximately 370,000 cells/sec upstream bandwidth of approximately 222,000 cells/sec for each shelf (uncongested state), which equates to an aggregate bandwidth of approximately 2,000,000 cells/sec for a 9 shelf system.

4096 downstream and upstream virtual path or circuits. This equates to 2048 full duplex communication channels downstream cell buffer capacity of 2K to 8K cells as stuffing options upstream cell buffer capacity of 2K to 8K cells as stuffing options upstream and downstream oversubscription Efficient memory management, dynamic sharing of memory resources between queues four-state congestion management. The states are: normal, congestion signaling, congestion avoidance with fairness, aggressive congestion avoidance.

support for ITU traffic classes and distinct groups within these traffic classes.

3.2.2 Top Level Interfaces

Switching subsystem 100 interface to the ATM switch 12 is capable of both UNI and NNI cell formats. The mode is selected via a provisioning parameter. The daisy chain interface between switching units 104 is capable of both UNI and NNI cell formats. The mode is selected via a provisioning parameter. The switching subsystem 100 interface to the ports within each switching subsystem 100 supports UNI cell format. The ABCU card 22 interface to the Cell Bus provides a routing scheme that supports 60 slots with approximately four ports per slot or more. One code is reserved for broadcasting to the cards (i.e. OFFH) and is intended for embedded functions like software download.

In the upstream direction, the SBI interface 36 to the SBI bus on the ABCU card 22 will support either Cell granularity payload or SBI with DS-O granularity payload (i.e., legacy TDM traffic). The ABCU card 22 will provision each upstream point-to-point TDM bus with one of these modes. In addition logic will be provided on the ABCU card 22 that maps cells into SBI granularity streams that are mapped over the time slot interchange (TSI) cable to the existing digital loop carrier system 20. For example, the DS-1 payload can be transported to a customer premises equipment (CPE) through the existing TDM infrastructure. For this example, the transport of the ATM cells is transparent to the existing digital loop carrier 20 equipment and the CPE equipment is used to terminate the ATM protocol stack.

Similarly, the ABCU card 22 will provide the capability to source downstream SBI-rate cell streams over the existing SBI bus. Then, both the SBI upstream and downstream bus can be used to transport a T1-cell-mapped payload over an existing TDM network to remote CPE equipment, which then terminates the T1 cell compatible payload. In this case, the existing T1 line cards are reused to support communications protocols including ESF format and B8ZS line code.

Implementation of the designs may be through any combination of ASIC (Application Specific Integrated Circuits), PAL (Programmable Array Logic), PLAs (Programmable Logic Arrays), decoders, memories, non-software based processors, or other circuitry, or digital computers including microprocessors and microcomputers of any architecture, or combinations thereof. One embodiment preferably has a single upstream queue and a single, provisionable, fixed-rate scheduler that launches cells into the OC-3 trunk. In addition, the data structures leave room for future expansion.

3.2.3 Downstream Top Level Flows

The congestion buffer management policy for this direction is preferably a two state policy, where the two states are normal (uncongested) and congested.

The cell arriving from the ATM switch 12 is evaluated against the 2000-virtual-circuit database resident on the ABCU card 22 in the first switching unit 104a. If a match is found, then the cell is forwarded to the appropriate port on the current switching unit 104a. If no match is found, the cell is forwarded to the daisy chain OC-3c link. This approach reduces the cell rate on each hop in the daisy chain. Some of this free bandwidth may be used by control cells on the peer-to-peer inter-switching unit signaling channel. The interleaving of these control cells is expected to be about one control cell every 128 cells. Thus, a control cell is sent every 350 $\mu$s. A byte-wide hardware register preferably supports provisioning of the control cell rate in the range of 32 cells to 2048 cells with 8 cell granularity.

Switching subsystem 100 expects that the scheduler in the ATM switch will queue cells on the OC-3c with reasonable time domain characteristics. Important ATM WAN network parameters are cell delay variation (CDV) and cell clumping characteristics. These parameters will limit the buffer requirements for the two ABCU card 22 resident queues for each egress link. The average rate for the downstream VC should normally be constrained by a given peak cell rate. Thus, the average downstream cell rate should not exceed the capacity of the physical medium. However, real-time cell arrival variations are preferably accommodated by FIFO queues resident on the ABCU card 22, two for each egress port. For rate adaptation purposes, the egress line cards will also provide a single FIFO buffer on each port to accommodate the inter-arrival time variations resulting from the shared downstream cell bus and the feedback state signaling over the TDM cell bus (about 8 cells). Thus, the large centralized queues are implemented on the ABCU card 22 and the smaller FIFOs on the ADSL line card 24 are tightly coupled with the ABCU card 22 to guarantee the bus level cell transfer behavior.

Cell clumping for ATM switched networks is not well understood by the industry. It is a function of switch loading and number of switches in the path of the VC. The large difference between the ingress and egress link rate maximizes the problem. For example, with two orders of magnitude difference between OC-3 ingress and T1 egress it would be possible to receive multiple cells from the OC-3 link during one T1 link cell time (about 275 us). The severity of this cell clumping is not well understood, but if near zero cell loss ratio (CLR) is a goal, then the buffer sizing should accommodate the worst case scenario. In addition, multiple UBR virtual circuits could be provisioned with PCR=drop port line rate (e.g., TI). For this case, the sum of the ingress OC-3 rate can far exceed the T1 link egress rate. Thus, these classes of service require a separate queue. In effect each downstream port has a high priority and a low priority queue.

ATM switch 12 may produce on the order of ±3 ms worth of cell clumping, which means the cells may arrive 3 ms ahead or behind the ideal cell position. This suggests that 6 ms worth of cells can arrive at nearly the same time on the OC-3c. The conforming streams will be queued into the high priority queue. The following buffer sizes are preferred in this embodiment, although other buffer sizes are possible:

| Downstream Line Rate | High priority Buffer Size for 6 ms clumping | Low priority Buffer Size for step function PCR Burst |
|---|---|---|
| 6.0 Mbps | 84 cells | 64 cells |
| 1.536 Mbps | 22 cells | 32 cells |
| 256 Kbps | 4 cells | 32 cells |

In one embodiment, buffers may be shared between ports based upon a statistical allocation, resulting in a significant memory savings.

The high priority buffer is preferably used for conformant (i.e. traffic shaped) streams. Examples would include CBR and VBR. The low priority buffer is used preferably for step function streams like UBR (or flow controlled streams like ABR). A buffer of 32 cells is sufficient for 3×500 byte packets or one 1500 byte packet (64 cells provides double the number of packets). The high priority buffers may never overflow, thus a discard policy may not be for this queue. The low priority buffers may be implemented with a dynamic buffer sharing process having, for example, a total downstream buffer size of 8000 cells. The high and low priority buffers for the ports share this pool dynamically. The maximum buffer occupancy of the high priority streams is approximately equal to the worst case cell clumping event. The normal buffer occupancy for the high priority streams would preferably be low. Thus, the bulk of the 8000 cell buffer would be available for the step function UBR streams or flow controlled ABR streams.

The discard policy in the downstream direction for the low priority buffers may be early packet discard (EPD) or partial packet discard (PPD).

The PPD process monitors the downstream low priority buffer and implements a random cell discard for a cell that is in the discard eligible state but saves the context. The PPD logic then searches for other cells that belong to the same packet and discards each of them through to the end of the packet. A number of Discard logic circuits may be shared between the virtual circuits. A centralized pool of discard logic blocks can then be allocated to perform PPD discards for a large number of egress virtual circuits. The EPD process is similar to the PPD process but it searches for a packet boundary before starting to discard the next packet. This packet boundary for AAL5 is indicated by the EOM cell.

Discarding traffic at the network egress is an undesirable network characteristic. Most networks should be engineered by the carriers such that statistical multiplexing and other procedures at the network ingress discards the necessary traffic. Due to the desire to maximize the efficiency of networks, avoiding the egress network discards may not be possible. For example, the egress bottleneck may be oversubscribed by step function streams such that the sum of the PCR exceeds the capacity of the downstream pipe. (e.g., 6 Mbps ADSL pipe shared among 10 UBR virtual circuits each with a PCR of 1 Mbps)

The scope of downstream fairness is between the active VCs going to the same drop, since this is the bottleneck that is being shared between the VC's. Therefore, each downstream drop may be in a different congestion state as a function of the load offered by the network. The memory management process may use a shared cell buffer pool. However, in order to prevent one drop from using more than its fair share of buffer resources, an upper limit will be enforced on the queue size for each of the drops.

If the downstream cell is not decoded by the ABCU local lookup procedures, then it is by default bypassed to the daisy chained OC-3 port. All ingress cells in the downstream directory are evaluated by the ABCU card 22 validation lookup procedure, and if it is a valid cell destined for one of the local ports then the per VC accounting policy may be enabled. This policy may supersede any discard procedure in order for MCR to be greater than 0. The EPD or PPD discard process is implemented before the current cell gets to a queue. Thus, for MCR to be greater than 0 for a given virtual circuit, the discarding of a given VC should not be permitted until its minimum throughput level has been reached. After this point, discards on the VC is permitted.

3.2.4 Upstream Top Level Flows

The cell arriving from each port is evaluated against the 2000 virtual circuit database resident in the switching unit 104. If a match is found, then the cell is queued for eventual forwarding on the OC-3c port on the current switching unit 104. If no match is found, the cell is discarded, but these discard events are logged. The supported number of ingress ports is preferably 22. The ingress burst cell rate generally is limited by the slotted SBI bus rate. For the 60 busses, this rate is 222,000 cells/sec. Therefore, the cell processing time is about 4.5 $\mu$s. The rate that the cells are launched into the OC-3c is a function of the fairness process. Multiple switching units 104 share the upstream OC-3c to the ATM switch, and as such each shelf generates a conforming cell stream. The sum of the conforming cell streams, one from each shelf, when summed will be less than or equal to the OC-3c rate. Thus, daisy chained OC-3's are partially filled. Some of this free bandwidth may be used by the upstream peer-to-peer inter-switching unit signaling channel for transfer of control cells. The interleaving of these control cells is about one cell every 128 cell slots. Thus, a control cell is sent every 350 $\mu$s. Preferably, the upstream feedback cell is only generated in response to the downstream command cell sent from the first switching unit 104a in switching subsystem 100.

The congestion buffer management policy may be a four state policy that implements an effective congestion avoidance process. Another congestion policy may be a single state policy implemented without congestion avoidance processes. Thus, when the buffer resources are exhausted the ingress cells are discarded.

The buffer management will preferably be statically (rather than dynamically) provisioned for an aggregate ingress buffer size. However, within this aggregate buffer, the ports can share this pool. The static provisioning prevents interaction between the upstream and downstream directions. The buffer management is preferably fully dynamic where the buffer resources are shared between upstream, downstream and bypass ports.

The cell arriving from the plural ports are first recovered from the TDM bus by a double buffered cell FIFO. As soon as a complete cell is recovered from the TDM bus, a cell available state is indicated by the logic. A round robin scanner then queues the ingress TDM-recovered cells for VP_descriptor processing. This logic checks that the VC is valid, translates the ATM header, adds one or more additional control fields, and forwards the cell to one of the queues.

ABC card 22 may use a single upstream queue and a single, provisionable, fixed-rate scheduler that launches cells into the upstream OC-3. The fixed-rate scheduler for each switching unit 104 should be provisioned to consume a subset of the upstream OC-3, which represents the particular switching unit 104 portion of the total upstream bandwidth. For example, if the total upstream bandwidth for a four switching unit 104 is limited to 50%, then the fixed-rate scheduler in each switching unit 104 should be provisioned for 12.5%. Bursts, for a given switching unit 104 in excess of the 12.5% would thus be absorbed by the single queue in each switching unit 104. However, the burst duration should be small due to the QoS impact in the composite single queue. This approach enforces an open loop fairness scheme where a limited amount of oversubscription can be tolerated.

It is also possible to provision the fixed-rate schedulers on the switching unit 104 to the same value (for example 50%) of the OC-3. For this mode, the switching units 104 still share the 50% bandwidth, although, any one switching unit 104 may burst up to 50%. This may be achieved for example by a counter mechanism where each switching unit 104 is responsible to monitor the upstream traffic from the downstream switching unit 104. Any one switching unit 104 can only fill the upstream pipe to the maximum provisioned. The behavior in this case would be less fair if the available upstream bandwidth (in this example 50%) is oversubscribed. A limited amount of oversubscription would tend to favor the last switching unit 104n in the daisy chain. If, however, it is never oversubscribed, then the single queue in the upstream direction is always virtually empty. In general, the last shelf empties its queue by injecting its cells into the upstream slots. Unused slots would be filled with idle cells. The next switching unit 104 in the daisy chain empties its queue by injecting its cells starting after the last occupied cell slot until its queue is empty (these are the idle cell slots). This process continues until the switching units 104 are done.

The delay of the data path cells is not a function of the number of daisy chain hops. The delay is primarily a function of the conformant stream generation logic in each switching unit 104. This delay is incurred once per data path (i.e. virtual circuit). The resultant delay is therefore nearly identical regardless of switching unit 104 location in the daisy chain configuration.

An example application of the use 16 assignable queues for the ingress streams is shown in the following table.

| | |
|---|---|
| Ingress_queue_0 to 7 | spare queues |
| Ingress_queue_8 | UBR with fair performance |
| Ingress_queue_9 | UBR with good performance |
| Ingress_queue_10 | VBR with MCR = 64 Kbps |
| Ingress_queue_11 | VBR with MCR = 128 Kbps |
| Ingress_queue_12 | VBR with MCR = 256 Kbps |
| Ingress_queue_13 | VBR with guaranteed 100% throughput |
| Ingress_queue_14 | real time VBR |
| Ingress_queue_15 | CBR |

In the above example queue 8 & 9 are used to support two different UBR groups. Both groups are always in the same congestion state. When the system is in the uncongested state (normal state) both groups operate identically. However, when oversubscribing, both UBR groups would frequently be in the congestion imminent state with the early packet discard (EPD) process active. The two groups can then be provisioned with different discard rates.

Figure 5:
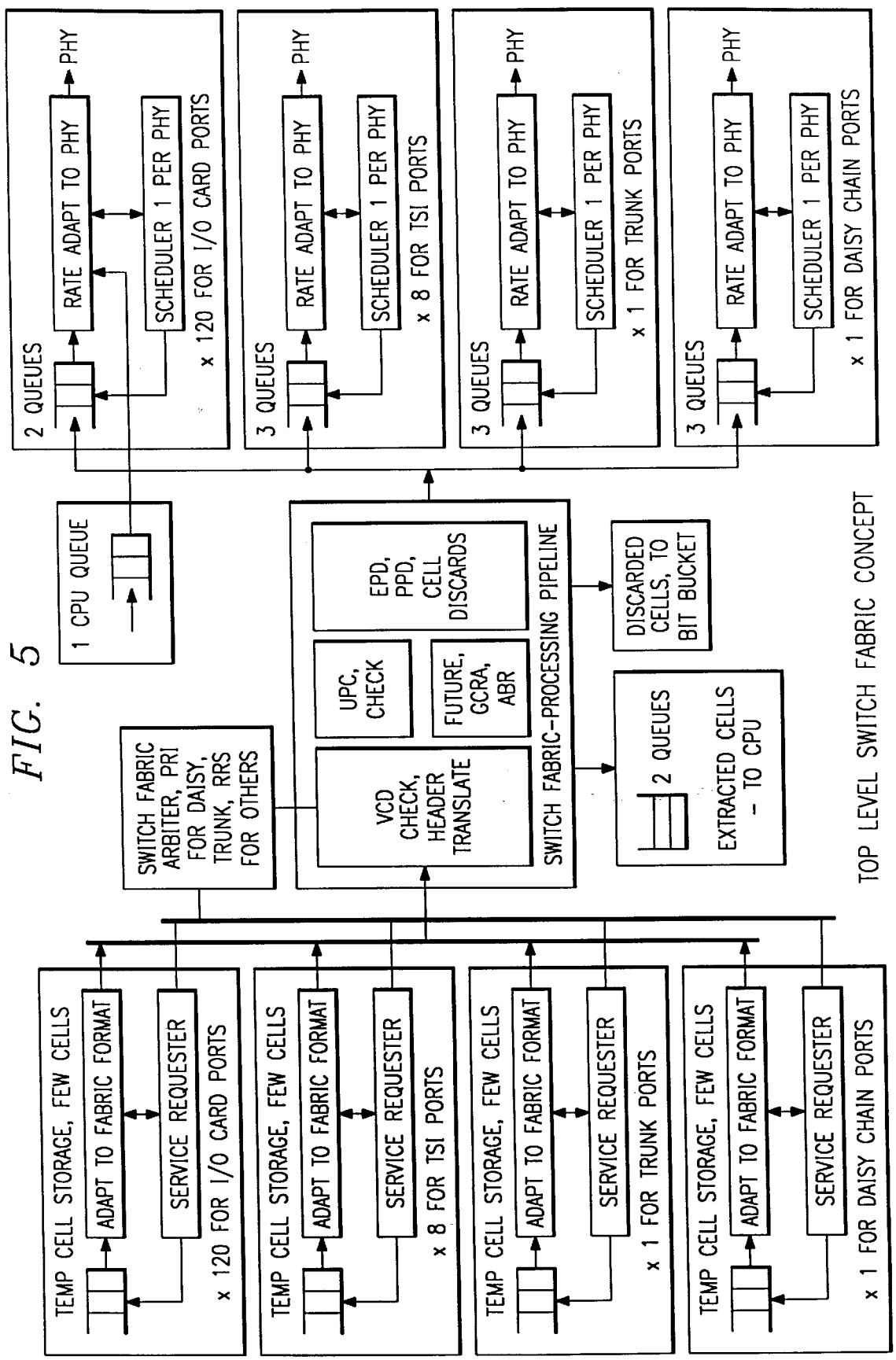
FIG. 5 illustrates a block diagram of a top level memory fabric of the switching subsystem.

The cells are removed from the 18 queues based on the provisioned scheduler process and are forwarded to the OC-3c. The back end logic then generates a conformant OC-3c stream. FIG. 5 provides a block diagram of memory queuing fabric of switching subsystem 100.

The fairness process will generate conformant streams in each switching unit 104. Each switching unit 104 in the daisy chain treats the upstream daisy chain ingress stream as the highest priority stream and queues the cell in the Bypass_queue. The locally generated conformant stream is derived from the output side of the Ingress_queue—[15..0]. A credit based process defines the number of cell slots that a given shelf may use, and the scheduler determines which queues get serviced. The logic on the ABCU card 22 generates the conformant stream by launching the permitted number of cells during the current control period. Assuming the control period is equal to 128 cell times on the OC-3c, then each shelf is permitted to launch its portion of the 128 cell budget. The credit based scheme keeps the physical OC3 pipe from becoming a bottleneck in any of the daisy chained links.

The fairness process, and its associated credit based control function, for the multiple switching units 104 should be based on a control interval fast enough such that ingress cell exposure does not consume more than a small fraction such as approximately 5% of the total buffer resources. It is believed that a stable (non-oscillating) process is possible if the rate of change of the aggregate cell buffers is limited to a small number i.e. <5%. The planned aggregate cell buffer size is 8K cells. Thus, five percent exposure would be about 400 cells. If the ingress rate is worst case 1.0 us per cell then the control process should be faster than 400 us.

Various implementations of the candidate fairness process are possible. The implementation may be based on free list size (buffers available). In addition, a more advanced process may include a free list rate-of-change parameter. The process could also be based on individual queue occupancy. The overall goal of the process should be to provide satisfactory fairness between the multiple switching units 104. In some embodiments an error ratio of ±5 percent may be acceptable.

The problem becomes more complicated when significant delay exists between the switching units 104 in the daisy chain configuration. If the fairness process control interval is 350 $\mu$s, and the round trip delay to the S switching units 104 is significant, then the control processes on the switching units 104 will be phased with respect to each other. The phasing is expected to be about 160 $\mu$s for a 10 mile optical link. Reserving cell buffers for the maximum in-flight cell exposure expected between the phased switching units 104 in the system may help to ensure sufficient buffer space.

Ingress cells in the downstream directory are evaluated by the ABCU card 22 circuit validation lookup procedure, and if there is a valid cell destined for one of the local ports then the per VC accounting policy may be enabled. This policy may supersede any discard procedure in order for MCR to be greater than 0. The EPD or PPD discard process is implemented before the current cell gets to a queue. Thus, for MCR to be greater than 0 for a given virtual circuit, the discarding of a given VC should not be permitted until its minimum throughput level has been reached. After this point, discards on the VC is permitted.

3.3 Instantaneous Cell Controls

The instantaneous cell control procedures that are applied on a cell-by-cell basis. Examples would include decisions as a function of the ATM cell header. Also, instantaneous memory management decision fall under this category. This would include taking a buffer from the free list and appending it to a queue.

3.3.1 Signaling and Virtual Path Cell Routing

The signaling VCs from each of the end users can be tunneled through switching subsystem 100 to the CO resident ATM switch 12. The tunneling approach maps the default user signaling virtual circuit (VC=5, VP=0) to the ATM switch 12 as a function of the provisioned VP_descriptor, which translates the address toward the ATM switch (the approach may be VC=5, VP=geographic slot address+port number). The value VP=0 is preferably not used. The scheme may support up to four interfaces per card or more. The CO ATM switch 12 UNI treats each of these virtual circuits (VC=5, VP=x) as signaling channels. Switching subsystem 100 does not terminate the signaling channels. The mapping function for the signaling streams is implemented by the VCI/VPI header translation logic for the supported 2000 virtual circuits. Thus, each port consumes a single virtual circuit translation resource for the signaling channel mapping to the UNI on the CO-resident ATM switch 12.

The ILMI channel from each UNI port are also tunneled through switching subsystem 100 to the CO-resident switch. The ILMI circuit (VC=16, VP=0) is remapped using the scheme identified for signaling remapping above. Thus, the CO ATM switch 12 sees VC=16, VP=X. Therefore, each port consumes a single virtual circuit translation resource for the ILMI channel mapping to the UNI on the CO resident ATM switch.

In one embodiment, the well-known VCs (VC=0 to 31) could be tunneled to the ATM switch 12, although this could impair switching subsystem 100 access to these VCs.

Within the VP address range, switching subsystem 100 is provisioned for the required number of PVCs. In the event SVC support is required, the mapping scheme described above (for the signaling channel) could also be used to provide SVC capabilities. This is referred to as VPI tunneling, and each user port is mapped to the ATM switch 12. This scheme uses the VPI address bits to uniquely identify each user. If a virtual path connection is provisioned in the VP_descriptor, then only the VPI bits are used to route the cells between each user and the ATM switch 12. The remaining VCI bits are available for SVC/PVC connections to the user end points. In this implementation, preferably the virtual path connections are unique and no virtual circuit connections will reside with the VP address range (i.e., the VP_descriptors are mutually exclusive). For the virtual path scenario, the CAC process runs in the ATM switch 12 and provisions circuits, PVC or SVC, using the VCI field.

The mapping function for the signaling cell routing is implemented by a hardware VC-descriptor sorted list lookup on the ABCU card 22. The ABCU card 22 resident CPU maintains a database that provisions the VC_descriptor of the ingress streams from the I/O cards and a second VP_descriptor for the egress cell stream from the ATM switch 12. This database can be provisioned in cooperation with the virtual UNI resident in the ATM switch 12. The virtual UNI in the ATM switch 12 terminates the Q.2931 signaling streams.

In addition, the interface to the ATM switch 12 port can be provisioned to support the NNI cell header format. In this case, the mapping scheme defined above is extended to support more VPs per shelf and N daisy chained shelves.

3.3.2 Data Path Cell Routing

Switching subsystem 100 preferably provides a conformant cell stream (i.e., a cell stream within characterized bounds) for the downstream and upstream data path for each end user (UNI). Switching subsystem 100 uses the mappings in support of the virtual UNI within the ATM switch 12. The switching subsystem 100 policies and processes provide the control necessary to achieve the conformant behavior. Also, a percentage of nonconforming ingress traffic from one or more user(s) can be tolerated without affecting the QoS of conforming users. The ATM switch 12 and switching subsystem 100 are expected to cooperate via the NMS so that both entities have the access to the required database of information.

3.3.2.1 Downstream Protocol

The logic resident on the ABCU card 22 implements the cell routing function for any ingress cells from the network OC-3c, the daisy chain OC-3c, or the Upstream TDM bus stream. Virtual circuit validation is a two stage process.

The first stage logic of the virtual circuit validation process checks to see if a VP connection is provisioned for this ingress cell. Each ingress interface may be provisioned to support either UNI or NNI interfaces. The virtual path lookup is preferably a linear table where the 8/12 VP bits point to the VC-descriptor. Thus, a table with 256 byte or 4000 byte VC_descriptor entries would be used. The VP_descriptor contains the required connection information. If the virtual path lookup is successful, then the cell level processing is implemented, and the cell is forwarded to the appropriate destination. This linear lookup is fast and VP_lookup_failure indication preferably should be signaled to the next stage within a few clocks.

The virtual circuit lookup sequence is triggered by the VP_lookup failure indication from the previous state. The virtual circuit lookup is preferably implemented in hardware by a sorted list that supports 4000 or more virtual paths. The process starts near the middle of the list and tests to see if the current 24/28 bit virtual circuit bit pattern is equal to, greater than, or less than the pattern from in the VC_descriptor entry. This hardware test is fast, preferably producing a result within 2 clock cycles. At 50 MHZ, this rate permits 25 iterations of 40 ns per iteration within the 1.0 us deadline. For a VC range that is a power of 2, the number of iterations is equal to the exponent plus one (e.g., $2^{11}$ supports 2K virtual circuits which requires 11+1=12 iterations). This performance may allow this architecture to be reused in future OC-12 applications while supporting 64000 virtual circuits or more.

The virtual circuit and virtual path lookup procedure preferably utilizes the same database structure named VP_descriptor. The ingress cell arriving from any port is evaluated by the VP lookup sequence first, and then a VC lookup is performed. The first successful event halts the process. Successful events invoke the header translation procedure on the permitted number of bits and the enqueuing procedure for the target queue. Any VC that falls within the reserved range (i.e. the first 32 VCs) can be passed from the main (or first) switching unit 104a to the CPU of switching subsystem 100. One approach would be to terminate these VCs in the main (or first) switching unit 104a, which could act as a proxy for the other switching units 104 in the switching subsystem 100. In addition, any inband cell that has special attributes defined in one of the control fields can cause this cell to be stripped out of the data path. Examples for this case are an ABR RM cell or an end-to-end OAM cell.

In the event the current cell is not decoded by a given switching unit 104, then it is passed via a separate FIFO to the next switching unit 104 in the daisy chain. If, however, a current cell is not decoded in the last switching unit 104n, then this state is preferably flagged and the miss-inserted cell is passed via a separate FIFO to the CPU of switching subsystem 100.

Upon finding a valid VP or VC cell, the logic preferably writes the cell to one of the target queues. The target queue address is provided by the VCD. Each queue is built from a linked list of buffers, which are anchored by the queue descriptor. In memory, the cell consists of 52 octets, excluding the HEC octet. A buffer descriptor may be used to create the linked list for each of the queue descriptors. When a cell is eventually broadcast on the downstream bus, a routing tag is added to identify the target port. Since there is a one for one association between the queues and the ports, the scheduler can blindly generate this routing tag.

Each ADSL line card 24 preferably provides one register set for each port on the ADSL line card 24. The register may be used to determine whether or not the port needs to capture the cell on the downstream bus. The word coding scheme is set out in the control word format. A second register is provided for system specific communication (e.g., software download). A third default value may be implemented on each port card. This third default value is preferably reserved for system specific broadcast communication.

The queue structure in the ABCU card 22 supports a backplane flow control scheme between the FIFOs on the ABCU card 22 and the ADSL line cards 24. Preferably, the FIFO size on the ADSL line cards 24 is minimized such that these control cards can be implemented in ASIC. Most Utopia devices provide a two or a four cell FIFO; thus, the deadline for service in the preferred embodiment is one cell time for the PHY devices.

The feedback scheme from the ADSL line cards 24 is implemented over the upstream point to point slotted TDM cell bus. The worst-case cell rate in the downstream direction is a function of the rate adaptation circuit. The rate of the feedback scheme determines the optimal size of the local cell buffer. The design goal is to minimize the local cell buffer size, preferably keeping it within 4 or 8 cells without compromising performance).

3.3.2.1.1 Congestion and Discard Policy

The downstream buffer resources are preferably organized into a free list of buffers. The size of the buffers is a provisioned parameter, but during system run-time a single fixed size would be used. The size may, for example, be 64, 128, 256 or 512 bytes. The cells are mapped into the buffers, for example, as 52 bytes. The free list of buffers has three trigger levels plus one normal level, which are set out in the table below.

| Congestion level | Level Intent | Functions |
| --- | --- | --- |
| Level zero (L0) | Normal state | All cell streams are queued and forwarded to target ports |
| Level one (L1) | Trigger status signaling | CLP marketing<br>EFCI marking<br>Future BAR procedures or credit based flow control procedures |
| Level two (L2) | Congestion Imminent | discards policies on a selective basis<br>early packet discard<br>partial packet discard<br>fairness process with per class or per group granularity<br>Future enhancements per class or per group differentiated procedures |
| Level one (L1) | Congestion State | EFCI marking<br>Discards policies on a selective basis<br>early packet discard<br>partial pa<br>granularity<br>packet discard<br>with per class or per group granularity<br>discard CLP marked cells |
| Level three (L3) | Congestion | aggressive discard policies<br>cell level discards per group or class granularity.<br>Goal: at all cost protect the highest priority<br>QoS guaranteed streams. |

If level zero (L0) is active, then the ingress cells are enqueued in the queues as a function of the VC-descriptor queue parameter. The queues are serviced by a scheduler, which may provide service policies. In the event any VC or VP connection exceeds its provisioned rate, then CLP marks the cell. The per connection accounting processing function is done in conjunction with the VC/VP lookup for the current cell. If level one is triggered, then EFCI marking is implemented on the programmed number of virtual circuits destined to the low priority queues. In addition, if level one (L1) is triggered, then the EPD/PPD procedure operates on an ingress cells for the low priority queue. The total number of EPD/PPD circuits implemented are shared among the egress ports. Each egress cell is associated with a VP_descriptor and the target queue control function is defined in the Q_descriptor (QD).

The aggregate of the upstream VCI/VPI are evaluated against the active EPD logic elements that are shared with the ports. These EPD logic elements store the context of the in-progress packet discards. If there is a match, then the EPD or PPD procedure is implemented. In other words, the cell is not queued in the target low priority queue. A pipelined implementation is preferably used wherein the VC-descriptor lookup occurs and a primitive is appended to identify the target queue and source port. The next state in the pipeline evaluates the cell to match it for a discard VCI/VPI in progress for the given port. TBD packets destined for one of the queues thus can be in the discard mode until the end of message (EOM) marker state. The EOM cell itself may or may not be discarded. The action of writing the EPD_cnt[ ] register sets a go command flag. The initialization of the EPD_cnt[ ] registers is implemented by a write cycle to the register.

While the system may be at one congestion state, the drop PHY port queue may be at a different state. Therefore a second level of congestion, namely the port congestion, exists in the downstream direction. The free list is fairly managed in a manner that gives the two downstream queues access to system resources during the uncongested system state. Each queue, however, is preferably limited in the buffer resources that it can consume. In the event the queue runs out of buffer resources, then the queue preferably defaults to cell level discard at the queue ingress.

Switching subsystem 100 supports both VP and VC connections. The EPD/PPD discard strategy is preferably used when the streams are encoded using AAL5 or a similar scheme. Otherwise, the system preferably performs cell level discards only when that stream exceeds its permitted rate. The VP connections consist of unknown VCs and provide a statistically multiplexed traffic stream that remains within some bandwidth limit. Thus, it is reasonable to discard cells if the VP stream exceeds these limits. In the VC case, on a per VC basis, the system may be provisioned with the AAL attribute when the PVC connection is established. Therefore, only the AAL5 (or similar) encoded streams are candidates for the EPD and PPD discard strategy. Other VC streams are preferably managed with cell level discards.

3.3.2.1.2 Downstream Traffic Shaping

Figure 6:
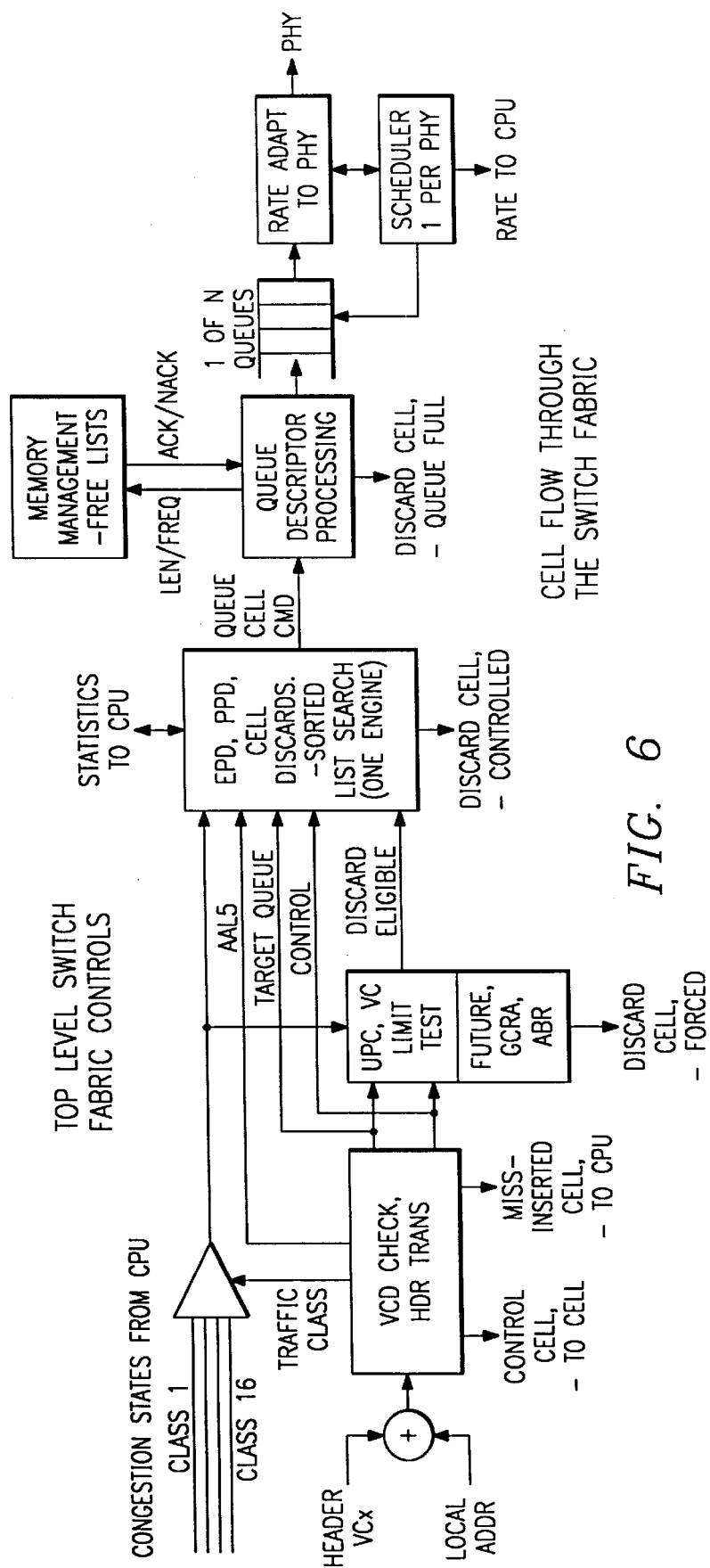
FIG. 6 illustrates a block diagram of the fabric controls of the switching subsystem.

FIG. 6 shows a block diagram of the fabric controls for ABCU card 22. The ABCU card 22 preferably provides a programmable timer based rate adaptation circuit to traffic-shape the flows to the ADSL line cards 22. The purpose of the circuit is to rate adapt the switch fabric cell rate to the port cell rate. A set of registers is provided on the ABCU card 22 to provision the scheduler rate for each of, for example, 60 ADSL line cards 24 (×2 for the number of ports per card). Two bits are preferably used to control the rate adaptation circuit for each port. The two bits may be encoded as follows;

| bit_value[1..0] | traffic shaper rate (Mbps) | Cell Repetition rate (us) |
| --- | --- | --- |
| 3 | 16.384 | 26 |
| 2 | 8.192 | 52 |
| 1 | 4.096 | 104 |
| 0 | 2.048 | 208 |

Slower rates are generally not needed because the feedback scheme over the cell slot mapped TDM bus is preferably expected to be fast enough such that at most two cells get queued for rates below 2.048 Mbps. This scheme in effect reduces the burst cell rate to each ADSL line card 24. Thus, it will be possible to minimize the size of the FIFOs on the ADSL line cards 24 and at the same time guarantee full throughput without entering the FIFO overflow or underflow state.

ADSL line cards 24 with different PHY capabilities may be used and depending on the ADSL line card's 24 throughput and FIFO resources, software may be used to provision the cell rate for each PHY drop. For example, an ADSL line card 24 that has a single ADSL interface which runs at 6 Mbps downstream would use the 8.192 Mbps cell rate. An ADSL line card 24 that has two HDSL interfaces running at 1.544 Mbps would use the two separate traffic shaped streams running at 2.048 Mbps rate.

The timers for the rate adaptation circuit are preferably designed such that they are not all expiring at the same time. In other words, multiple reset (or parallel load) phases may be implemented, possibly four or eight phases. Timers may be split between these phases.

The rate adaptation circuit signals the scheduler for each port with the state of the port buffer on each module. The scheduler for each port can then provide a cell to the port as a function of its provisioned criteria. If a cell is not delivered to the PHY port before the pipeline starves, then the ABCU card 22 TC layer function will insert an idle cell on the port. This is normal behavior when, for example, a portion of the bandwidth of the port is being utilized.

In one embodiment, the downstream 150 Mbps broadcast cell bus may be queued up to 22 cells simultaneously for the cell bus. Thus, the last cell would observe a 333 us delay and this may underflow the small FIFOs on the ADSL line cards 24. The queuing system preferably self-corrects in this condition; however, the cell bus is preferably faster than OC-3 and should be about 450,000 cells/sec. This should provide sufficient capacity above the 370,000 cell/sec OC-3c rate. Modeling can be done to ensure that the shared cell bus achieves the time domain characteristics necessary to maintain 100% port efficiency.

3.3.2.1.2.1 Scheduler

In an embodiment, the two queues for each of the up to 120 ports are controlled by a basic scheduler. The scheduling method is preferably selectable for two modes. Mode 1 is a simple priority, where the high priority queue always gets serviced first if a cell exists in this queue. Mode 2 is a modified simple priority, where the high priority queue normally gets serviced, first, however, the scheduler can periodically force that a cell gets serviced from the low priority queue. The rate is based on a timer which resets when one cell gets removed from the low priority queue and when it expires then the low the priority queue is permitted to send one cell downstream. Preferably in this embodiment, the MCR is greater than 0 for the aggregate streams in the low priority queue. The rate scheduler granularity is preferably N×8 Kbps. The scope of the rate control function applies to the L1 congestion state. Each scheduler counts the number of cells sent to its port. The software may read this register and the CPU read cycle will clear the register to zero. The data may be used by the discard PPD/EPD engine to evaluate whether or not the queue should be discard eligible.

3.3.2.1.3 Encapsulated Cell Format

The ingress cells arriving from any port on the ABCU card 22 are preferably converted to a 56 byte format shown in the following table. This format only has meaning while the cell is in the pipeline and is being evaluated for a routing decision. After being evaluated, the cell is then written to memory and the format within the memory may be different. The VP and VC lookup uses that format to evaluate the current ingress cell. The HEC code has been stripped out of the stream. It is the responsibility of the PHY layers on each interface card to recalculate and insert the HEC field at every egress port.

| Address (Hex) | Description |
| --- | --- |
| 00–03 | Control word |
| 04–07 | ATM header |
| 08–37 | ATM 48 byte payload |

This encapsulated cell format is generally used on the ABCU card 22 for cell flows. The upstream TDM flow, which contains a basic routing tag identifying the source port, is converted to this format. The slot number is not encoded since the dedicated point to point SBI bus is sufficient to define the source slot. The downstream shared bus uses this format. Ingress cells from the two OC-3 ports are also converted to this format.

The VP and VC lookup circuit(s) generally use between 8 and 28 bits from the ATM header and 8 bits from the control word when evaluating the current cell. In this embodiment, the VP lookup has a maximum of 20 bits and the VC lookup has a maximum of 32 bits. The 32 bits are sufficient since the ports are restricted to UNI capability. (i.e. 24+8)

3.3.2.1.3.1 Control Word Format

When receiving cells from the many drops, uniqueness is preferably guaranteed for the streams. As such, the cell assembler logic that is recovering the cell from the SBI bus provides an overhead byte (or multiple bytes) that provides the source port and slot number. The VC and VP lookup uses this information to evaluate the current ingress cell. An example conflict is the signaling VC=5 from the ports; each one of these VCs will be remapped to a unique VCI/VPI value. These cells are then forwarded to the OC-3 toward the CO resident ATM switch 12. This switch can then uniquely identify the signaling channel from each of the ports of switching subsystem 100. An exemplary set-up using a single overhead byte is set out in the table below.

| Bit | Description |
| --- | --- |
| 0–7 | source_port[ ]; |
| | 0–119 is shelf local port address |
| | 120–239 - reserved for shelf ports |
| | 240 - CPU address |
| | 241–247 - spare |
| | 248–250 - reserved for trunk ports |
| | 251 - trunk port (upstream daisy chain, OC-3) |
| | 252–254 - reserved for bypass ports |
| | 255 - bypass port (downstream daisy chain, OC-3) |
| 8–31 | spare |

3.3.2.1.3.2 Memory Subsystem

The memory subsystem may, by way of example, be implemented in a 32 bit or 64 bit wide memory subsystem. The encapsulated cell format may be selected to easily map into either (or another) memory width. A 64-bit-wide single memory subsystem is preferred. For the 64-bit-wide scheme, one 64 bit control word and 6×64 bit payload words can be mapped into memory. In a cache implementation, this approach may fit into one or two standard cache line(s) depending on the line size of the cache microprocessor. Therefore this approach advantageously utilizes the memory access efficiency. Preferably, the upstream and downstream flows are unified such that future local switching between the flows is possible. For example the ATM layer could crossconnect two ports on the ABCU card 22.

In some applications, the downstream and upstream flows may be kept separate. In such an application, the ATM switch 12 behind switching subsystem 100 would preferably perform the aforementioned switching task. The preferred embodiment, however, is to use switching subsystem 100 as a switching platform wherein switching subsystem 100 behaves as an ATM switch.

3.3.2.1.4 TDM network with ATM Transport

In one embodiment, the interface to the TSI cable can source up to eight T1, ATM-formatted streams. These streams may be transported over the digital loop carrier 20 TDM infrastructure to new CPE equipment that terminates the ATM protocol. The TDM network and any cross-connects in the path generally comply with these rules:

1—T1's are in clear channel, i.e. 8 bits in every DS-0 available.
2—drop T1's are in ESF format with B8ZS line code.
3—cross-connects are implemented such that the differential delay for the 24 DS-0's is the same.

With this approach, the TDM network can be provisioned to transport ATM. If, however, the legacy T1 card is resident in switching subsystem 100, then the digital loop carrier 20 TSI TDM switch cross-connects the 24 DS-0's and routes them back to the switching subsystem 100 resident T1 card. In this mode of operation, the SBI bus in switching subsystem 100 operates in a TDM framed mode.

In one embodiment, the 8 T1 ATM interface circuits on the ABCU card 22 generate the ATM compliant payload for the 24 DS-0 channels without the framing bit. The ATM interface circuits map cells into the TDM frame structure, HEC CRC generation, and idle cell insertion. They may also implement some ATM layer OAM policies, such as the 1.610 and AF-xxxx policies. This may include loopbacks, alarm signaling etc. The ATM HEC framer will comply with 1.432 policy.

3.3.2.2 Upstream Protocol

Preferably, the ADSL line cards 24 in the upstream direction receive ATM cells from the PHY layer device and queue two cells for mapping over the TDM bus. One cell is assembled in memory while the other is sent over the TDM bus to the ABCU card 22. The TDM bus in this embodiment runs slightly faster than T1 rates, thus, it will take about 240 µs to transfer one cell over the TDM bus. The extra overhead, if sufficient, can be used for circuit emulation service (CES) encapsulation of a T1 stream. Once a cell is available in its entirety, then the cell is placed in the OC-3c TDM Cell Fifo on a first come first serve basis.

The ABCU card 22 will receive up to, for example, 60 concurrent cells over the TDM slotted bus. An ID tag is also transferred over the TDM bus to indicate which port the cell came from. This ID tag is also used when more than one port is implemented on an ADSL line card 24. After receiving a complete cell from the TDM slotted bus, then the next logic stage validates the cell and provides any translation before the cell is forwarded to one of the 16 queues for eventual relaying on the OC-3c link.

The FIFO logic on the ABCU card 22 that buffers the 60 distinct cell streams also shares a common FIFO that terminates on the local CPU bus. This FIFO is used to queue OAM cells, signaling cells, and other cells to be terminated by the local CPU. Encoded with the exemplary 52 byte cell is additional overhead, including, for example, the port number the cell was received from. The VCD lookup process is also required to scan the 60 TDM cell assembly buffers for valid overhead cells that require removal from the cell stream. The queue intended to pass these cells to the CPU should be large (e.g., 32 cells). Even though the control/signaling cell rate is slow, it is possible that multiple control cells arrive simultaneously from many ports.

Similar to the downstream direction, the data path logic in the upstream protocol implements a two stage routing decision. First the VP routing stage is invoked, followed by the VC routing function in the event the VP stage failed. In the event non-provisioned cells are contained within any upstream path, they can be forwarded to the local CPU via a separate queue. The routing function on the ADSL line cards 24 may be encoded as a single byte upstream control field which may be appended, for example, to the 52 byte ATM cell. The HEC code is preferably not transported over the TDM bus. The upstream control bits may, for example, be mapped as follows;

| Upstream control Byte (bits) | Description |
| --- | --- |
| 6..7 | spare |
| 2..5 | fifo_status[] - one bit for each channel card FIFO, when bit = 1 then room for a cell when bit = 0 then no<br>bit 2 for channel 1,<br>bit 3 for channel 2,<br>bit 4 for channel 3,<br>bit 5 for channel 4, |
| 0..1 | port_addr[] (i.e. max. 4 PHY I/Fee Statements per cards) |

The cell assembly unit on the ABCU card 22 for the upstream paths will append the geographic address field and other information to conform with the encapsulated cell format. The ADSL line card itself generates the port address field. As stated, the VP and VC routing decision for the data path may be made as a function of the relevant VCI/VPI bits from the cell header. However, the header alone does not normally ensure the cell came from a unique port. Thus, the geographic address and the port ID information is used to uniquely identify the source of the cell. The VCI/VPI field in the cell header does not guarantee that each UNI will use different values (e.g., ports might use the same signaling channel VPI/VCI). These control or signaling cells may be stripped out of the stream and presented to the CPU.

The queue structure in the ABCU card 22, which assembles the cells for the streams, supports a backplane rate adaptation scheme between the FIFOs on the ADSL line card 24 and the ABCU card 22. The ADSL line card 24 will inject data cells onto the TDM slotted bus, but when its FIFOs are empty then idle cells will be sent. The ABCU card 22 performs a proprietary scheme to ensure cell delineation over the TDM bus. This scheme will discard any idle cells that are mapped onto the TDM bus for rate adaptation purposes. The implementation goal on the ADSL line card 24 is to utilize a small buffer for the cells and to optimize throughput over the TDM slotted bus. Preferably, these functions will be implemented in an ASIC on the ADSL line cards 24, although other hardware, software, and firmware implementations are possible. Most Utopia devices provide a two or a four cell FIFO. Thus, the PHYs should preferably be serviced within one cell time.

3.3.2.2.1 Congestion and Discard Policy

The upstream buffer resources are organized into a free list of buffers. The size of the buffer is a provisioned parameter, but during system run time one fixed size may be used, which is preferably 64 byte aligned. The size may, for example, be 64, 128, 256 or 512 bytes which equates to 1, 2, 3 or 4 cells. The cells are mapped into the buffers as 52 bytes. The system level congestion state is primarily a fraction of the free list of buffer. The free list of buffers preferably has three trigger levels plus one normal level, according to the below table.

| Congestion level | Level Intent | Functions |
|---|---|---|
| Level zero (L0) | Normal state | All cell streams are queued and forwarded to target ports<br>CLP marking - f(x) of VC_accounting |
| Level one (L1) | Trigger status signaling | EFCI marking<br>ABR procedures or credit based flow control procedures |
| Level two (L2) | Congestion Imminent | discards policies on a selective basis<br>early packet discard<br>partial packet discard<br>fairness<br>process with per class or per group granularity<br>discard CLP marked cells |
| Level three (L3) | Congestion | aggressive discard policies<br>cell level discards per group or class granularity.<br>Goal: protect the highest priority QoS guaranteed streams. |

If no levels are triggered (i.e., level zero) than ingress cells are enqueued in the 16 queues as a function of the VP_descriptor queue parameter. The 16 queues are serviced as a function of the scheduler process. The cells are then mapped into the OC-3 PHY layer (consult the conformant stream generation section). If the cell stream exceeds its VC accounting limit, then the cell may be CLP marked. If level one is triggered, then EFCI marking is implemented on the programmed number of cell streams destined to some of the queues. If the VC or VP exceeds its VC accounting limit, then CLP marking may be implemented. If level two is also triggered, then level one procedures remain in effect. This is possible because packet level discard will occur before the cells are queued into the respective queue. The EPD procedure operates on ingress cells with port granularity. The total number of EPD circuits implemented are shared among the ingress ports. Each ingress cell is associated with a VP_descriptor and the target queue is associated with the Q_descriptor. The aggregate of upstream VCI/VPI are evaluated against the active EPD logic elements that are shared with the ports. These EPD logic elements store the context of the in progress packet discards. If there is a match, then the EPD or PPD procedure is implemented by the hardware. In other words, the cell is not queued in one of the queues (preferred of queues=16). A pipelined implementation may be used wherein the VC-descriptor lookup occurs and a primitive is appended to identify the target queue and source port. The next state in the pipeline evaluates the cell to match it for a discard VCI/VPI in progress for the given port. This means TBD packets destined for one of the queues can be in the discard mode until the end of message (EOM) marker state. The EOM cell can be provisioned or discarded. The action of writing the EPD-cntl[ ] register sets a go command flag. The initialization of the EPD-cntl[ ] registers is implemented by a write cycle to the register.

While the system may be at one congestion state, each of the upstream queues of the OC3 PHY port may be at a different congestion state. Therefore, a second level of congestion exists in the upstream direction, namely the OC-3 port congestion. The free list preferably is fairly managed in a manner that gives active queues access to system resources during the L1 and L2 system congestion state. However, each queue will have a limit on the buffer resources that it can consume. In the event the queue runs out of buffer resources, then the queue will default to cell level discard at its ingress.

Switching subsystem 100 supports both VP and VC connections. The EPD/PPD discard strategy is preferably used when the streams are encoded using AAL5 or a similar scheme. Otherwise, the system preferably performs cell level discards only when that stream exceeds its permitted rate. The VP connections consists of unknown VCs and provide a statistically multiplexed traffic stream that remains within some bandwidth limit. Thus, it is reasonable to discard cells if the VP stream exceeds these limits. In the VC case, on a per VC basis, the system may be provisioned with the AALx attribute when the PVC connection is established. Therefore, only the AAL5 (or similar) encoded streams are candidates for the EPD and PPD discard strategy. Other VC streams are preferably managed with cell level discards.

3.3.2.2.1.1 Congestion Control State Machine

The state machine behavior for the four congestion levels is:

IF L then
   No congestion policies implemented end; end;
IF L1 then
   EFCI mark egress cells going to queues that are programmed with EFCI enable in the VP_descriptor.
   CLP mark egress cells going to queues that are programmed with CLP enable in the VC_descriptor end;
IF L2 then
   EFCI mark egress cells going to queues that are programmed with EFCI enable in the VC_descriptor.
   CLP mark egress cells going to queues that are programmed with CLP enable in the VC_descriptor
   If ingress cell is CLP mark ed then discard cell.
   Else If ingress cell is a current EPD or PPD candidate then discard Else queue cell end; end;
IF L3 then
   EFCI mark egress cells going to queues that are programmed with EFCI enable in the VC_descriptor.
   CLP mark egress cells going to queues that are programmed with CLP enable in the VP_descriptor
   If ingress cell is CLP marked then discard cell.
   Else If ingress cell is step function type then discard Else queue cell end end;

3.3.2.2.2 EPD State Machine

EPD state machines preferably operate in parallel. Only one of these EPD state machines will find a match. Software should never program two EPD state machines for the same VC or VP. For ingress streams, only one state machine can be assigned to any one ingress TDM slotted cell stream. This helps to ensure that when the state machine on its own initiative finds a EPD candidate that no contention problem exists with another EPD state machine.

For ingress cells from the OC-3c the EPD/PPD state machine can be assigned to any one of the (preferably 22) sets of egress queues.

```
Do for Ingress Cell
    Do Case - Go command
    Case Search
    If last cell = COM and current cell = EOM then
        declare start_packet
        reset timer
    else
```

-continued

```
    declare ***
  end
  Case Discard
  If current cell = match parameters
    then
      discard cell
      increment cell counter
      reset timer
      If current cell is EOM then declare end-
      Packet end
    end
  End Case;
  If timer expired halt and report to CPU
  If end_packet then report status word to CPU
end;
```

3.3.2.2.3 Conformant Stream Generation

The upstream queues are serviced by a controller that launches a predetermined number of cells during the current control period. The upstream controller for the outbound OC3c services the upstream queues using a priority algorithm. Each queue is read until empty before advancing to the next queue. The controller blindly launches cells from the bypass_queue, and the CPU_queue since it is assumed that these streams are already conformant and have been previously scheduled by another shelf. The CPU cells are important for real time controls but are of little importance from a system load point of view. The cells from these two queues are not counted by the controller. The controller is granted a fixed number of credits for the local ingress_queue[7..0] for the current control period. As it services these queues, the credit counter is decremented until it reaches zero. At this point, the controller stops and waits for the next control period before launching any more cells. Due to boundary conditions, the controller may not reach zero before the end of the control period. The controller, when re-initialized for the next control period, remembers the remainder from the previous period. The controller during the current period may first exhaust the counter from the previous period before decrementing the counter for the current period.

The boundary conditions impact the accuracy of the fairness process. It is expected that the delay of remote daisy chained switching units 104 may cause short term bursts from these switching units that appear to be in excess of the remote shelf credits.

Schedulers count the number of cells sent to the port. The software will read this register and the CPU read cycle will clear the register to zero. The data may be used by the discard PPD/EPD engine to evaluate whether or not the queue should be discard-eligible.

The single data path queue, the bypass queue, and CPU queue are serviced by the scheduler. The scheduler uses a simple priority process where the CPU queue gets the highest priority, the bypass queue gets the second highest priority, and the single data path queue gets the lowest priority.

3.3.2.2.3.2 Release Two Scheduler

For a multiple data path queue configuration, the data path queues plus the bypass and CPU queue are serviced by the scheduler. The scheduler may be selectable for modes which may include, for example, a first mode having a simple priority, where the highest priority queues are serviced first if a cell exists in this queue. In this mode, low priority queues may not get serviced if the higher priority stream consumes the bandwidth resources.

A second move may be a mixed mode, where simple priority is used for N of the highest priority queues. And after these N queues are empty, round robin select for the remaining queues.

A third mode may be a mixed mode, where simple priority is used for N of the highest priority queues, but a timer interrupt for any of the lower priority queues may force that these queues get a turn. The rate scheduler is based on a timer, which resets when one cell gets removed from the low priority queue. If the timer expires, then a low priority queue is permitted to send one cell downstream. This scheme helps ensure that MCR>0 for the aggregate streams in the low priority queue. The rate scheduler granularity is N×32 Kbps. The scope of the rate control function applies to the L2 congestion state. At the D congestion state, the scheduler can be disabled or can remain active.

3.3.2.2.4 Upstream Channel Card Buffering

The upstream ADSL line card 24 buffers are preferably designed to minimize delay. This is especially important for the low rate upstream rates (e.g., 128 Kbps). Thus, buffering 4 or 8 cells will preferably not be used.

A preferred approach is to buffer one cell and to start the transfer over the TDM bus at the next cell slot opportunity. A standard Utopia interface is preferably not used if it results in 2 or more cell queuing delays.

In one embodiment, the transfer of a cell over the TDM slotted bus is started before the whole cell has arrived in the local buffer. This can the thought of as a pipeline.

In applications where very low rate ingress streams occur, it may be desirable to use octet level control rather than cell level controls to minimize delay parameters. This choice will affect the preferred SBI bus cell transfer protocol.

3.3.2.2.5 TDM network with ATM Transport

The interface to the TSI cable can preferably sink up to eight or more T1, ATM formatted streams. These streams may be transported over the digital loop carrier TDM infrastructure to the switching subsystem 100 that terminates the ATM protocol. The TDM network and any cross-connects in the path preferably comply with the following rules:

1—T1s are clear channel, i.e., 8 bits in every DS0 available.

2—drop T1s are ESF format with B8ZS line code.

3—cross-connects effect the same differential delay for all of the 24 DS0.

With this approach, the TDM network can be provisioned to transport ATM. If, however. the legacy TI card is resident in switching subsystem 100, then the TDM payload is preferably first routed to the digital loop carrier TSI TDM switch. This TSI switch cross-connects the 24 DS-0's and routes them back to the ABCU card 22. This mode of operation requires that the SBI bus in MegaSLAM operates in a TDM framed mode.

The 8 T1 ATM interface circuits on the ABCU card 22 terminate the ATM-compliant payload for the 24 DS-0 channels, not including the T1 framing bit. The main functions are framing on ATM cells, checking HEC, and idle cell extraction. It may also be necessary to implement some ATM layer OAM policies. (see 1.610 and AF-xxxx) This may include loopback detection and alarm signaling detection. The ATM HEC framer will comply with 1.432.

3.3.2.2.6 Usage Parameter Control

Switching subsystem 100 has per VC accounting to optimize throughput during the congestion imminent state. In addition, switching subsystem 100 will provide the following policing process selectable on a per VC or VP basis:

GCRA—the dual leaky bucket process for VBR
peak cell rate monitor for UBR
ABR compliant rate monitor
fixed rate monitor for CBR UPC e.g., policing, GCRA, fixed rate and time varying rate also an aggregate per port rate.

3.3.3 Data Structures

The following subsections define the data structures shared by the upstream and downstream flows. These data structures provide the key primitives by which the architecture performs real time tasks that have very short deadlines. In many cases, the deadlines are less than 1.0 $\mu$s.

The real time software (or alternatively firmware or hardware) provides various services to the data structures. The tasks are real time, but the deadlines are generally more relaxed by two orders of magnitude or more over a cell time which is 2.76 $\mu$s for an OC-3. Deadlines in the range of 300 $\mu$s to 1.0 ms will be normal for the software tasks.

3.3.3.1 Connection Control

In one embodiment, a unified data structure is defined for virtual circuit and virtual path connection control. This data structure is called the Virtual Circuit Descriptor (VCD). This architecture defines a two stage look up strategy where first the ingress cell is evaluated for a VP connection and then for a VC connection. Software provisions VPs and VCs mutually exclusive on a per port basis. The MegaSLAM switch fabric appends an overhead field that guarantees uniqueness, even if the address in the ATM cell header does not. Therefore ports can freely utilize any VP or VC address.

3.3.3.1.1 Virtual Circuit Controls

The virtual circuit cell routing process requires the implementation of a database. The data structure used for this routing decision is the Virtual Circuit Descriptor (VC descriptor, VCD). When the cell arrives from an ingress port its header contents are evaluated to determine if this is in fact a valid VCI/VPI, and routing information is appended to the cell such that the hardware can route the cell to the correct port.

The routing defining in VCD preferably supports any target queue on a given shelf. Therefore this approach supports fully functional switch fabric. This means any ingress cell can be sent to any queue including the local CPU. Local switching will be required in some embodiments, but in others cell routing will be limited to the upstream and downstream directions. Also, the ABCU itself may be a single shared memory subsystem that combines the upstream and downstream cell flows. Therefore it possible in some embodiments to forward any cell to any port (i.e. local switching).

Per VC accounting and per VC queuing control is preferably implemented with the VC-cell_cnt[ ] field in the VC descriptor. The purpose of these controls are to provide means to support MCR>0 for a given VC when the system enters the congestion imminent state (L2for Release Two upstream or L1 for downstream). The field is incremented for each cell that is successfully enqueued. A background software task modifies the Time-stamp[ ] field when necessary to prevent roll over errors for each of the 2000 virtual circuits. The system time base counter increments at double the system frame rate or preferably 250 $\mu$s. This rate represents roughly a 9 cell exposure at the OC-3 rate. For this time base rate, rollover events for the 14 bit counter occur approximately every 4.1 seconds. Another field, VC_limit[ ], defines the number of cells that are to be enqueued per unit time interval before the given virtual circuit become eligible for discard policies. If the VC_limit[ ] field is programmed to zero, then the cells are eligible for discard policies. A global control bit VC_discard, when set, enables discards for a given virtual circuit. Assuming the port rate is 8 Mbps, then the 8 bit counter will overflow in 13.2 $\mu$s. This time period is sufficiently long, since the entire 8000 cell buffer can transition from the empty to full state in about 22 $\mu$s. Per VC accounting provides a means to enable discards, thus the real time control process is preferably at least an order of magnitude faster than the range of the resource the process is attempting to control. Assuming a 2000 cell buffer storage range for the congestion imminent state (L2), then the control process should run at 5.5 ms/10 or about 550 $\mu$s.

3.3.3.1.2 Virtual Path Controls

When virtual paths are provisioned, then controls are preferably implemented on these streams to prevent them from consuming switch fabric resources beyond some predefined limits. This helps ensure stability of the overall switch fabric.

One embodiment is to treat all VC streams that reside in the VP address range as one class of service. One approach would be to use four VPs per drop, one for each class of service. Another approach is to provision two VPs per drop, one containing the predictable streams and the other containing the step function streams. A single VP per drop poses some difficulty, since oversubscription of the step function streams (UBR, ABR) causes the QoS of the traffic shaped streams to be degraded.

In the two queue model embodiment per drop that was previously defined, each port is preferably restricted such that any provisioned VP is mutually exclusive to all VC's on the same port.

The virtual path circuits may be oversubscribed, however the switch fabric preferably will prevent these streams from monopolizing the buffer resources. The software may set arbitrary upper limits on each VP stream. The per VC accounting controller may be used to limit a VP stream to a maximum throughput per unit time.

As long as the VP streams remain within the throughput bounds defined by the per VC accounting, then the traffic is preferably not discarded while the fabric is in the congestion state. If, however, the VP exceeds its rate, then cell level discards will preferably be implemented on these streams. Discard policies for VP's are generally cell based. Since the fabric generally does not have VC visibility, the EPD/PPD AAL5 discards are probably not useful.

3.3.3.1.3 Virtual Circuit Descriptor

An exemplary format of one word of the VC descriptors is as follows:

| Bit position | Function |
|---|---|
| bit 0..5 | target_queue[ ];<br>downstream (16 - low priority queue, 17 - high priority queue)<br>upstream (0 - ingress_queue[0] . . . 15 - ingress_queue [15])<br>CPU (30 - pass cell to CPU)<br>bypass = 31 |
| bit 6..12 | spare - enough address space for per VC queuing |
| bit 13..20 | target_port[ ];*** add TSI port address to map ***<br>0–119 is shelf local port address<br>120–239 - reserved for shelf ports<br>240 - primary CPU address<br>241 - secondary CPU address (delivery not guaranteed)<br>242–247 - spare<br>248–250 - reserved for trunk ports |

-continued

| Bit position | Function |
| --- | --- |
| | 251 - trunk port (upstream daisy chain, OC-3) |
| | 252–254 - reserved for bypass ports |
| | 255 - bypass ports (downstream daisy chain, OC-3) |
| bit 21..24 | traffic_class[]; |
| | 0–15, user definable scheme switch fabric uses |
| | these bits to select the congestion state for the up |
| | to 16 traffic classes. |
| bit 25 | aa15 - when 1 then stream consists of AAL5 type1 when 0 then unknown type. |
| bit 26 | en_oam - enable terminating of inband OAM cell when 1 |
| bit 27 | en_clp - enable CLP marking when 1 |
| bit 28 | en_efci - enable EFCI marking when 1 |
| bit 29 | vc_mode - when 1 then VC mode, when cleared to 0 then VP mode |
| bit 30 | nni_mode - when 1 then NNI mode, when 0 then UNI mode |
| bit 31 | conn_valid - connection is valid when = 1 |
| | - when 0 then h/w ignores cell but bypasses trunk cells to daisy chain. Others are passed to CPU queue. |

An exemplary format of another word of the VC descriptors is as follows:

| Bits | Function |
| --- | --- |
| bit 0 | en_EOM_discard, when 1 then signal EOM discard state to packet discard engines. when 0 then signal do not discard EOM cells to packet discard engines. |
| bit 1..3 | spare |
| bit 4..31 | hdr_value[] - the header translation value of the VPI/VCI field |

An exemplary format of another word of the VC descriptors is as follows:

| Bits | Function |
| --- | --- |
| bit 0..3 | spare |
| bit 4..31 | hdr_mask[] - header translation mask value of the VPI/VCI field 1's mask translation and forces setting of bit |

An exemplary format of yet another word of the VC descriptors is as follows:

| Bits | Function |
| --- | --- |
| bit 0..7 | VC_cell_cnt[] - counts the number of cells enqueued per unit time |
| bit 8..15 | VC_limit[] - defines the limit after which the cells become discard eligible. |
| bit 16..29 | Time_stamp[] - defines the last time a cell was processed h/w updates when cell processed s/w task prevents roll over errors |
| bit 30 | Force_discard - when 1, discards [all] cells when VC_limit is exceeded. When 0, [all] cells are forwarded to next stage. |
| bit 31 | en_VC_discard - when set to 1, then enables discards. This VC can enter the discard eligible state. When 0, this VC is always in the discard ineligible state. |

3.3.3.2 Memory Management

The ABCU provides centralized queues that are allocated buffer resources. The buffer resources preferably are fixed granularity memory blocks of provisionable size of 64, 128, 256 or 512 bytes. The cell is mapped into these blocks as, for example, a 52 byte entity. Each cell consumes a 64 byte block leaving 12 bytes unused. The overhead is 4 bytes for the header. Note the HEC octet has been removed at the TC layer on each port.

Each queue is implemented as a simple FIFO queue. The queue consists of a linked list of buffer descriptors. The buffers could be either pre-allocated or allocated when the cell arrives. The decision as to which approach to take is a function of the cell rate and the available CPU MIPS.

The memory management address range preferably supports at least a 4 Mbyte total address range. This is sufficient for up to 64K cells (ignoring data structures), providing flexibility for future enhancements. The emulation of the large number of queues will be preferably implemented with SRAM or pipelined burst mode SRAM. These devices are currently available at 32K×32 which is 128K bytes. Ignoring data structures, one of such devices is capable of storing 2000 cells.

3.3.3.2.1 Memory Management Concept

Figure 7:
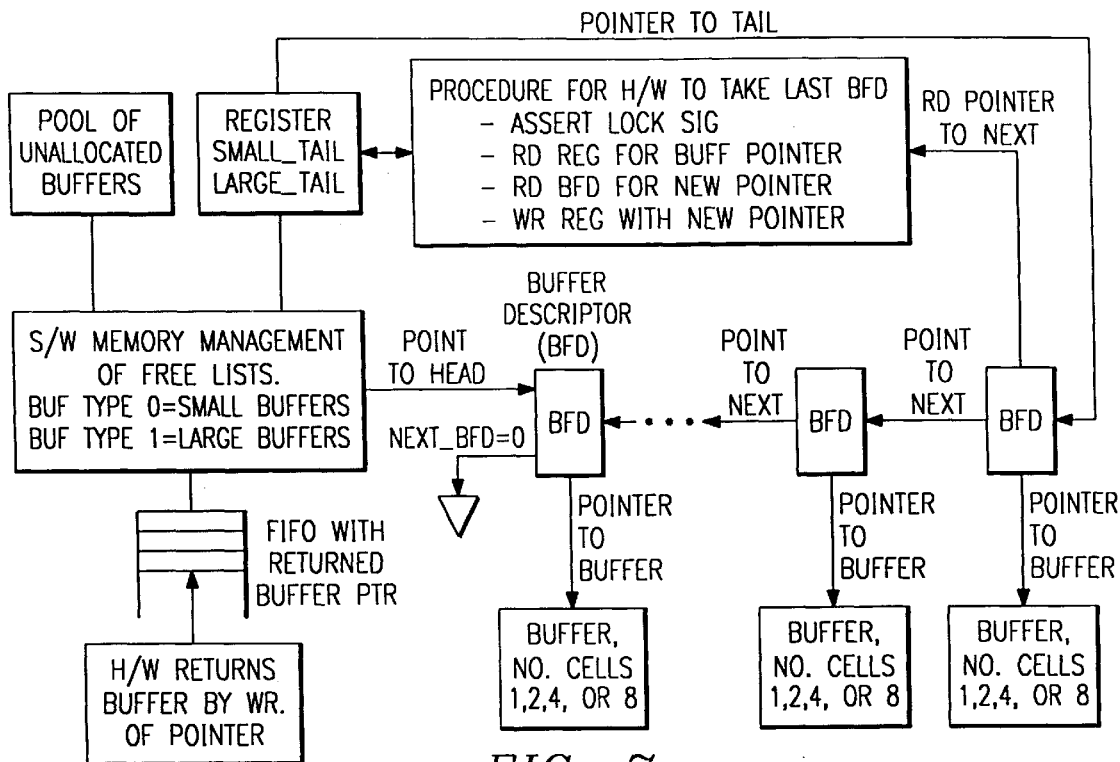
FIG. 7 illustrates a block diagram of the memory management within the switching subsystem.
Figure 8:
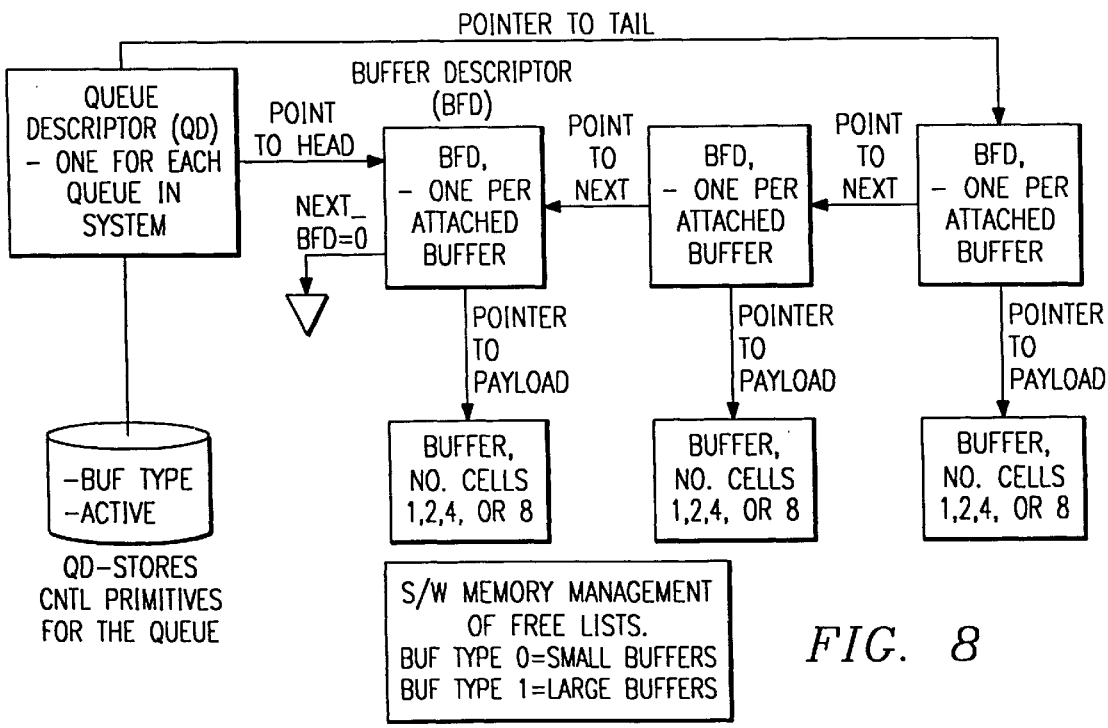
FIG. 8 illustrates a block diagram of a logical queue structure within the switching subsystem.

FIG. 7 shows a block diagram of the exemplary memory management performed within ABCU card 22. FIG. 8 shows a block diagram of the logical queue structure within ABCU card 22.

In a preferred embodiment, the switch fabric memory is managed by the software as linked lists. Two types of linked lists are simultaneously supported. The buffer size for each type of list is provisionable during system initialization. The names of the two lists are small_buf and large_buf. The supported buffer sizes are 1, 2, 4 or 8 cells per buffer. Due to the relatively slow rate of the bulk of the queues in the system, small_buf should normally be provisioned at 1 cell size per buffer. Large_buf is probably provisioned for either 4 or 8 cell size. The free list for both small_buf and large_buf is maintained by the software. When the hardware is finished with a buffer then, via a high performance CPU interface, hardware returns the buffer to the CPU. The CPU may elect to return the buffer to the either the same free list or the other free list. In addition the CPU may keep a small pool of buffers in reserve. Obviously the goal is to ensure that sufficient free list entries exist for both the small_buf and large_buf linked lists.

The MegaSLAM system consists of in excess of 280 queues, each of which has a queue descriptor to provide a reference data structure for each queue. Each hardware queue_descriptor is provisioned as to which free list to use. When the hardware needs a buffer, it preferably goes to the tail of the associated free list and takes the buffer. Hardware then appends the buffer to the head of its linked list of buffer descriptors (BFD). The hardware can append a buffer using one of two approaches:

1—append buffer when last empty cell slot in current buffer is used.

2—append buffer when new cell arrives and last cell slot in current buffer is used.

Normally, for high performance ports, approach one is used. However, to conserve free list resources for low speed ports, approach two may be used.

Each Queue Descriptor (QD) has a defined memory location. The locations will be memory mapped in a linear address space such that the associated scheduler can easily evaluate its list of queues. The linear mapping is implemented to permit the scheduler to perform cache line reads for checking the status of its queues.

The basic idea is that cells are added to the head of the linked list, and buffers are added to the head when needed. Simultaneously, cells are removed from the tail by the scheduler. When a buffer is added at the head or a buffer is returned to the CPU at the tail, then the necessary pointers (QD & BFD) are updated. In addition, software may limit the length of the queue to prevent one queue from consuming excessive buffer resources; this is achieved by the queue_size[ ] field in the QD. When the scheduler returns a buffer to the CPU at the tail of the linked list, then a decrement pulse is generated to decrease the value of queue size[ ].

The single pointer to the payload scheme defined in the BFD does not support the boundary conditions when only one buffer is attached to the QD with size >1 and simultaneously the scheduler wants to read a cell while the VCD wants to write a cell to the same buffer. Thus, in this case the scheduler preferably waits until the head of the queue advances to the next buffer.

3.3.3.2.1.1 Queue Descriptor

One queue descriptor is preferably associated with each queue on the ABCU. This data structure provides the reference point for the linked list of buffers that implements the simple FIFO queue.

The name of QD_name can be any of the queues (i.e. ingress_queue[0]_port[12] etc.). The encoding of this name may be the same as the encoding scheme used in the VCD. In excess of 280 queues may be active in every shelf. Each scheduler has its own subset of queues that it services based on the provisioned scheduler process.

| QD_name[ ]bits, word 0 | Function |
|---|---|
| 0..21 | queue_head_ptr[ ], pointer to head BFD of queue list, |
| 22..27 | queue_limit[ ], 0 = no limit IF queue_limit[ ] > queue_size[ ] (6 MSB) then disable buffer attach at head of queue |
| 28 | spare |
| 29 | buf_present, when 1 = yes, when 0 = no |
| 30 | buf_type, when 1 = large, when 0 = small |
| 31 | en_queue, when 1 = enabled, when 0 = disabled |

| QD_name[ ]bits, word 1 | Function |
|---|---|
| 0..21 | queue_tail_ptr[ ], pointer to tail BFD of queue list, |
| 22..31 | queue_size[ ], in buffer granularity units |

The queues are preferably simple FIFO implementations; as such, adding a cell to the queue is done at the tail, and removing a cell from the queue is done at the head of the queue. The queue may consist of multiple buffer descriptors chained together in a linked list. Thus, each buffer descriptor provides the pointer to the next buffer descriptor in the linked list.

3.3.3.2.1.2 Buffer Descriptor Format

The buffer descriptor (BFD) is the data structure that points to a buffer. The BFDs can be linked together to form a queue.

| BFD[ ] bit, word 0 | Function |
|---|---|
| 0..21 | buf_ptr[ ], i.e. pointer to payload |
| 22..28 | spare |
| 29..30 | buf_size[ ] 00 = 1 cell 01 = 2 cells 02 = 4 cells 03 = 8 cells |
| 31 | Next_BFD, 1 = yes, 0 = no (i.e. last BFD) Note; when Next_BFD = 0 scheduler cannot access buffer |

| BFD[ ]bit, word | Function |
|---|---|
| 0..21 | BFD_ptr[ ], pointer to next BFD (direction from tail to head) |
| 22..31 | spare |

The following is an exemplary procedure for the hardware sequencer when adding a cell to a queue. Note: VCD provides queue address.

```
Do case add_function to queue;
For the given QD_address, read BFD buf_ptr[ ] (indirect read
    f(x) of QD queue_head_ptr)
Write cell to BFD buf_ptr[ ] location (burst of 7 x 64 bit
    words)
BFD buf_ptr[ ] = BFD buf_ptr[ ] + 1 cell slot
If BFD buf_ptr[ ] offset = buf size[ ] then
    buffer is full
    /* add new BFD to head of list and update */
        QD queue_head_ptr[ ] = new BFD location
        new BFD_ptr[ ] = old BFD location
    end
end
```

The following is an exemplary procedure for the hardware sequencer when removing a cell from a queue. Note: VCD provides queue address.

```
Do case remove_cell from queue;
For the given QD_address, read BFD buf_ptr (indirect read
    f(x) of QD queue_tail_ptr)
Read cell from BFD buf_ptr[ ] location
BFD buf_ptr[ ] = BFD buf ptr[ ]-1 cell slot
If BFD buf_ptr = empty (f(x)LSB bits = 0) then
    /* buffer is empty */
        /* return empty buffer to CPU by
            writing */
        pointer of returned BFD to FIFO
            (readable by CPU)
        QD queue_tail_ptr[ ] = next BFD in
            linked list update new BFD with
            Next-BFD = 0
    end
end
```

3.3.3.2.1.3 Cell Buffer Format

The buffers on the ABCU card 22 are preferably managed as 64 byte entities, and are aligned with the natural address boundaries (6 low order bits are zero). Starting at the low order address, the first 4 bytes are the ATM 4 byte header. The next 48 bytes contain the ATM payload. The HEC code has been stripped out of the stream. It is the responsibility of the PHY layers on each ADSL line card 24 to recalculate and insert the HEC field at every egress port.

| Address (Hex) | Description |
|---|---|
| 00-03 | ATM header |
| 04-33 | ATM 46 byte payload |
| 34-3F | spare |

Multiple of these cell buffers can be grouped together to provide larger buffers. For example, when a four cell buffer is constructed, then 256 bytes are utilized in a linear address space. Four 64 byte fields, within this 256 byte address field, contain one cell each as mapped by the table defined above. In this embodiment, 12 bytes are wasted for each of the 64 byte fields.

3.3.3.2.2 Queues

The following subsections define the preferred embodiment queues for each of the port types.

The access system bandwidth resources are provisioned using a user definable scheme for the active VCI/VPI channels. Switching subsystem 100 provides traffic policing and PCR limit enforcement. The ingress upstream rates are less than 2.048 Mbps. As such, the load that any one end point can inject is low. Traffic contract violations can thus be tolerated without greatly affecting the QoS of the remaining user population (a small amount of switching subsystem 100 resources will be reserved for this case). Switching subsystem 100 can be oversubscribed in both the upstream and downstream directions, however, the CAC process in the switch should be aware of the switching subsystem resources and bottlenecks when a new circuit is being provisioned.

The queue behavior is preferably simple FIFO for the upstream and downstream paths. A scheduler determines which TDM upstream and Cell bus downstream queue to service.

3.3.3.2.2.1 Drop Port Queues

Drop port queues are the preferred egress queue structure for the ports (e.g., 120 ports) supported on switching subsystem 100. The CPU queue is preferably a logical queue only. In other words, one centralized CPU queue is shared across 120 ports. The encoded routing tag is used to differentiate the ports, since the CPU-generated cell traffic is not heavy.

| Queue Name | Priority 0 = lowest | Description |
|---|---|---|
| Egress_queue_0 | 0 | used for unpredictable step function streams, discard this stream when congested |
| Egress_queue_1 | 1 | used for traffic shaped predictable streams |
| CPU_queue | 2 | this queue is for the egress CPU cells |

3.3.3.2.2.2 Bypass Port Queues

Bypass port queues are the preferred egress queue structure for the daisy chained bypass port supported on switching subsystem 100. The Bypass queue is a physical queue. The queues for this bypass port are described in the following table.

| Queue Name | Priority 0 = lowest | Description |
|---|---|---|
| Bypass_queue_0 | 0 | bypass unknown cells to next shelf, last shelf monitor mis-inserted cell rate. |
| CPU_queue | 1 | this queue is for the egress CPU cells |

3.3.3.2.2.3 Upstream Trunk Port Queues

This is the preferred OC-3 port in the upstream direction. In the first shelf of the daisy chain, this is the port to the CO resident ATM switch 12. The following two tables define the queue structures for a multiple ingress queue structure and a single ingress queue structure.

| Queue Name | Priority 0 = lowest | Description |
|---|---|---|
| Ingress_queue_0 | 0 | general purpose queue for ingress streams |
| Ingress_queue_1 | 1 | general purpose queue for ingress streams |
| Ingress_queue_2 | 2 | general purpose queue for ingress streams |
| Ingress_queue_3 | 3 | general purpose queue for ingress streams |
| Ingress_queue_4 | 4 | general purpose queue for ingress streams |
| Ingress_queue_5 | 5 | general purpose queue for ingress streams |
| Ingress_queue_6 | 6 | general purpose queue for ingress streams |
| Ingress_queue_7 | 7 | general purpose queue for ingress streams |
| Ingress_queue_8 | 8 | general purpose queue for ingress streams |
| Ingress_queue_9 | 9 | general purpose queue for ingress streams |
| Ingress_queue_A | 10 | general purpose queue for ingress streams |
| Ingress_queue_B | 11 | general purpose queue for ingress streams |
| Ingress_queue_C | 12 | general purpose queue for ingress streams |
| Ingress_queue_D | 13 | general purpose queue for ingress streams |
| Ingress_queue_E | 14 | general purpose queue for ingress streams |
| Ingress_queue_F | 15 | general purpose queue for ingress streams |
| Bypass_queue | 16 | for the ingress daisy chain stream |
| CPU_queue | 17 | for the ingress CPU cells |

Table for Release One queues;

| Queue Name | Priority 0 = lowest | Description |
|---|---|---|
| Ingress_queue_0 | 0 | general purpose queue for ingress streams |
| Bypass_queue | 1 | for the ingress daisy chain stream |
| CPU_queue | 2 | for the ingress CPU cells |

As shown, the CPU_queue gets the highest priority and the Bypass_queue gets second highest priority for both queue configurations. The CPU_queue carries a smaller number of cells; thus from the data path perspective the Bypass_queue has the highest priority.

3.3.3.2.2.4 TS1 Port Queues

This queue is only active on the main shelf, which is the first shelf in the daisy chain. The behavior of this queue is preferably identical to the per port drop queue. A total of 8 of such queues may be implemented to support up to 8 remote ATM CPEs. The TDM network provides, for example, transport and cross connect for these 8 streams.

| Queue Name | Priority 0 = lowest | Description |
|---|---|---|
| Egress_queue_0 | 0 | used for unpredictable step function streams, discard this stream when congested |
| Egress_queue_1 | 1 | used for traffic shaped predictable streams |
| CPU_queue | 2 | this queue is for the egress CPU cells |

3.3.3.3 Registers

Preferred configurations for the registers are defined in the following subsections.

3.3.3.3.1 EPD/PPD Control Registers

In one embodiment, the EPD/PPD control registers for the centralized (TBD) number of discard logic blocks each have the following format:

| EPD_cnt1[ ]bits | Function |
|---|---|
| 31 ... 24 | port_addr[ ]; encoded as per VCD |
| 23 ... 19 | queue_address[ ]; encoded as per VCD |
| 18 ... 16 | pkt_timeout[ ]; time-out for packet discard; 0 = 333 ms 1 = 100 ms 2 = 33.3 ms 3 = 10 ms 4 = 3.3. ms 5 = 1.0 ms 6 = 0.33 ms 7 = disable time-out |
| 15 ... 14 | mode[ ]; discard mode; 0 - PPD, 1 - EPD, 2 - cell 3 - reserved |
| 13 ... 10 | spare |
| 9 ... 0 | discard_length[ ] defines the number of cell/packets to discard 0 = 1 packet or cells 1 = 2 packets or cells 2 = 3 packet or cells 3 = 4 packets or cells 4 to 1K = cells |

When in EPD mode, the "go" command causes the hardware to search for an EOM cell from a given port that has the correct target queue primitive attached to it. Next, the hardware starts discarding COM cells through to the end of the packet. The hardware then decrements the packet discard counter and, if zero, sets the done flag. Otherwise, the hardware continues and repeats the process. The timer is enabled by the "go" command and cleared by any received cell from the given port that matches the EPD criteria programmed in the EPD-cntl[ ] register.

When in PPD mode, the "go" command causes the hardware to search for a COM cell from a given port that has the correct target queue primitive attached to it. The hardware discards this cell and subsequent cells through to the end of the packet as signaled by an EOM cell. The hardware then decrements the packet discard counter and, if zero, sets the done flag. Otherwise the hardware continues and repeats the process. The timer is enabled by the "go" command and cleared by any received cell from the given port that matches the PPD criteria programmed in the EPD_cntl[ ] register In one embodiment, the total number of PPD/EPD logic blocks (64 TBD) may be shared among the ingress and egress ports. As needed, their logic blocks may be assigned to a port to discard one or more packet(s).

| EPD_status[ ]bits | Function |
|---|---|
| 15 | done - 1 when done, 0 when in progress |
| 14 | error - when 1 command failed due to time-out |
| 13 ... 0 | cell_cntr[ ] total number of cells discarded for current command |

The hardware also may have, for example, an embedded 28-bit register that is not readable by the software. This register is used to store the context of the VCI/VPI that is in the discard mode.

In another embodiment, VC discard granularity may be used. This would permit discarding multiple VCs going to the same port. One approach is to use a sorted list that supports >64 concurrent discards. The list itself stores the VCs that are in the discard mode and a pointer to the register set that is assigned to this VC. Thus, if it is implemented in the VC pipeline, then a 1.0 us deadline permit a single discard engine for servicing the >64 discard events. With this approach, we may as well increase the limit to 256 concurrent discards.

3.3.3.3.2 Rate Adaptation Circuit Registers

The two bit values required for the rate control of the rate adaptation circuit for the 120 queues are mapped into eight 32 bit registers;

| reg_port[7 ... 0] bits | Associated slot |
|---|---|
| 30 ... 31 | 16 + 16 × reg_port[x] |
| 28 ... 29 | 15 + 16 × reg_port[x] |
| 26 ... 27 | 14 + 16 × reg_port[x] |
| 24 ... 25 | 13 + 16 × reg_port[x] |
| 22 ... 23 | 12 + 16 × reg_port[x] |
| 20 ... 21 | 11 + 16 × reg_port[x] |
| 18 ... 19 | 10 + 16 × reg_port[x] |
| 16 ... 17 | 9 + 16 × reg_port[x] |
| 14 ... 15 | 8 + 16 × reg_port[x] |
| 12 ... 13 | 7 + 16 × reg_port[x] |
| 10 ... 11 | 6 + 16 × reg_port[x] |
| 8 ... 9 | 5 + 16 × reg_port[x] |
| 6 ... 7 | 4 + 16 × reg_port[x] |
| 4 ... 5 | 3 + 16 × reg_port[x] |
| 2 ... 3 | 2 + 16 × reg_port[x] |
| 0 ... 1 | 1 + 16 × reg_port[x] |

3.3.3.3.3 Other Registers

Other registers include a scheduler cell counter register, a BFD-to-free-list FIFO, and others.

3.4 Real Time Controls

The deadline for real time controls are about two or three orders of magnitude greater than the per cell deadline. These controls may be implemented by a RISC CPU on the ABCU card 22. The CPU cooperates with the peer CPUs in other switching units 104 that may exist in a daisy chained configuration.

The control loop may span a maximum distance of 30 Km or more, thus this limit is observed over the sequence of switching units 104. In this embodiment, the control loop has significance for upstream flows only.

3.4.1 Downstream Processes

In the downstream direction, the cells are fanned out to their target switching units 104 via the VC descriptor lookup in each switching unit 104. The cells are enqueued into either a high priority or a low priority queue associated with each drop (or port). The ABCU card 22 is capable of up to 120 sets or more of these dual priority queues.

Each queue implements a real time buffer to attach to the queue from the free list. Hardware preferably will perform the buffer attach, software will preferably manage the free list including the congestion states. In the downstream direction, two levels of congestion exist—congestion caused by the drop port and congestion of the overall switching subsystem 100 due to finite shared resources for the drops. The overall congestion state is primary a function of the free list size. The per drop congestion state is a function of the allocated resources to the two queues and the characteristics of the cell streams. Naturally, more advanced procedures are possible.

The software memory management function preferably manages in excess of 280 queues. As stated, the hardware acquires buffers from one of two free lists. However, in order to prevent one queue from consuming more than its fair share of buffer resources, the software provides safeguards to prevent one queue from consuming more that its fair share of system resources. For example, if the overall system is in the normal state (uncongested), then it is probably reasonable to permit a queue to use significant buffer resources. An upper limit could still be defined, but this upper limit could be lowered as the system declares the progressively higher congestion levels. When the system is in the L1 congested state, then the active queues should tend to get proportionally the same amount of buffer resources. (i.e. a 6 Mbps port gets three times the buffers when compared to a 2 Mbps port). A queue that is limited to an upper bound and reaches that upper bound may not necessarily cause the system to increase its congestion state. However, N of these queues in this state may cause the system congestion state to increase one level.

For a single queue configuration, the upstream is a single queue. The customers may elect to oversubscribe this upstream queue. In order to prevent significant interference between the upstream and downstream queues, preferably the downstream queues should utilize more than 50% of the buffer resources. It is preferable, when network traffic must be discarded, for the discarding to be at the network ingress, because a cell that has made it through multiple switches to almost the final port has consumed expensive network resources. In an asymmetric environment, it may be preferable to let the downstream direction consume 90% of the buffer resources. Alternatively, some carriers will use this system for symmetric application, and in this case approximately 75% of the buffer resources should preferably be used for the downstream direction.

An example congestion process could be:

| System Congestion Level | Level Intent | Queue Size |
| --- | --- | --- |
| Level zero (L0) | Normal state | 2x to 4x the proportional queue size |
| Level one (L1) | Congestion | 0.5x to 1x the proportional queue size (for no QoS guaranteed streams) recovered queues are given to the QoS guaranteed streams (i.e. high priority) |

When the software computes a new congestion state, it preferably informs the hardware as to this new state. This may be implemented by registers. The hardware can then use the state to make real-time, cell-level decisions. For example, CLP marking would be done during VCD processing before the cell gets enqueued. The real-time software task that computes the congestion state should do so while the state is still relevant. In other words, if the software is too slow, the real congestion state may be different then the declared state. Thus, the impact of the false congestion state may be negative. It could in some cases cause the system to oscillate. A rough guideline for the software computation of the congestion state can be calculated using the following approach:

Assume that a delta 5% change of buffer resources is the maximum acceptable change. This number is small because carriers won't get the most out of an ATM system when its heavily loaded. An example of a heavily loaded system has 75% of its buffer resources consumed by the 280+queues. Then, the 5% change could bring the system buffer occupancy to between 70 and 80%. If the consumed buffers are going up, then only 20% headroom remains; thus, the system should more aggressively perform packet level discards to try to free up more buffers. The previously-stated 5% goal would translate to 0.05×8000 cells=400 cells worth of buffer resources. Since each shelf has a maximum 1.0 $\mu$s ingress cell rate, this translates to 400 $\mu$s worst case deadline for declaring a new congestion state. It is also reasonable to assume that some cells are leaving the queues. If two cells arrive for each cell that is exiting the system to a port, then the software deadline can be relaxed to 800 $\mu$s.

When the downstream direction is in the L1 congestion state, then a pool of PPD/EPD discard engines may be used to control the queue occupancy. If the L1 congestion state covers a 30% buffer occupancy range (e.g., from 70 to 100% buffer occupancy), then the goal for the discard process should be to operate around the middle of this range (e.g., 85%) as long as the overload condition persists. The rate of discards is preferably a graduating scale from the 70 to 100% queue occupancy range (i.e., a discard rate increasing with buffer occupancy). However, as a function of the system load, the software will periodically adjust this graduating scale; otherwise it would tend not to remain in the middle of this range. The deadline for this adjustment is about 2 to 3 times longer then the deadline for the congestion state declaration, or about 2 ms. The controlling software drives these discard engines to fairly discard the active low priority queues in the system. The discards should be proportional to the rate that each virtual circuit is provisioned for. If, however, some VCs have guaranteed minimum throughput, then the VC accounting hardware should prevent discards for these VCs until after their minimum throughput is enqueued. The EPD/PPD discard engines can be assigned to a queue, but if the engine does not find a candidate AAL5 packet to discard, then the queue may revert to cell level discard for the ingress cells.

The software can also read a register associated with each scheduler that provides the number of cells that this scheduler has sent to its port since the last time the register was read. This is an indication of the aggregate cell rate through the queue. The controlling software can use this data to decide which queue to target for EPD/PPD discards. Some VCs or queues may offer only marginal loads to the system. If these loads are low relative to the maximum, then these queues are entitled to less aggressive discards or not to be elevated to discard status until the system gets into high end of the L1 range say 90–95%. Thus, not only could the discard rate be graduated through the range but also the discard population (i.e., candidate queues & VCs) could increase towards the high end of the range.

Some queues may reach their cell occupancy limit and, in this case, these queues would enter the cell discard mode. The EPD/PPD engines may still be performing packet level discards, but not at a fast enough rate for these queues. Thus, if a cell level discard is invoked, then the buffer attach to the queue does not occur.

When a downstream queue reaches its occupancy limit, then preferably the cells going to the queue are discarded. In a multi-switching unit 104 configuration, each switching unit 104 may be at a different system level congestion state. The downstream direction bottleneck is the drop port. As such, each port may be at a different congestion state. Thus, the controlling software may compute the congestion state for each port or may manage the system wide traffic flows to ensure that each port gets its fair share of system buffer resources. Since each port only has two queues, the congestion state relationships can be fixed. In this embodiment, two types of congestion states exist: one for each port, and one for the system as a whole. Preferably, when the system enters a congestion state, it reduces the allocation of buffers to the lower priority queues in the system. (as shown earlier in a table).

The congestion behavior for the two queue model is:

| Congestion level | High priority queue | Low priority queue |
| --- | --- | --- |
| Level zero (L0) | enqueue cells | enqueue cells |
| Level one (L1) | enqueue cells | PPD/EPD with potential cell discards.f(x) of queue occupancy and graduated scale in L1 range. |

Switching subsystem 100 supports both VP and VC connections. The EPD/PPD discard strategy is preferably used when the streams are encoded using AAL5 or a similar scheme. Otherwise, the system preferably performs cell level discards only when that stream exceeds its permitted rate. The VP connections consists of unknown VCs and provide a statistically multiplexed traffic stream that remains within some bandwidth limit. Thus, it is reasonable to discard cells if the VP stream exceeds these limits. In the VC case, on a per VC basis, the system may be provisioned with the AALx attribute when the PVC connection is established. Therefore, only the AAL5 (or similar) encoded streams are candidates for the EPD and PPD discard strategy. Other VC streams are preferably managed with cell-level discards. Therefore, the controlling software programs cell-level discards into the VCD for the streams that cannot be controlled with the EPD/PPD discard approach.

The process of mapping cells over the shared downstream cell bus may be implemented with a provisioned rate adaptation procedure. Feedback over the TDM bus providing the mechanism to keep the small FIFO on the ADSL line card 24 from overflowing or underflowing.

Preferably, each switching unit 104 on its own initiative, implements the congestion policies, thus each shelf may be at a different congestion level. If sufficient buffer resources are allocated to the downstream path, then interference generated by the upstream path consuming buffer resources can be minimal.

The slave switching units are generally required to participate in generating a feedback status cell that is sent to the master shelf. This cell contains the congestion state and the free list size for the downstream direction.

3.4.1.1. Control Cell Format

Two types of control cells exist in this embodiment: one initiated by the first switching unit 104a (control cell) and sent to the other daisy chained switching units 104; and another generated by the slave switching units 104 (status feedback cell) and terminated on the first switching unit 104a.

A master generated downstream control cell may be mapped into an exemplary OAM format as shown in the following table:

| Octet | Function |
| --- | --- |
| 1 . . . 5 | standard ATM header |
| 6 | 4 bits OAM type |
|  | 4 bits Function type |
| 7 . . . 8 | Control command word, contain length of control cycle in cell times etc. |

| Octet | Function |
| --- | --- |
| 9 . . . 24 | credit_cntl[7 . . . 0] 8 words of 16 bits contain the credit allowance for each of the 8 daisy chained shelves. octets #9 & 10 are for the first subordinate shelf etc. octets #23 & 24 is for the last shelf |
| 25 . . . 46 | spare |
| 47–48 | 6 bits reserved 10 bits for CRC-10 | exemplary credit_cntl[7 ..0] format:

| Bit | Function |
| --- | --- |
| 0 . . . 9 | number of cell granularity credits granted by master shelf |
| 10 . . . 15 | reserved for future use; |

3.4.2 Upstream Processes

The first switching unit 104a runs a process that computes the congestion state as a proxy for the other switching units 104. The first switching unit 104a preferably operates on a fixed control period, which, for example, may be 128 cell time intervals on an OC-3c link, of about 350 us. During this time, the first switching unit 104a computes the credits for each slave switching unit 104. The sum of the credits will be 128, including the credits for the first switching unit 104a.

When the congestion state is L0, then the switching units 104 are granted credits such that the queue occupancy stays near zero. Since the bursty nature of the ingress traffic is unpredictable, at any instance in time any one switching unit 104 may be getting more credits than another switching unit 104. Preferably, while the system as a whole is in the L0 state, the process permits large bursts from any switching unit 104. The credits are preferably modulated in a manner such that the switching units 104 get enough credits to empty their queues. The first switching unit 104a may monitor the free list feedback control word to minimize the possibility that a switching unit 104 is given credits that it does not need and would not use.

The congestion state of a switching subsystem 100 (or a switching unit 104) may span multiple classes of service. As such, the lowest priority class of service may be in one congestion state (for example UBR at L3), while the next class of service is at a lower congestion state (for example VBR at L2). This may typically occur in the upstream direction.

Upon receiving the credits, each slave switching unit 104 starts to launch cells into the upstream OC-3c link until its credits are exhausted. The slave switching unit 104 then remains inactive until the next downstream control cell grants more credits. During the inactive state, the PHY device will insert idle cells into the OC-3c when necessary.

The slave generated control cell is initiated in the last switching unit 104n, excluding the fields of the intermediate switching units 104i, which are 1's. Hardware in the intermediate switching units 104i ORs in its 16 bit feedback word, recalculates the CRC-10, and then sends the control cell to the next switching unit 104. This hardware process shall preferably be completed within two cell time intervals. The software preferably only writes the 16 bit feedback word at the control interval rate (e.g., for the 128 cell interval this is about 350 us).

The last switching unit 104n monitors the status of the bypass queue for entry into the status feedback cell. This data will be used by the first switching unit 104a to determine if excess cell slot grants are to be issued to the switching units 104. This may occur when switching units 104 are not using the upstream cell slots. Thus, switching subsystem 100 can take advantage of these unused cell slots.

3.4.2.1 Status Feedback Cell Format

An exemplary slave generated status feedback mapped into standard OAM format is shown in the following table.

| Octet | Function |
| --- | --- |
| 1 . . . 5 | standard ATM header |
| 6 | 4 bits OAM type |
|  | 4 bits Function type |
| 7 . . . 22 | shelf_status[7 . . . 0] |
|  | 8 words of 16 bits contain the status for each of the 8 daisy chained shelves. |
|  | octets #7 & 8 are for the first subordinate shelf |
|  | etc. |
|  | octets #21 & 22 for the last shelf |
| 23 . . . 44 | spare |
| 45 . . . 46 | Number of cells in upstream bypass queue of last Release Two shelf |
| 47 . . . 48 | 6 bit reserved |
|  | 10 bits for CRC-10 | exemplary shelf_status[7..0] format:

| Bit | Function |
| --- | --- |
| 0 . . . 9 | free_list[ ] |
|  | units are soft configurable i.e. 4 cells per unit |
| 10 . . . 11 | cong_state[ ] - for lowest priority group of queues; |
|  | 0 = level 0, |
|  | 1 = level 1, |
|  | 2 = level 2, |
|  | 3 = level 3, |
| 12 . . . 13 | cong_state[ ] - for 2nd to lowest priority group of queues; |
|  | 0 = level 0, |
|  | 1 = level 1, |
|  | 2 = level 2, |
|  | 3 = level 3, |
| 14 . . . 15 | cong_state[ ] - for 3rd to lowest priority group of queues; |
|  | 0 = level 0, |
|  | 1 = level 1, |
|  | 2 = level 2, |
|  | 3 = level 3, |

3.5 Hop by Hop Controls

The first switching unit 104a or last switching unit 104n in the daisy chain may be used to terminate F4 segment OAM flows.

3.6 End-to-End Propagation Delay Controls

Preferably, CPE equipment used with switching subsystem 100 will support EFCI flow control.

3.6.1 CAC Procedure

Switching subsystem 100 preferably is a PVC ATM system. Static provisioning of switching subsystem 100 be done via the operator console or via remote schemes as supported by a digital loop carrier. The network operator may gather statistics from the system and utilize this data to determined whether nor not to admit a new PVC connection.

In the event SVC capabilities are available in the CO-resident ATM switch 12, then the CAC process running in that switch could provision SVC circuits that are tunneled through switching subsystem 100. The CAC process should, however, be aware of the switching subsystem 100 resources when attempting to determine how much to oversubscribe a given port. The CAC process may act on behalf of the LNI ports resident within the access network. This is sometimes called a virtual LNI interface.

The CAC function resident in the ATM switch 12 preferably implements the process utilizing a switching subsystem 100 multiplexer data base. The knowledge of the system and PHY bandwidth attributes in switching system 100 is supplied to the CAC process in order for it to determine if the QoS of the connections can be maintained. (e.g., when a new connection is being admitted)

When implementing CAC-based oversubscription, a policing function in switching subsystem 100 is probably needed to deal with the non-conforming streams. Switching subsystem 100 should (via the NMS) disconnect these sources. This procedure may take a few minutes, and in the mean time the QoS of the conforming users should not be degraded. In the event the network administrator decides on a different network policy, which may be acceptable depending on the traffic statistics, then other procedures could be implemented.

Embodiments of switching subsystem 100 may provide SVC and CAC capabilities. In one embodiment, the policing function will be included, but may be used to aid in discarding traffic non-conformant stream. The virtual circuit itself will remain active.

3.7 End-to-End Round Trip Delay Controls

As mentioned, some switching subsystem 100 embodiments are PVC-provisioned systems. Some embodiments include the Q.2931 signaling stack and the connection admission control (CAC) process for SVC automatic controls.

3.8 Statistics

Switching subsystem 100 preferably gathers the required PHY layer and ATM layer statistics for the two layers. In addition, local system specific statistics will be gathered such as statistics for the following events: queue trigger levels, queue occupancy events, cell level discard events, cell mis-inserted events, and events that relate to the accuracy of the fairness process. Switching subsystem 100 can provide ATM switching functions such as cell routing such that cell mis-inserted events will be logged by the system. The mis-inserted cells will be discarded. Switching subsystem 100 also logs physical layer events such as HEC CRC errors, OAM CRC errors, and loss of cell delineation.

Switching subsystem 100 may gather and report the statistics at periodic intervals as required by the PHY or at other intervals. An embedded statistic accumulation functions may be implemented to save the results in non-volatile memory (serial EPROM or EEPROM). This might include aggregate cell counts per unit time and queue occupancy statistics (e.g., congestion event counts and cell loss counts).

The system design provides large centralized per port egress queues and small queues for the rate adaptation function between the various interface line rates. Within generous cell clumping time domain bounds, switching subsystem 100 demultiplexing process is deterministic, therefore cells are extremely unlikely to be lost as a result of this process. If, however, this event occurs, it will be logged. In the upstream direction, congestion trigger levels may be logged by the system. A history file preferably will reside within the available non-volatile memory.

3.9 CPU Cell Handler

The CPU software/hardware interface can provide the ability to inject and remove cells from any link. The hardware provides the primitives to detect, for example, eight virtual circuit addresses for the cell receive function. This can be implemented with 32 bit registers and a mask function for each of the 8 addresses. This will permit unique or linear range VCI/VPI address detection or Payload Type (PT) detection. Some well known cell VCI/VPI values are:

VC address is 1 (for UNI I/F) meta-signaling;

VC address is 3 (for UNI I/F) for segment F4 OAM cell flows (segment VP flow);

VC address is 4 (for UNI I/F) for segment F4 OAM cell flows (end to end VP flow) Not needed in MegaSLAM but is required in CPE;

VC address is 5 for default signaling channel (and VP=0); and VC address is 16 for default ILMI channel.

The 8 circuits can operate in parallel and cells may be subjected to the match test to determine whether or not the cell should be stripped out of the stream. Preferably, this function is required for composite ingress streams on the ABCU card 22. In the case of the ingress stream from PHY ports, a routing tag is appended to the cell to identify the port the cell came from. Each of the addresses supported by the MegaSLAM are preferably programmed to support any combination of 32 bits. For example, five of these registers could be provisioned for the five VC addresses listed herein, leaving three unused registers, which, for example, could be used for a peer-to-peer link communication protocol or VCC F5 OAM flows.

One of the circuits preferably provides an additional feature to evaluate the content of an OAM cell type and function (TBD) field and, based on the content of these fields, forward the cell to the daisy chained link. At the same time, this circuit can forward the same cell to the local CPU. This feature provides a point-to-multipoint connection over the daisy chained links. This is useful for the control cells that are being exchanged between switching units 104.

3.9.1 F4 and F5 OAM Cell Flows

Switching subsystem 100 is preferably considered a single network segment. Segment flows are terminated only in the last switching unit 104n. Switching subsystem 100 will generate and terminate F4 OAM cell flows. Hardware VCI/VPI address mapping function will strip these OAM cells out of the cell stream and pass them to the local CPU. The hardware also checks the CRC-10 and provide CRC__ indication to the CPU. A hardware interface primitive Enable__F4__flows preferably performs the following function: when true, the hardware strips F4 flows out of the cell stream. The CPU cell TX__Fifo can, under software control, at any time queue a cell for transmission on any outbound composite link (or bus), therefore no primitive is needed to support sending F4 OAM cells.

An injection FIFO is provided for each of the composite egress streams on the ABCU card 22. This FIFO provides at least double buffering for two cells that can be injected into a composite stream. This FIFO takes priority over other streams. A software scheduler controls the rate of CPU injected cells. The CPU software will provide the drivers required to service these cell streams.

The system does not interfere with the in band F5 flows. The F5 flows will transparently pass through the switching subsystem 100. They are expected to be terminated in the CPE device.

In embodiments where the CPE does not support some of the OAM flows, VC or VP OAM flows may be generated as a proxy for the CPE as a provisioning option.

3.10 Performance Monitoring and Fault localization

Switching subsystem 100 preferably provides both traditional physical layer procedures and ATM cell layer procedures. In some cases, both procedures may not be required and a simpler, more cost effective solution results.

Loopbacks may be provided for the full payload (PHY level), the virtual path payload, and maybe the virtual circuit payload. In addition, it may make sense to inject a small amount of overhead into the stream to do a continuous performance monitoring function. This overhead in the cell domain could be looped back at the CPE.

3.10.1 ATM Cell Level Procedures

Switching subsystem 100 provides ATM performance monitoring procedures at external interfaces and the connection between the ABCU card 22 and the daisy chained ABCU card 22. For the drops, it is performed by the drop PHY and for the ABCU card 22 interfaces. The following parameters, for example, may be measured:

CER, cell error ratio

CLR, cell loss ratio

CMR, cell miss-inserted rate

SECBR, severely errored cell block ratio

Number of cells with parity error on transmit

Number of discard cells due to double HEC error

Number of corrected single HEC error Cells

OAM cells with CRC-10 error

C. FUNCTIONAL OPERATION

Figure 9:
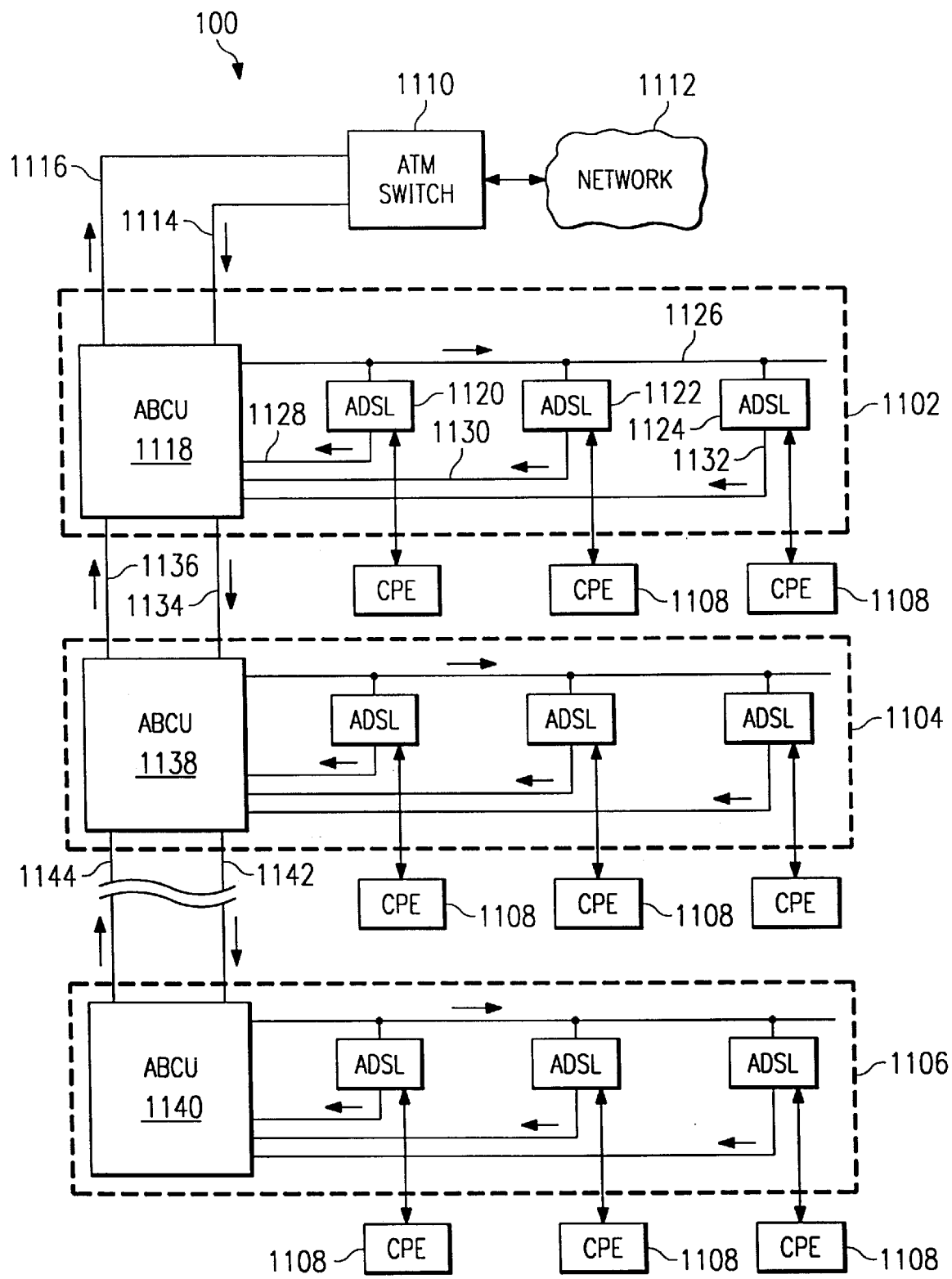
FIG. 9 is a block diagram of a distributed telecommunications switching subsystem.

FIGS. 9–14 provide functional operation perspective of switching subsystem 1100. Referring to FIG. 9, a distributed telecommunications switching subsystem 1100 is shown. Switching subsystem 1100 comprises a plurality of switching units 1102, 1104, and 1106, referred to as channel banks. Each channel bank provides data and/or voice communication services to a plurality of customer premises equipment (CPE) units 1108. A primary channel bank 1102 communicates with a data packet switch 1110, such as an asynchronous transfer mode (ATM) switch 1110, which in turn communicates with a telecommunications network 1112. ATM switch 1110 may, for example, be located at a telephone company central office one or more intermediate channel banks 1104 may be positioned between primary channel bank 1102 and a terminating channel bank 1106.

In the preferred embodiment described herein, the primary function of switching subsystem 1100 is to route data packets in the well known ATM cell format from ATM switch 1110 to individual CPE units 1108 and to carry ATM cells from CPE units 1108 to ATM switch 1110. Together, ATM switch 1110 and switching subsystem 1100 provide communication paths between CPE units 1108 and one or more destinations in telecommunications network 1112. It will be understood that the distributed telecommunications switching subsystem and method described herein may also be employed to route digital or analog information encoded in other formats, such as Transmission Control Protocol/Internet Protocol data packets.

In the following discussion, ATM cells being sent from ATM switch 1110 through switching units 1102, 1104, and 1106 to CPE units 1108, or any other destination in switching subsystem 1100, will be referred to as traveling in the downstream direction. Any cells sent from CPE units 1108 through switching units 1102, 1104, and 1106 to ATM switch 1110 will be referred to as traveling in the upstream direction.

Primary channel bank 1102 communicates with ATM switch 1110 by means of communication line 1114 which carries ATM cells downstream from ATM switch 1110 to primary channel bank 1102. Primary channel bank 1102 also communicates with ATM switch 1110 by means of communication line 1116 which carries cells upstream from primary channel bank 1102 to ATM switch 1110. In the preferred embodiment, communication lines 1114 and 1116 are fiber optic cables capable of carrying data at a standard OC-3 data rate.

Primary channel bank 1102 comprises a controller 1118 referred to as an ATM bank controller unit (ABCU) and a plurality of subscriber interface cards 1120 referred to as asymmetric digital subscriber line (ADSL) cards. Controller 1118 transmits cells downstream to subscriber interface cards 1120 on a shared high speed cell bus 1126. Subscriber interface cards 1120, 1122 and 1124 transmit cells upstream to controller 1118 via serial bus interface (SBI) lines 1128, 1130, and 1132, respectively.

Controller 1118 sends cells downstream to intermediate channel bank 1104 via communication line 1134, and receives cells traveling upstream via communication line 1136. Communication lines 1134 and 1136, like lines 1114 and 1116, are preferably fiber optic cables capable of carrying data at the standard OC-3 data rate.

Downstream intermediate channel banks 1104 and terminating channel bank 1106 are similar in structure to primary channel bank 1102, each having a controller 1138 and 1140, respectively, and a plurality of subscriber interface cards 1120. Some differences in functionality among the channel banks will become apparent from the description to follow.

Intermediate channel bank 1104 may be directly coupled to terminating channel bank 1106 by communication lines 1142 and 1144. Alternatively, one or more channel banks may be situated between intermediate channel bank 1104 and terminating channel bank 1106 in a "daisy chain" arrangement, with each channel bank being connected to the previous one by communication lines, as shown. Switching subsystem 1100 preferably comprises up to nine channel banks. Regardless of the number of channel banks in switching subsystem 1100, terminating channel bank 1106 is the last channel bank in the chain.

Each channel bank 1102, 1104, 1106 may include up to 60 subscriber interface cards 1120, with each subscriber interface card 1120 communicating with up to four separate CPE units 1108. The communication with CPE units 1108 is asymmetric, with an exemplary data rate of six million bits per second (6 Mbps) supplied to the customer and 640 Kbps received from the customer. The type of service provided to the customer may be plain old telephone service (POTS), data service, or any other telecommunications service, and may or may not include a minimum cell rate (MCR) guaranteed for the customer's upstream data communications.

Generally, switching subsystem 1100 will be oversubscribed in the upstream direction, meaning that the cumulative peak cell rate (PCR) which may be transmitted by the customers exceeds the maximum rate at which switching subsystem 1100 may transmit cells to ATM switch 1110. Control methods that allow switching subsystem 1100 to provide adequate service to oversubscribed customers will be discussed more fully below.

Figure 10:
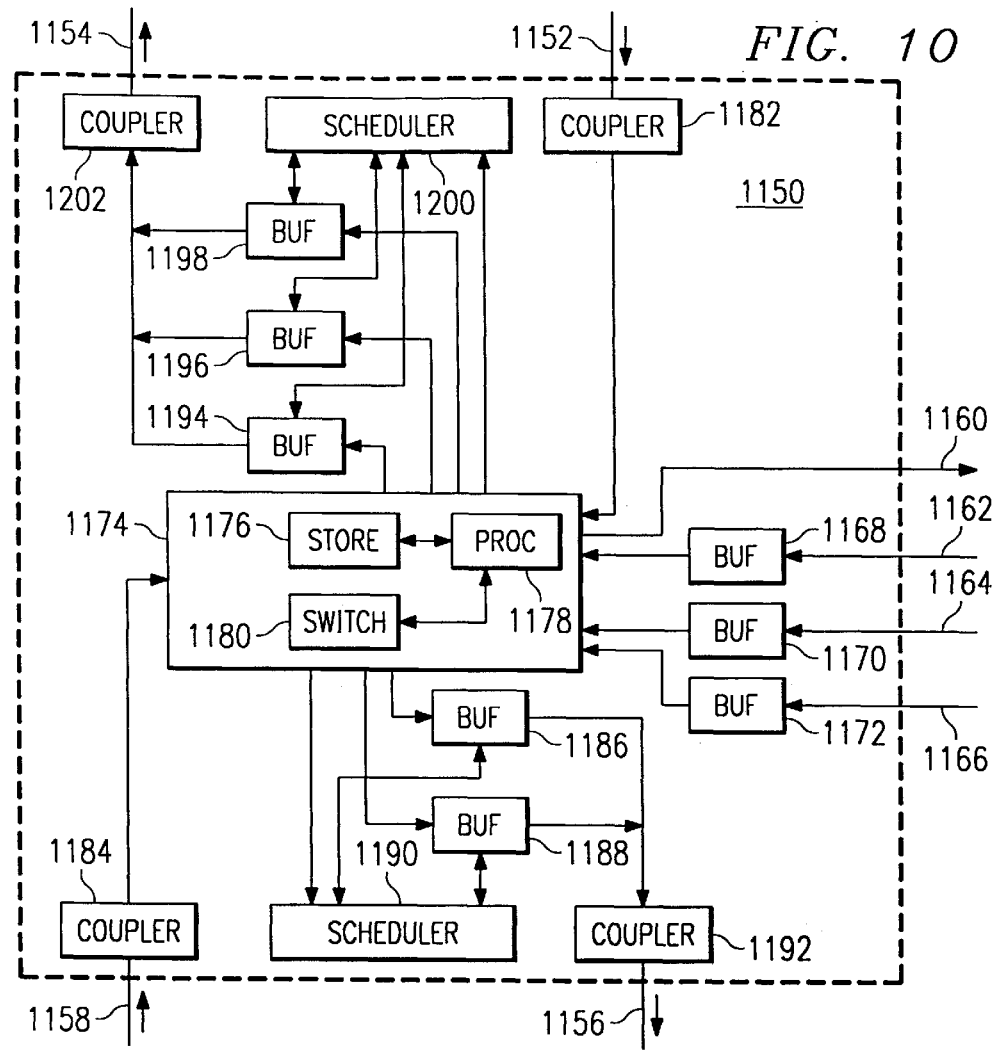
FIG. 10 is a block diagram of a controller for use in the distributed switching subsystem.

Referring to FIG. 10, a functional block diagram of an upstream controller 1150 in accordance with the invention is shown. Controller 1150 may be implemented in switching subsystem 1100 as controller 1118 or 1138, or as a controller for another intermediate channel bank situated between intermediate channel bank 1104 and terminating channel bank 1106.

Controller 1150 receives cells traveling downstream from ATM switch 1110 or another controller in an upstream channel bank via fiber optic cable 1152 and send cells upstream from a downstream channel bank via fiber optic cable 1154. Controller 1150 sends cells downstream to another channel bank via fiber optic cable 1156 and receives cells upstream from a downstream channel bank via fiber optic cable 1158.

Controller 1150 transmits appropriate cells downstream to subscriber interface cards 1120 on a shared high speed cell bus 1160. When a large number of subscriber interface cards 1120 are serviced by controller 1150, high speed cell bus 1160 may comprise a plurality of separate lines, each carrying the same high speed signal to a separate set of subscriber interface cards 1120. For example, in a configuration with 60 subscriber interface cards being serviced by controller 1150, high speed cell bus 1160 may comprise three separate lines, each connected to 20 subscriber interface cards 1120, but each carrying cells addressed to all of the subscriber interface cards 1120.

Each subscriber interface card 1120 sends cells upstream to controller 1150 via a separate subscriber bus interface line 1162, 1164, or 1166. In addition to carrying ATM traffic, subscriber bus interface lines 1162, 1164, and 1166 may also carry telephone traffic from POTS subscribers. In that case, the POTS traffic may be separated out from the ATM traffic and processed by other equipment not shown. This separation occurs before the processing of ATM cells described herein. The downstream communication of POTS traffic to subscriber interface cards 1120 may occur on lines other than high speed cell bus 1160.

Buffers 1168, 1170 and 1172 receive ATM signals on subscriber bus interface lines 1162, 1164 and 1166, respectively, and store the received data until one or more complete cells are received. The cells are then passed on to an internal switching controller 1174, which comprises an address storage system 1176, a processor 1178, and a switch 1180.

Address storage system 1176 stores a list of addresses corresponding to the CPE units 1108 serviced by controller 1150. In the preferred embodiment, each address identifies a virtual path and virtual circuit for a CPE unit 1108 in an addressing format well known to those skilled in the art of ATM communications. However, it will be appreciated that other addressing systems, such as Internet Protocol addressing, may be used to identify cell destinations both within and outside switching subsystem 1100.

Incoming signals on fiber optic cables 1152 and 1158 are converted to electrical signals by fiber optic couplers 1182 and 1184, respectively. The converted signals are transmitted to internal switching controller 1174.

Internal switching controller 1174 transmits cells downstream to a downstream channel bank via fiber optic cable 1156. To accomplish this, cells are transmitted to a plurality of first in first out (FIFO) buffers or queues 1186 and 1188 controlled by a scheduler 1190. When triggered by scheduler 1190, each queue 1186 or 1188 dequeues one or more cells, transmitting the cells to a fiber optic coupler 1192 which converts the data signals to optical signals for transmission over fiber optic cable 1156.

Likewise, internal switching controller 1174 transmits cells upstream to an upstream channel bank or ATM switch 1110 via fiber optic cable 1154. To accomplish this, cells are transmitted to a plurality of FIFO queues 1194, 1196 and 1198 controlled by a scheduler 1200. When triggered by scheduler 1200, each queue 1194, 1196, or 1198 dequeues one or more cells, transmitting the cells to a fiber optic coupler 1202 which converts the data signals to optical signals for transmission over fiber optic cable 1154.

In operation, controller 1150 receives downstream ATM cells from an upstream channel bank or ATM switch 1110 on fiber optic cable 1152. Processor 1178 compares the address portion of a received cell to the list of addresses stored in address storage system 1176. If a match is found, then switch 1180 transmits the cell to the subscriber interface cards 1120 associated with controller 1150 on shared high speed cell bus 1160.

All of the subscriber interface cards 1120 associated with controller 1150 check the address of the transmitted cell carried over high speed cell bus 1160 and compare it to their internal address lists. Only the subscriber interface card 1120 servicing the CPE unit 1108 to which the cell is addressed reacts to receipt of the cell. All other subscriber interface cards ignore the cell.

Returning to controller 1150, if the address of the cell did not match any of the addresses stored in address storage system 1176, then processor 1178 compares the address of the cell to a processor address to determine whether the cell is a control cell addressed to processor 1178. If the address matches the processor address, then the control cell is processed by processor 1178 in a manner to be described below.

If the cell address does not match any address for controller 1150, then the cell is sent by switch 1180 to a bypass queue 1186. When bypass queue 1186 receives a cell, it sends a ready signal to scheduler 1190 which coordinates transmissions over fiber optic cable 1156 to a next downstream channel bank. When scheduler 1190 sends a transmit signal to bypass queue 1186, the cell is transmitted to coupler 1192 and onto fiber optic cable 1156.

Processor 1178 may also generate control cells for transmission to downstream channel banks, as will be described more fully below. When processor 1178 generates such a cell, the cell is passed by switch 1180 to CPU queue 1188, which transmits a ready signal to scheduler 1190. Scheduler 1190 preferably controls both bypass queue 1186 and CPU queue 1188 to ensure that CPU queue 1188 receives higher priority than bypass queue 1186. This priority scheme may be implemented in a variety of ways. For example, bypass queue 1186 may be allowed to dequeue a cell only when CPU queue 1188 is empty. Because the frequency of control cells is low, this priority scheme does not significantly impede downstream traffic.

It will be appreciated by those skilled in the art that the downstream cell switching process executed by controller 1150 differs from that of a telecommunications switching system arranged in a tree structure. Rather than storing addresses for all customers located downstream of controller 1150, address storage system 1176 only stores addresses corresponding to the customers directly serviced by controller 1150. Any cell having an unrecognized address is passed downstream to another controller for processing. This allows for a smaller address storage system 1176 and faster address processing in controller 1150.

In the upstream direction, controller 1150 receives ATM cells from downstream channel banks on fiber optic cable 1158. Processor 1178 compares the address portion of a received cell to its own address to determine whether the cell is a control cell addressed to processor 1178. If the address matches the processor address, then the control cell is processed by processor 1178 in a manner to be described below.

If the cell address does not match the processor address, then the cell is sent by switch 1180 to a bypass queue 1194. When bypass queue 1194 receives a cell, it sends a ready signal to scheduler 1200, which coordinates transmissions over fiber optic cable 1154. When scheduler 1200 sends a transmit signal to bypass queue 1194, the cell is transmitted to coupler 1202 and onto fiber optic cable 1154.

If controller 1150 is implemented in a downstream channel bank, i.e. a channel bank other than primary channel bank 1102, then processor 1178 may also generate control cells for transmission to upstream channel banks, as will be described more fully below. When processor 1178 generates such a cell, the cell is passed by switch 1180 to a CPU queue 1196, which transmits a ready signal to scheduler 1200. When scheduler 1200 sends a transmit signal to CPU queue 1196, the control cell is transmitted to coupler 1202 and on to fiber optic cable 1154.

Cells are received from the local CPE units 1108 serviced by controller 1150 on subscriber bus interface lines 1162, 1164, and 1166. As previously noted, controller 1150 may receive cells from up to 60 subscriber bus interface lines. Processor 1178 checks the address portion of each cell to determine whether the cell is addressed to processor 1178 itself or to a valid upstream destination.

The subscriber interface cards 1120 controlled by controller 1150 may, for example, send status feedback cells to processor 1178 indicating whether traffic congestion is occurring in the subscriber interface cards 1120. Processor 1178 processes these status feedback cells accordingly.

Other cells addressed to valid upstream destinations are transmitted by switch 1180 to ingress queue 1198. Scheduler 1200 controls bypass queue 1194, CPU queue 1196, and ingress queue 1198 to implement a selected priority scheme. In the preferred embodiment, CPU queue 1196 receives the highest priority, bypass queue 1194 receives the next priority, and ingress queue 1198 receives the lowest priority. As with scheduler 1190, this priority scheme may be implemented in a variety of ways. For example, ingress queue 1198 may be allowed to dequeue a cell only when CPU queue 1196 and bypass queue 1104 are both empty. Because the frequency of control cells is low, this priority scheme does not significantly impede upstream traffic.

Figure 11:
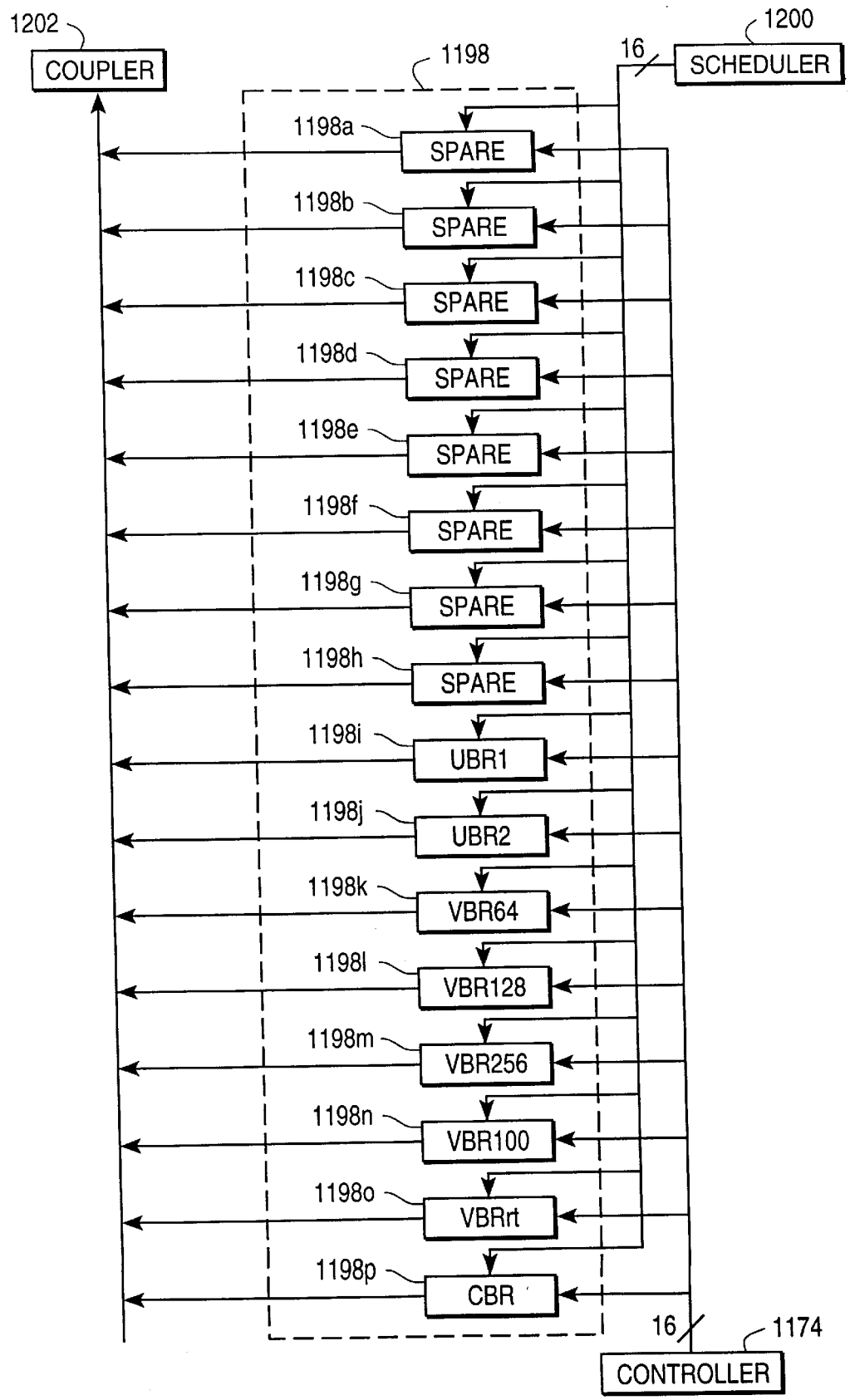
FIG. 11 is an expanded block diagram of an ingress queue system for use in the distributed switching subsystem.

In an alternative embodiment of controller 1150, ingress queue 1198 actually comprises 16 separate ingress queues, as shown in FIG. 11. Each ingress queue 1198a–1198p is assigned a separate priority. As in the previous embodiment, a priority scheme is enforced by scheduler 1200.

The priority scheme allows each queue to provide different classes of service to customers. For example, each ingress queue may receive cells belonging to one of the well-known ATM cell traffic classes, as illustrated in FIG. 11. In this example, ingress queues 1198a through 1198h are spare queues, ingress queue 1198i receives unspecified bit rate (UBR) traffic with fair performance, ingress queue 1198j receives UBR traffic with good performance, ingress queues 1198k, 1198l and 1198m receive variable bit rate (VBR) traffic with guaranteed minimum cell rates of 64 Kbps, 128 Kbps and 256 Kbps, respectively, ingress queue 1198n receives VBR traffic with guaranteed 100% cell throughput, ingress queue 1198o receives real-time variable bit rate (VBR) traffic, and ingress queue 1198p receives constant bit rate (CBR) traffic.

In this embodiment, internal switching controller 1174 assigns cells to different ingress queues according to the origin of each cell. Customers serviced by switching subsystem 1100 select in advance a class of service they would like to receive, with higher priority traffic classes and guaranteed minimum throughputs being more expensive than low priority and/or oversubscribed service. Each customer's cells are then sent by internal switching controller 1174 to the appropriate ingress queue 1198a through 1198p.

Scheduler 1200 and processor 1178 are programmed to dequeue upstream queues 1194, 1196 and 1198 according to a predetermined priority scheme. The optimal priority scheme to implement depends on a number of situation-specific factors, such as the number of ingress queues, the classes of service offered, the oversubscription ratio, and predicted traffic load statistics. However, certain guidelines must be followed. For example, ingress queue 1198k must be allowed to dequeue cells often enough to achieve the minimum throughput of 64 Kbps.

The priority scheme implemented by scheduler 1200 and processor 1178 may vary with the level of traffic congestion in controller 1150. For example, any ingress queues 1198a through 1198p that are not empty may be dequeued in a round robin fashion unless the traffic congestion in controller 1150 reaches a threshold level, at which point the minimum cell rate guarantees for some ingress queues require a preferential dequeuing process to be implemented.

It will be appreciated that the various elements of controller 1150, excluding fiber optic couplers 1182, 1184, 1192, and 1202, generally perform data storage and signal processing functions, and may therefore be implemented as hardware, firmware, software, or some combination thereof.

Figure 12:
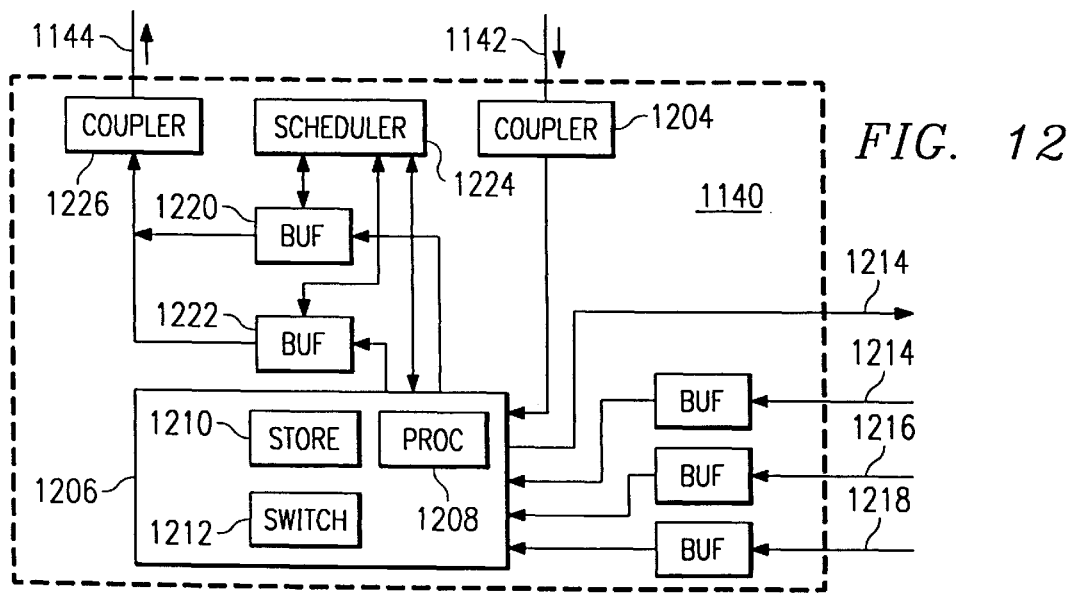
FIG. 12 is a block diagram of a terminating controller for use in the distributed switching subsystem.

Referring to FIG. 12, a functional block diagram of controller 1140 is shown. Controller 1140 is similar in structure to controller 1150 described above in connection with FIG. 10. However, because controller 1140 controls terminating channel bank 1106 in switching subsystem 1100, controller 1140 does not receive or transmit cells to any downstream channel banks. For the purposes of this description only, it will be assumed that switching subsystem 1100 comprises only three channel banks and that controller 1140 therefore communicates directly with controller 1138.

Signals traveling downstream on fiber optic cable 1142 are converted to electrical signals by fiber optic coupler 1204. The converted signals are transmitted to internal switching controller 1206.

Internal switching controller 1206 transmits cells to controller 1138 via fiber optic cable 1144. To accomplish this, cells are transmitted to a plurality of FIFO queues 1220 and 1222 controlled by a scheduler 1224. When triggered by scheduler 1224, each queue 1220 or 1222 dequeues one or more cells, transmitting the cells to a fiber optic coupler 1226 which converts the data signals to optical signals for transmission over fiber optic cable 1144.

For downstream operation, controller 1140 receives ATM cells from upstream channel bank 1104 on fiber optic cable 1142. A processor 1208 of internal switching controller 1206 compares the address portion of a received cell to the list of addresses stored in address storage system 1210. If a match is found, then a switch 1212 transmits the cells to the subscriber interface cards 1120 associated with controller 1140 on shared high speed cell bus 1214.

If the address of the cell does not match any of the addresses stored in address storage system 1210, then processor 1208 compares the address of the cell to its own address to determine whether the cell is a control cell addressed to processor 1208. If the address matches the processor address, then the control cell is processed by processor 1208 in a manner to be described below.

If the cell address does not match the processor address, then the cell has failed to match any of the addresses serviced by switching subsystem 1100. At this point, the cell is deemed a mis-inserted cell and is processed by processor 1208 which may gather statistics on such cells. Mis-inserted cells may, for example, indicate that an unauthorized party is attempting to receive service from switching subsystem 1100.

In the upstream direction, cells are received from the local CPE units 1108 serviced by controller 1140 on subscriber bus interface lines 1215, 1216, and 1218. As previously noted, controller 1140 may receive cells from up to 60 subscriber bus interface lines. Processor 1208 checks the address portion of each cell to determine whether the cell is addressed to processor 1208 itself or to a valid upstream destination.

Cells addressed to valid upstream destinations are transmitted by switch 1212 to ingress queue 1220. Processor 1208 may also generate control cells for transmission to upstream channel banks, as will be described more fully below. When processor 1208 generates such a cell, the cell is passed by switch 1212 to a CPU queue 1222.

A scheduler 1224 controls CPU queue 1222 and ingress queue 1220 to implement the selected priority scheme as previously described. In the preferred embodiment, CPU queue 1222 receives higher priority than ingress queue 1220. Because the frequency of control cells is low, this priority scheme does not significantly impede upstream traffic.

From the foregoing description, it will be appreciated that switching subsystem 1100 provides distributed telecommunications switching which features several advantages over a traditional tree structure. Each channel bank only stores a limited number of addresses pertaining to customers directly serviced by the channel bank, and is effectively independent of the other channel banks in the system.

In addition to simplifying the setup for switching subsystem 1100, the modularity of the system allows expansion of service with minimal modification to the existing structure. When a set of new customers is to be serviced, a new channel bank may be added into switching subsystem 1100. The new channel bank may be programmed with the addresses of the new customers, while the cell processing methods and address storage for other channel banks remain unaffected.

The channel banks in switching subsystem 1100 may also be located remotely from one another without significant degradation in service. This allows customers in different locations to be "close to the switch," decreasing access times for the customers and improving service.

Because switching subsystem 1100 is oversubscribed in the upstream direction, some control system must be implemented to ensure uniformity in quality of service for customers throughout switching subsystem 1100. For example, if upstream bypass queue 1194 in controller 1118 receives higher priority than ingress queue 1198, then CPE units 1108 serviced by channel bank 1102 may be effectively blocked from access to ATM switch 1110 due to heavy upstream traffic. An upstream flow control system must be implemented to ensure fairness throughout switching subsystem 1100.

Two different upstream flow control systems will be described herein. Although these control systems are presented as mutually exclusive alternatives, it will be appreciated that variations and combinations of these two control schemes may be implemented without departing from the spirit and scope of the invention.

Referring to FIG. 13, the operation of the first upstream flow control system is illustrated. In this control system, controller 1118 in channel bank 1102 periodically initiates a control loop by generating a control cell 1230. In general terms, the control cell performs two functions: providing control information to each channel bank in switching subsystem 1100 and triggering a status feedback cell 1232 that provides information to controller 1118 concerning the cell traffic congestion at each channel bank. The control cell is preferably generated only when controller 1118 is not experiencing high traffic congestion levels in the upstream direction so that the returning status feedback cell 1232 will not contribute to upstream traffic congestion.

An exemplary format for control cell 1230 is shown in Table A. This cell follows a standard ATM Organization, Administration and Maintenance (OAM) cell format. Thus, octets 1 through 5 include standard ATM header information and octet 6 includes OAM and function type information, which identifies the cell as a control cell.

Octets 7 and 8 contain a control command word which sets the length or interval of a control cycle, expressed as a number of cells. Thus, if the control command word has a value of 128, then a control cycle will be deemed to constitute an interval of 128 cells in the upstream flow. Every 128 cells then constitutes a separate control cycle.

TABLE A

| Octet | Function |
|---|---|
| 1–5 | standard ATM header |
| 6 | 4 bits OAM type |
|  | 4 bits Function type |
| 7–8 | Control command word - contains length of control cycle in cell times |
| 9–24 | 8 words of 16 bits contain the credit allowance for each of the 8 daisy chained channel banks octets 9 and 10 are for the first channel bank octets 23 and 24 are for the last channel bank |
| 25–46 | spare |
| 47–48 | 6 bits reserved 10 bits for CRC-10 |

Octets 9 through 24 contain up to eight credit allowance words of 16 bits each. One credit allowance word is included for each downstream channel bank in switching subsystem 1100. Thus, for example, if channel banks 1102, 1104 and 1106 were the only channel banks in switching subsystem 1100, then octets 9 through 12 would contain one credit allowance word each for channel banks 1104 and 1106, while octets 13 through 24 will remain empty. Since the credit allowance control cell is generated by controller 1118 of primary channel bank 1102, the credit allowance for primary channel bank 1102 is processed directly by its processor 1178 and need not be placed within the credit allowance control cell.

The credit allowance word for a channel bank indicates the number of cells in a control cycle that are allotted to that channel bank for transmission upstream. For example, if the control cycle length is 128 cells, and the credit allowance word for channel bank 1104 has a value of 43, then controller 1138 may transmit 43 cells upstream on fiber optic cable 1136 during the next 128-cell interval.

This credit-based upstream flow control is implemented by processor 1178 shown in FIG. 10. Thus, processor 1178 maintains a counter (not explicitly shown) which is decremented by one every time processor 1178 through scheduler 1200 dequeues a cell from ingress queue 1198. When the counter reaches zero, no more cells are dequeued from ingress queue 1198 until the next control cycle.

Returning to Table A, Octets 25 through 46 of the control cell are unused. Octets 47 and 48 include 10 bits used for a cyclical redundancy check (CRC) of the control cell while the other six bits remain unused.

When a control cell is generated by controller 1118, the control cell is passed to CPU queue 1188 for transmission downstream to controller 1138. Controller 1138 receives the control cell and reads octets 7 through 10 to determine the length of the control cycle and the credit allowance for channel bank 1104. Controller 1138 then passes the control cell downstream, unmodified.

Likewise, each controller downstream receives the control cell, reads its own credit allowance, and passes the control cell further downstream, as illustrated in FIG. 13. Controller 1140 in channel bank 1106 discards the control cell after reading it.

Controller 1140 is programmed to respond to the receipt of a control cell by generating a status feedback cell 1232. This cell is passed upstream, with cell traffic congestion information being written into the status feedback cell by each controller in switching subsystem 1100. When the cell reaches controller 1118 in channel bank 1102, the status feedback information is read and the cell is discarded.

An exemplary format for status feedback cell 1232 is shown in Table B. Like control cell 1230 described above, the status feedback cell follows the standard OAM format. Thus, octets 1 through 5 include standard ATM header information and octet 6 includes OAM and function type information which identifies the cell as a status feedback cell.

TABLE B

| Octet | Function |
|---|---|
| 1–5 | standard ATM header |
| 6 | 4 bits OAM type |
|  | 4 bits Function type |
| 7–22 | 8 words of 16 bits contain the status for each of the 8 daisy chained channel banks octets 7 and 8 are for the first channel bank octets 21 and 22 are for the last channel bank |
| 23–44 | spare |
| 45–46 | Number of cells in upstream bypass queue of last Release Two shelf |
| 47–48 | 6 bits reserved 10 bits for CRC-10 |

Octets 7 through 22 contain up to eight status feedback words of 16 bits each. One status feedback word appears for each channel bank in switching subsystem 1100. Thus, for example, if channel banks 1102, 1104 and 1106 are the only channel banks in switching subsystem 1100, then octets 7 through 10 will contain one credit allowance word each for channel banks 1104 and 1106, while octets 11 through 22 will remain empty. The feedback status for primary channel bank 1102 is directly handled by its processor 1178 and thus does not be inserted into the status feedback control cell.

The status feedback word for each channel bank identifies the current traffic congestion level at the channel bank. It will be appreciated that various formats may be used to identify traffic congestion levels. In the preferred embodiment, one of four traffic congestion levels is ascribed to ingress queue 1198.

In the embodiment shown in FIG. 11, in which ingress queue 1198 comprises 16 separate ingress queues, each with its own priority level, a separate traffic congestion level is ascribed to each priority level group of ingress queues. The status feedback word format for this embodiment is illustrated in Table C.

TABLE C

| Bit | Function |
| --- | --- |
| 0–9 | free list |
| 10–11 | congestion state for lowest priority group of queues<br>0 = level 0<br>1 = level 1<br>2 = level 2<br>3 = level 3 |
| 12–13 | congestion state for second to lowest priority group of queues<br>0 = level 0<br>1 = level 1<br>2 = level 2<br>3 = level 3 |
| 14–15 | congestion state for third to lowest priority group of queues<br>0 = level 0<br>1 = level 1<br>2 = level 2<br>3 = level 3 |

Generally, the traffic congestion level for a queue is determined by reference to the buffer space allotted for the queue. The higher the amount of allotted buffer space being utilized by the queue, the higher the traffic congestion level for the queue.

The threshold congestion levels which quantitatively define the four traffic congestion levels vary from queue to queue according to variables such as queue size, free buffer space, anticipated queue traffic patterns, and in some cases the rate of decrease of free buffer space. However, in general terms, Level 0 represents a normal or uncongested state, Level 1 represents a near congestion state, Level 2 represents a congestion imminent state, and Level 3 represents a congested state.

These congestion levels may be used not only to provide feedback to controller 1118, but also to regulate cell processing within a downstream controller 1150. For example, at Level 0, cell handling may proceed normally. At Level 1, processor 1178 may begin implementing congestion control measures such as early packet discard (EPD), partial packet discard (PPD) and/or restricting the cell flow rate to ingress queues 1198a through 1198p on a queue-by-queue basis. At Levels 2 and 3, these congestion control measures may be implemented in a progressively severe manner.

Referring to Table C, bits 0 through 9 of the status feedback word give the total free buffer space available for the ingress queues. Bits 10 and 11 give the traffic congestion level for the lowest priority group of queues, which may be, for example, queues 1198i and 1198j. Bits 12 and 13 give the traffic congestion level for the second lowest priority group of queues, which may be, for example, queues 1198k through 1198n. Bits 14 and 15 give the traffic congestion level for the third lowest priority group of queues, which may be, for example, queues 1198o and 1198p.

Controller 1140, and more particularly processor 1208 therein, originally generates status feedback cell 1232, with octets 7 and 8 containing the status feedback word for channel bank 1106. The status feedback cell is then passed upstream from controller to controller, as illustrated in FIG. 13, with each controller writing its own status feedback word into the appropriate two octets of the status feedback cell. When controller 1118 in channel bank 1102 receives status feedback cell 1232, the cell is routed to processor 1178, which utilizes the traffic congestion information contained in status feedback cell 1232, as well as traffic congestion information from controller 1118 itself, to determine an appropriate credit distribution to be included in the next control cell 1230.

This process is repeated periodically during the operation of switching subsystem 1100. Each control cell 1230 generated by processor 1178 includes a credit distribution for the downstream channel banks based upon information from the previous status feedback cell 1232. Processor 1178 also assigns credits for controller 1118, but this information remains internal to controller 1118 and is not included in control cell 1230.

In this control system, controller 1140 in channel bank 1106 launches cells upstream at will from CPU queue 1222, and utilizes its assigned credits to launch cells from ingress queue 1220. During intervals when CPU queue 1222 and ingress queue 1220 are either empty or not allowed to launch cells upstream, controller 1140 launches a steady stream of empty or unassigned cells. Each upstream controller receives the stream of empty cells and replaces empty cells with cells from its own queues in accordance with its priority scheme and credit allowance.

In the case where the number of empty cells transmitted upstream to controller 1118 in channel bank 1102 exceeds the number of credits assigned to channel bank 1102, controller 1118 may be programmed to dequeue cells from its ingress queues in excess of its credit allowance. This flexibility ensures maximum utilization of upstream bandwidth resources.

Referring to FIG. 14, the operation of the second upstream control system is illustrated. In this system, bandwidth on the upstream fiber optic cables is pre-assigned according to class of service or queue priority. This differs from the first embodiment, in which bandwidth is assigned for each channel bank, with a local scheduler in each controller making dequeuing decisions to allocate bandwidth for queues with different priorities. In the second embodiment, queues having the same priority, regardless of the channel bank in which they are located, may compete for the bandwidth assigned to that queue class.

In this control system, controller 1140 in channel bank 1106 generates a continuous stream of cells 1234, some or all of which are marked as reserved for particular queue classes. This marking occurs in the cell header in the location that usually contains address information. More specifically, the virtual path indicator is replaced with a unique code identifying the cell as reserved. The virtual circuit indicator is replaced with an identification of the queue class for which the cell is reserved.

A queue class may be a simple priority or traffic class designation. For example, a CPU queue such as queue 1188 in each controller in switching subsystem 1100 may be designated as Queue Class One. Thus, a Queue Class One reserved cell sent upstream from controller 1140 will be used by the first controller that has a non-empty CPU queue 1188.

Queue classes may also provide further subdivision of queues. For example, if switching subsystem 1100 comprises nine channel banks, Queue Class One may be used to designate CPU queues in the lower three channel banks, Queue Class Two may be used to designate CPU queues in the middle three channel banks, and Queue Class Three may be used to designate CPU queues in the upper three channel banks. Likewise, a queue class may be used to designate a selected queue or set of queues in one particular channel bank.

Queue classes may also designate groups of queues servicing different traffic classes. For example, one queue class may be used to designated all queues carrying "concentrated" or oversubscribed cell traffic, such as ABR and UBR queues, while another queue class may be used to designate all queues carrying non-concentrated traffic, such as VBR and CBR queues.

In each controller, internal switching controller 1174 is programmed with the queue class designations of each upstream queue 1194, 1196 and 1198. Thus, when a reserved cell for a queue class is received on fiber optic cable 1158, processor 1178 cooperates with scheduler 1200 to ensure that, if a non-empty queue belonging to that queue class exists in controller 1150, then a cell is dequeued from the non-empty queue. Otherwise, the reserved cell is passed upstream without modification.

If the reserved cell reaches controller 1118, it must be replaced with a queued cell or an unassigned cell. This is because the non-standard format used to designate reserved cells will not be recognized by ATM switch 1110. Reserved cells must therefore be removed from the stream before reaching ATM switch 1110.

In an exemplary priority scheme, illustrated in FIG. 14, controller 1140 of terminating channel bank 1106 generates a repeating sequence 1234 of 1000 cells. In this sequence, 50 of the cells, represented by cell 1234*a*, are reserved for concentrated traffic, while 100 cells, represented by cell 1234*e*, are reserved for non-concentrated (CBR and VBR) traffic. The remaining cells are generally unassigned, i.e. empty and not reserved, as illustrated by cells 1234*b* and 1234*c*.

Channel bank 1106 not only creates the reserved cell distribution, but also takes part in the cell reservation system as a "consumer" of upstream bandwidth. Thus, controller 1140 dequeues cells from its queues 1220 and 1222 in place of some of the unassigned cells and/or reserved cells before launching the cells upstream, as illustrated by cell 1234*d* in FIG. 14.

In this priority scheme, when an unassigned cell is received at a controller 1150, processor 1178 and scheduler 1200 implement an internal priority scheme that gives non-concentrated traffic queues priority over concentrated traffic queues. However, five percent of the cells received are marked as reserved for concentrated traffic, ensuring that concentrated traffic queues are allowed to dequeue a minimum number of cells even when non-concentrated traffic is heavy.

Thus, referring to FIG. 14, channel bank 1105*f* receives the cell stream 1234 and dequeues a cell 1234*f* from a concentrated traffic queue to take the place of reserved cell 1234*a*. Channel bank 1105*e* dequeues two cells 1234*g* and 1234*h* from non-concentrated traffic queues to replace unassigned cell 1234*b* and reserved cell 1234*e*, respectively. For channel banks upstream of channel bank 1105*e*, only one unassigned cell 1234*c* remains to be replaced by a dequeued traffic cell.

To ensure that the supply of reserved cells is not completely exhausted before reaching upstream channel banks such as primary channel bank 1102 and intermediate channel banks 1104, fairness assurance procedures may also be built into this control system. For example, scheduler 1200 and/or processor 1178 in each controller may be programmed to limit the rate at which any particular queue or group of queues may dequeue cells upstream.

Another method for ensuring fairness is to implement a queue class system in which queues in the upstream channel banks such as primary channel bank 1102 and intermediate channel banks 1104 may be designated separately from the downstream channel bank queues as previously described. Then, controller 1140 in channel bank 1106 may reserve a minimum number of cells specifically for the queues in specific upstream channel banks.

Thus, it is apparent that there has been provided, in accordance with the present invention, a distributed telecommunications switching subsystem and method that satisfy the advantages set forth above. Although the present invention has been described in detail, it should be understood that various changes, substitutions, and alterations readily ascertainable by one skilled in the art can be made herein without departing from the spirit and scope of the present invention as defined by the following claims.

4. Acronyms

| | |
|---|---|
| AAL | ATM Adaptation Layer |
| ABR | Available Bit Rate |
| ADSL | Asymmetrical Digital Subscriber Line |
| AM | Amplitude Modulation |
| ATM | Asynchronous Transfer Mode |
| BB | Broadband |
| BCS | Broadcast Channel Selection |
| BCST | Broadcast |
| BFB | Broadband Fiber Bank |
| BFD | Buffer descriptor |
| BORSHT | Battery, Overvoltage, Ringing, Supervision, Hybrid, Test: the functions of a POTS line circuit |
| BPS | Bank Power Supply |
| BPT | Central Control of Narrowband ONU |
| CAC | Connection Admission Control |
| CBR | Constant Bit Rate |
| CDV | Cell Delay Variation |
| CES | Circuit Emulation Service |
| CLP | Cell Loss Priority |
| CLR | Cell Loss Ratio |
| CO | Central Office |
| COM | Continuation of Message |
| COT | CO Terminal |
| CPE | Customer Premises Equipment |
| CRU | Cell routing Unit |
| CTTH | Coax To The Home |
| DCS | Digital Cross-connect System |
| DHN | Digital Home Network |
| DS | Delivery System |
| DVB | Digital Video Broadcast |
| EFCI | Explicit Forward Congestion Indication |
| EOM | End Of Message |
| EPD | Early Packet Discard |
| ESC | End Service Consumer |
| ESF | Extended Super Frame |
| ESP | End Service Provider |
| FBIU | Fiber Bank Interface Unit |
| FTTH | Fiber To The Home |
| GCRA | Generic Cell Rate Process |
| HAN | Home Access Network |
| HDT | Host Digital Terminal |
| HEC | Header Error Check |
| HFC | Hybrid Fiber Coax |
| IOF | Inter-Office Facilities |
| ISP | Internet Service Provider |
| L1GW | Level 1 Gateway |
| L2GW | Level 2 Gateway |
| LDS | Local Digital Switch |
| LSB | Least Significant Bit |
| LSBB | Litespan Broadband |
| LTM | Litespan Broadband Traffic Management |
| MOD | Movie On Demand |
| MSB | Most Significant Bit |
| NIU | Network Interface Unit |
| NNI | Network to Network Interface |
| NMS | Network Management System |
| NOD | Network Ownership Decoupling |
| NT | Network Termination |
| NTM | Network side Traffic Management |
| O/E | Opto-Electrical conversion |

4. Acronyms

| | |
|---|---|
| OA&M | Operations, Administration and Maintenance |
| OAM | Operation and Maintenance Cell |
| OC-n | Optical Carrier hierarchy |
| OLU | Optical Line Unit |
| ONU | Optical Network Unit |
| ORM | Optical Receiver Module |
| PDU | Packet Data Unit |
| PHS | Per Home Scheduler |
| PHY | Physical Layer (ATM protocol stack) |
| POTS | Plain Old Telephone Service |
| PPD | Partial Packet Discard |
| PPV | Pay Per View |
| PRI | Priority - arbiter or scheduler |
| PWR | Power |
| QD | Queue Descriptor |
| QoS | Quality of Service |
| RM | Resource Management Cell |
| RRS | Round Robin Select - arbiter or scheduler |
| RSU | Remote Switching Unit |
| SAM | Service Access Mux |
| SDV | Switched Digital Video |
| SPS | Service Provider System |
| STB | Set-Top Box |
| STU | Set-Top Unit |
| TC | Transmission Convergence (ATM protocol stack layer) |
| TDM | Time Division Multiplex |
| TP | Twisted Pair |
| TPTTH | Twisted Pair To The Home |
| TSI | Time Slot Interchange |
| TTD | Transmission Technology Decoupling |
| UNI | User Network Interface |
| UPC | Usage Parameter Control, (i.e. policing) |
| UPI | User Premises Interface |
| VASP | Value Added Service Provider |
| VBR | Variable Bit Rate |
| VC | Virtual Channel |
| VCD | Virtual Circuit Descriptor |
| VCI | Virtual Channel Identifier |
| VF | Voice Frequency |
| VIP | Video Information Provider |
| VIU | Video Information User |
| VOD | Video On Demand |
| VP | Virtual Path |
| VPI | Virtual Path Identifier |

A few preferred embodiments have been described in detail hereinabove. It is to be understood that the scope of the invention also comprehends embodiments different from those described, yet within the scope of the claims. For example, "microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (Application Specific Integrated Circuits), PAL (Programmable Array Logic), PLAs (Programmable Logic Arrays), decoders, memories, non-software based processors, or other circuitry, or digital computers including microprocessors and microcomputers of any architecture, or combinations thereof. Memory devices include SAM (Static Random Access Memory), DRAM (Dynamic Random Access Memory), pseudo-static RAM, latches, EEPROM (Electrically-Erasable Programmable Read-Only Memory), EPROM (Erasable Programmable Read-Only Memory), registers, or any other memory device known in the art. Words of inclusion are to be interpreted as nonexhaustive in considering the scope of the invention.

While the presently preferred embodiments of the present invention that are disclosed in the above-identified sections are provided for the purposes of disclosure, alternative embodiments, changes and modifications in the details of construction, interconnection and arrangement of parts will readily suggest themselves to those skilled in the art after having the benefit of this disclosure. This invention is therefore not necessarily limited to the specific examples illustrated and described above. All such alternative embodiments, changes and modifications encompassed within the spirit of the invention are included.

What is claimed is:

1. A distributed telecommunications switching subsystem, comprising a plurality of switching units, each switching subsystem having a stored list of addresses, each switching subsystem being operable to receive a data packet, compare an address of the data packet to its respective stored list of addresses, and transmit the data packet to another switching subsystem if the address of the data packet does not correspond to any of the addresses in its respective stored list of addresses:

wherein the plurality of switching subsystems is interconnected to form a chain having a primary switching subsystem at a first terminus and a terminating switching subsystem at a second terminus.

2. The distributed telecommunications switching subsystem of claim 1, wherein the primary switching subsystem is further connected to a telecommunications network.

3. A distributed telecommunications switching subsystem, comprising:

a first switching subsystem operable to receive a data packet, the first switching subsystem comprising a first address storage system, a first processor and a first switch, the first address storage system being operable to store a first plurality of addresses corresponding to a first plurality of customers, the first processor being operable to compare an address portion of the data packet with the first plurality of addresses, the first switch being operable to transmit the data packet to a selected one of the first plurality of customers in response to a positive comparison between the address portion of the data packet and the first plurality of addresses, the first switch being further operable to transmit the data packet on a first communication line in response to a negative comparison between the address portion of the data packet and the first plurality of addresses; and a second switching subsystem coupled to the first communication line and operable to receive the data packet transmitted thereon, the second switching subsystem comprising a second address storage system, a second processor and a second switch, the second address storage system being operable to store a second plurality of addresses corresponding to a second plurality of customers, the second processor being operable to compare the address portion of the data packet with the second plurality of addresses, the second switch being operable to transmit the data packet to a selected one of the second plurality of customers in response to a positive comparison between the address portion of the data packet and the second plurality of addresses;

wherein the second switching subsystem further comprises an ingress queue operable to store a return data packet generated by a selected one of the second plurality of customers, and to transmit the return data packet to the first switching subsystem.

4. The distributed telecommunications switching subsystem of claim 3, wherein the second switching subsystem further comprises a scheduler operable to detect a non-empty condition of the ingress queue, and to trigger the transmission of the return data packet by the ingress queue in response to the non-empty condition of the ingress queue.

5. The distributed telecommunications switching subsystem of claim 3, wherein the second switching subsystem further comprises:

a buffer operable to receive the return data packet from the selected one of the second plurality of customers; and an internal switch operable to relay the return data packet from the buffer to the ingress queue.

6. A method for routing data in a telecommunications network, comprising the steps of:

receiving at a first switching unit a data packet having a destination associated therewith;

determining at the first switching unit whether the destination associated with the data packet corresponds to a destination associated with the first switching unit;

transmitting the data packet to the destination associated with the first switching unit in response to a correspondence between the destination associated with the data packet and the destination associated with the first switching unit;

transmitting the data packet to a second switching unit in response to a lack of correspondence between the destination associated with the data packet and the destination associated with the first switching unit;

determining at the second switching unit whether the destination associated with the data packet corresponds to a destination associated with the second switching unit;

transmitting the data packet to the destination associated with the second switching unit in response to a correspondence between the destination associated with the data packet and the destination associated with the second switching unit;

transmitting the data packet to a third switching unit in response to a lack of correspondence between the destination associated with the data packet and the destination associated with the second switching unit;

receiving at the second switching unit a return data packet; and transmitting the return data packet by second switching unit to the first switching unit.

7. The method of claim 6, further comprising the steps of:

generating the return data packet at a customer premises equipment unit associated with the second switching unit; and transmitting the return data packet from the customer premises equipment unit associated with the second switching unit to the second switching unit.

8. The method of claim 6, further comprising the steps of:

generating the return data packet at a customer premises equipment unit associated with the third switching unit;

transmitting the return data packet from the customer premises equipment unit associated with the third switching unit to the third switching unit; and transmitting the return data packet from the third switching unit to the second switching unit.

9. The method of claim 6, further comprising the step of performing at the second switching unit a validity check on an address portion of the return data packet.

10. A service access multiplexer, comprising:

a first channel bank operable to receive an asynchronous transfer mode cell, the first channel bank operable to route the asynchronous transfer mode cell to one of a plurality of subscriber interfaces associated with the first channel bank in response to a determination that the asynchronous transfer mode cell is destined for one of the plurality of subscriber interfaces associated with the first channel bank, the first channel bank operable to pass on the asynchronous transfer mode cell in response to a determination that the asynchronous transfer mode cell is not destined for one of the plurality of subscriber interfaces associated with the first channel bank;

an intermediate channel bank operable to receive the asynchronous transfer mode cell passed on by the first channel bank, the intermediate channel bank operable to route the asynchronous transfer mode cell to one of a plurality of subscriber interfaces associated with the intermediate channel bank in response to a determination that the asynchronous transfer mode cell is destined for one of the plurality of subscriber interfaces associated with the intermediate channel bank, the intermediate channel bank operable to pass on the asynchronous transfer mode cell in response to a determination that the asynchronous transfer mode cell is not destined for one of the plurality of subscriber interfaces associated with the intermediate channel bank;

a terminating channel bank operable to receive the asynchronous transfer mode cell passed on by the intermediate channel bank, the terminating channel bank operable to route the asynchronous transfer mode cell to one of a plurality of subscriber interfaces associated with the terminating channel bank in response to a determination that the asynchronous transfer mode cell is destined for one of the plurality of subscriber interfaces associated with the terminating channel bank.

11. The service access multiplexer of claim 10, wherein the first channel bank, the intermediate channel bank, and the terminating channel bank cooperate to implement a single asynchronous transfer mode switching node.

12. The service access multiplexer of claim 10, wherein the first channel bank, the intermediate channel bank, and the terminating channel bank are located at different geographically remote sites.

13. The service access multiplexer of claim 10, wherein the first channel bank generates a command cell to pass on to the intermediate channel bank and the terminating channel bank, the command cell includes information to define credits assigned to the first channel bank, the intermediate channel bank, and the terminating channel bank in order to control upstream congestion from subscriber interfaces associated with the first channel bank, the intermediate channel bank, and the terminating channel bank.

14. The service access multiplexer of claim 13, wherein the credits relate to a number of asynchronous transfer mode cells that each of the first channel bank, the intermediate channel bank, and the terminating channel bank can pass in an upstream direction from respective subscriber interfaces over a pre-defined period of time.

15. The service access multiplexer of claim 13, wherein the terminating channel bank is operable to generate a feedback status cell, in response to receipt of the command cell, the feedback status cell including congestion status for the terminating channel bank, the terminating channel bank providing the feedback status cell to the intermediate channel bank.

16. The service access multiplexer of claim 15, wherein the intermediate channel bank is operable to update the feedback status cell with congestion status associated with the intermediate channel bank, the intermediate channel bank operable to provide the feedback status cell to the first channel bank.

17. The service access multiplexer of claim 16, wherein the first channel bank is operable to adjust the command cell in response to the feedback status cell and the congestion status of the first channel bank.

18. The service access multiplexer of claim 10, wherein each of the first channel bank, the intermediate channel bank, and the terminating channel bank comprise:
   a virtual path lookup identifier operable to identify whether an incoming asynchronous transfer mode cell is provisioned for a virtual path connection, the virtual path lookup identifier operable to provide the incoming asynchronous transfer mode cell to an associated subscriber interface in response to identification of a virtual path connection.

19. The service access multiplexer of claim 18, wherein each of the first channel bank, the intermediate channel bank, and the terminating channel bank comprise:
   a virtual circuit lookup identifier operable to identify whether the incoming asynchronous transfer mode cell is provisioned for virtual circuit connection in response to an indication from the virtual path lookup identifier that a virtual path connection is not provisioned for the incoming asynchronous transfer mode cell, the virtual circuit lookup identifier operable to provide the incoming asynchronous transfer mode cell to an associated subscriber interface in response to identification of a virtual circuit connection.

20. The service access multiplexer of claim 19, wherein the first channel bank, the intermediate channel bank, and the terminating channel bank comprise:
   a control cell lookup identifier operable to identify whether the incoming asynchronous transfer mode cell is provisioned as a control cell in response to an indication from the virtual circuit lookup identifier that a virtual circuit connection is not provisioned for the incoming asynchronous transfer mode cell, the control cell lookup identifier operable to provide the incoming asynchronous transfer mode cell to an associated processor for appropriate processing in response to an identification of a control cell.

21. The service access multiplexer of claim 20, wherein the first channel bank and the intermediate channel bank are operable to pass on the incoming asynchronous transfer mode cell to a subsequent channel bank in response to an indication from a respective control cell lookup identifier that the incoming asynchronous transfer mode cell is not a control cell.

22. The service access multiplexer of claim 20, wherein the terminating channel bank is operable to perform a mis-inserted cell processing operation on the incoming asynchronous transfer mode cell in response to an indication from its control cell lookup identifier that the incoming asynchronous transfer mode cell is not a control cell.

23. The service access multiplexer of claim 10, wherein the first channel bank and the intermediate channel bank comprise:
   a bypass queue operable to receive the asynchronous transfer mode cell prior to passing on to a subsequent channel bank;
   a control queue operable to receive a control cell to be passed on to the subsequent channel bank;
   a scheduler operable to determine a transport sequence to the subsequent channel bank for the asynchronous transfer mode cell in the bypass queue and the control cell in the control queue.

24. The service access multiplexer of claim 23, wherein the scheduler implements a higher priority to the control queue than the bypass queue for the transport sequence.

* * * * *